(12) United States Patent
Kasahara et al.

(10) Patent No.: US 11,190,678 B2
(45) Date of Patent: *Nov. 30, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Shunichi Kasahara, Kanagawa (JP); Ryo Takaoka, Tokyo (JP); Atsushi Matsutani, Tokyo (JP); Kanako Yana, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/865,816

(22) Filed: May 4, 2020

(65) Prior Publication Data

US 2020/0267312 A1 Aug. 20, 2020

Related U.S. Application Data

(63) Continuation of application No. 16/389,140, filed on Apr. 19, 2019, now Pat. No. 10,659,681, which is a
(Continued)

(30) Foreign Application Priority Data

Mar. 4, 2010 (JP) ................................ 2010-048098

(51) Int. Cl.
*H04N 5/232* (2006.01)
*G06K 9/00* (2006.01)
(Continued)

(52) U.S. Cl.
CPC ......... *H04N 5/23219* (2013.01); *G03B 17/54* (2013.01); *G06F 3/017* (2013.01);
(Continued)

(58) Field of Classification Search
CPC ............. H04N 5/23219; H04N 9/3179; H04N 5/7408; H04N 5/74; H04N 5/23216;
(Continued)

(56) References Cited

U.S. PATENT DOCUMENTS 6,806,906 B1  10/2004  Soga et al.
7,317,485 B1   1/2008  Miyake et al.
(Continued)

FOREIGN PATENT DOCUMENTS

CN    2011-94061    2/2009
EP    2287708 A1    2/2011
(Continued)

OTHER PUBLICATIONS

Jun. 14, 2016, Japanese Office Action issued for related JP Application No. 2015-085030.
(Continued)

*Primary Examiner* — Ahmed A Berhan
(74) *Attorney, Agent, or Firm* — Paratus Law Group, PLLC

(57) ABSTRACT

There is provided an information processing apparatus including an emission unit for emitting a projection image onto a subject, which is to be photographed, so as to allow the subject to perform a predetermined operation, a recognizing unit for recognizing operation performed by the subject, and an execution unit for executing a predetermined processing according to the operation of the subject that is recognized by the recognizing unit.

26 Claims, 49 Drawing Sheets

Related U.S. Application Data continuation of application No. 15/993,902, filed on May 31, 2018, now Pat. No. 10,306,136, which is a continuation of application No. 15/340,382, filed on Nov. 1, 2016, now Pat. No. 10,015,392, which is a continuation of application No. 14/711,092, filed on May 13, 2015, now Pat. No. 9,516,206, which is a continuation of application No. 13/023,639, filed on Feb. 9, 2011, now Pat. No. 9,049,376.

(51) Int. Cl.
| | |
|---|---|
| H04N 9/31 | (2006.01) |
| H04N 5/74 | (2006.01) |
| G06F 3/01 | (2006.01) |
| G03B 17/54 | (2021.01) |
| H04N 5/235 | (2006.01) |
| H04N 5/225 | (2006.01) |

(52) U.S. Cl.
CPC ....... *G06K 9/00355* (2013.01); *H04N 5/2256* (2013.01); *H04N 5/2354* (2013.01); *H04N 5/23216* (2013.01); *H04N 5/23218* (2018.08); *H04N 5/232935* (2018.08); *H04N 5/74* (2013.01); *H04N 5/7408* (2013.01); *H04N 9/3179* (2013.01)

(58) Field of Classification Search
CPC ............... H04N 5/2354; H04N 5/2256; G06K 9/00355; G06F 3/017; G03B 17/54
See application file for complete search history.

(56) References Cited

U.S. PATENT DOCUMENTS

| | | | |
|---|---|---|---|
| 8,159,594 | B2 | 4/2012 | Nitta et al. |
| 8,322,860 | B2 | 12/2012 | Sato et al. |
| 2004/0201823 | A1 | 10/2004 | Raskar et al. |
| 2004/0254699 | A1* | 12/2004 | Inomae ................ B60K 37/02 701/36 |
| 2005/0195365 | A1 | 9/2005 | Lamarre |
| 2006/0069999 | A1* | 3/2006 | Mitsuhashi ........ H04N 1/00198 715/723 |
| 2007/0229650 | A1 | 10/2007 | McKay |
| 2007/0229679 | A1 | 10/2007 | Kim |
| 2008/0143975 | A1 | 6/2008 | Dennard et al. |
| 2009/0102940 | A1 | 4/2009 | Uchida |
| 2009/0147139 | A1* | 6/2009 | Watanabe .......... H04N 21/4316 348/564 |
| 2009/0167780 | A1* | 7/2009 | Jung .................... G09G 3/2003 345/594 |
| 2009/0183125 | A1 | 7/2009 | Magal et al. |
| 2009/0190046 | A1 | 7/2009 | Kreiner et al. |
| 2009/0268049 | A1* | 10/2009 | Kim ..................... H04N 9/7921 348/222.1 |
| 2009/0295712 | A1 | 12/2009 | Ritzau |

FOREIGN PATENT DOCUMENTS

| | | |
|---|---|---|
| JP | H07-168949 A | 7/1995 |
| JP | H11-024839 A | 1/1999 |
| JP | H11-038949 A | 2/1999 |
| JP | 2001-211372 A | 8/2001 |
| JP | 2004-334590 A | 11/2004 |
| JP | 2005-141151 A | 6/2005 |
| JP | 2005-301668 A | 10/2005 |
| JP | 2006-252036 A | 9/2006 |
| JP | 2006-523067 A | 10/2006 |
| JP | 2008-129120 A | 6/2008 |
| JP | 2008-152622 A | 7/2008 |
| JP | 2008-276128 A | 11/2008 |
| JP | 2009-020564 A | 1/2009 |
| JP | 2009-064109 A | 3/2009 |
| JP | 2009-064110 A | 3/2009 |
| JP | 2009-070245 A | 4/2009 |
| JP | 2009-076983 A | 4/2009 |
| JP | 2009-188685 A | 8/2009 |
| JP | 2009-251702 A | 10/2009 |
| JP | 2010-015553 A | 1/2010 |
| JP | 2010-033272 A | 2/2010 |
| WO | WO 00/21024 | 4/2000 |
| WO | WO 2006/038577 A1 | 4/2006 |
| WO | WO 2008/120217 A2 | 10/2008 |
| WO | WO 2010/088032 A2 | 8/2010 |

OTHER PUBLICATIONS

Aug. 1, 2014, European Office Action issued for related EP application No. 11153331.1.

Aug. 5, 2014, Japanese Office Action issued for related JP application No. 2010-048098.

Aug. 11, 2014, Chinese Office Action issued for related CN application No. 201110049117.5.

Jan. 8, 2014, Extended European Search Report issued for related EP application No. 11153331.1.

Nov. 12, 2013, Japanese communication issued for related JP application No. 2010-048098.

Mar. 2, 2015, Chinese Office Action issued for related CN application No. 201110049117.5.

Jan. 26, 2016, Japanese Office Action issued for related JP application No. 2015-085030.

Jun. 27, 2017, Japanese Office Action for related JP application No. 2016-205649.

Oct. 9, 2018, Japanese Office Action issued for related JP Application No. 2017-237490.

Ishii et al., Palm Interface: A Display Personally to Show Information in Public Spaces by Using Image Processing, IPSJ Journal, Jul. 2008, pp. 2528-2538, vol. 49, No. 7, Information Processing Society of Japan.

Mar. 27, 2020, European Communication issued for related EP Application No. 11153331.1.

* cited by examiner

FIG. 1
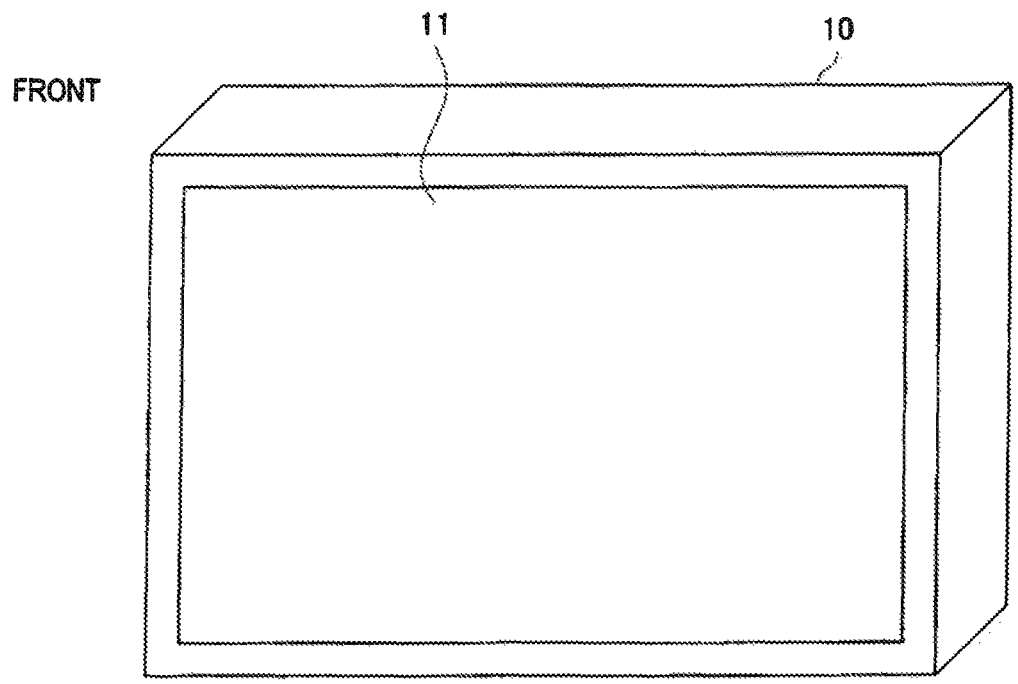
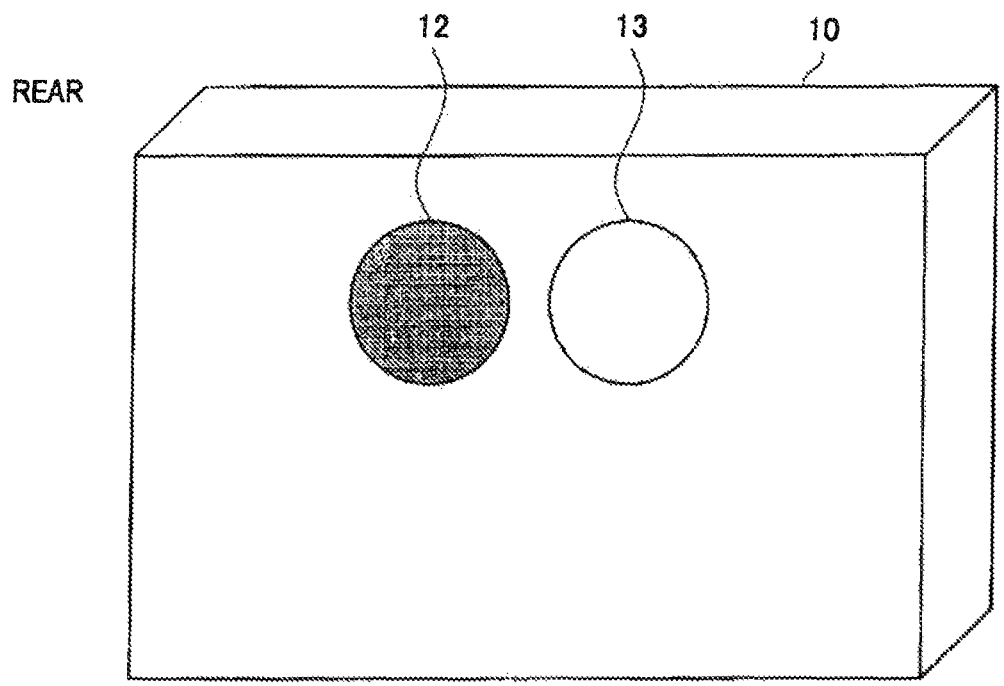

FIG. 26
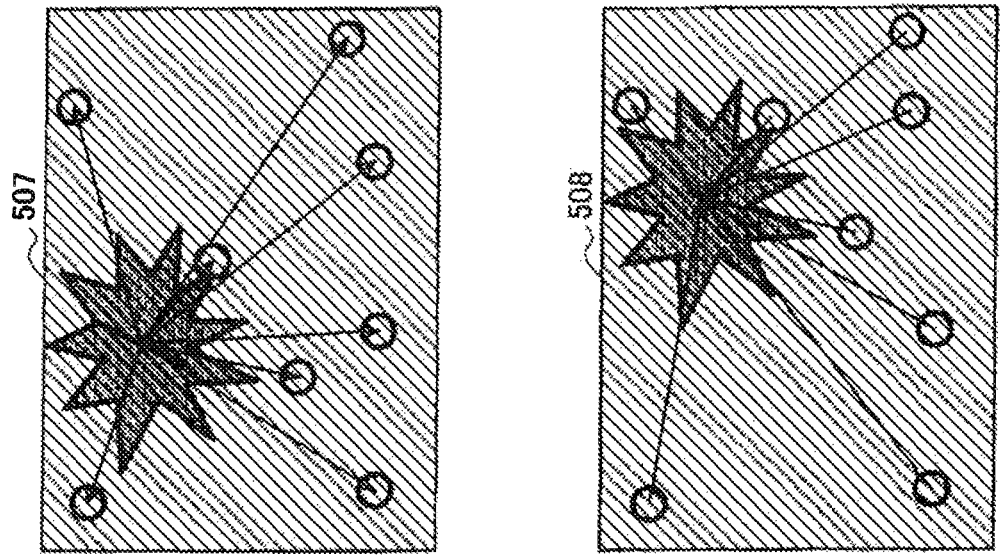
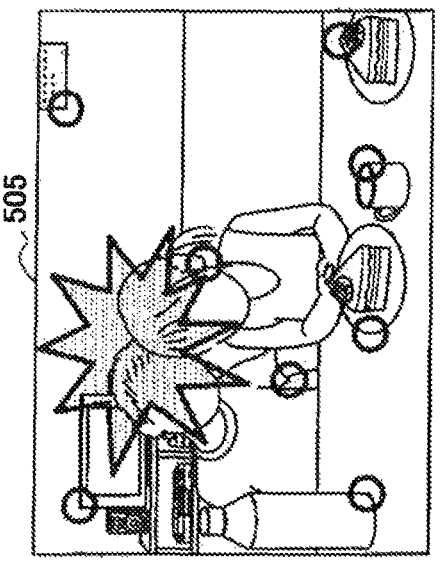
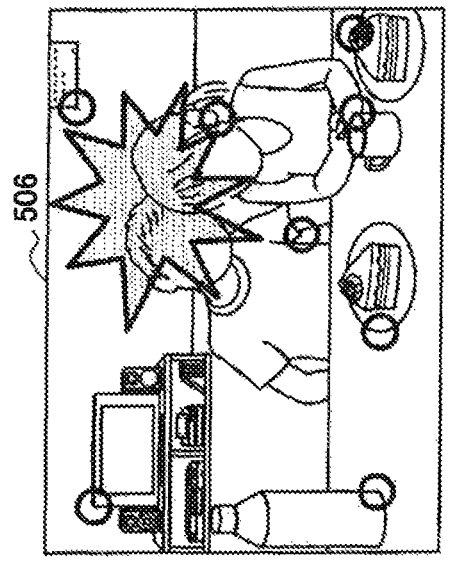

FIG. 38
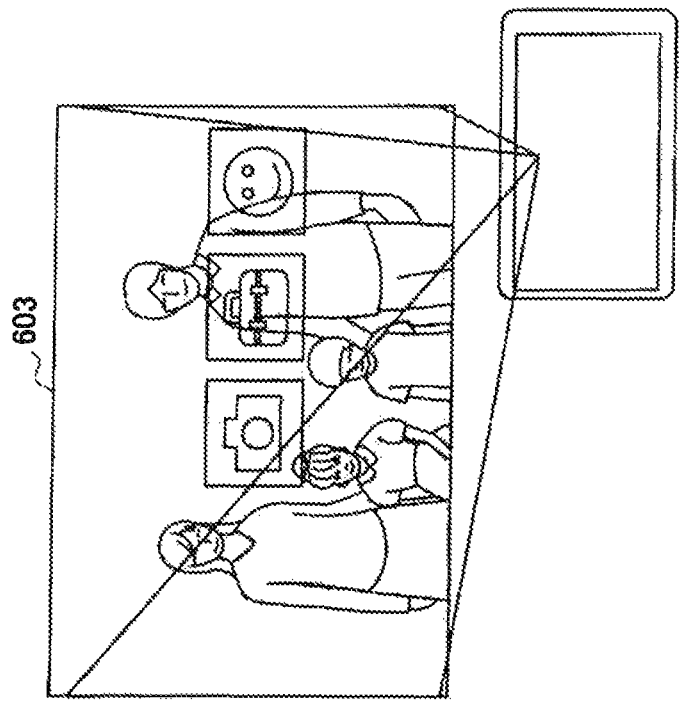
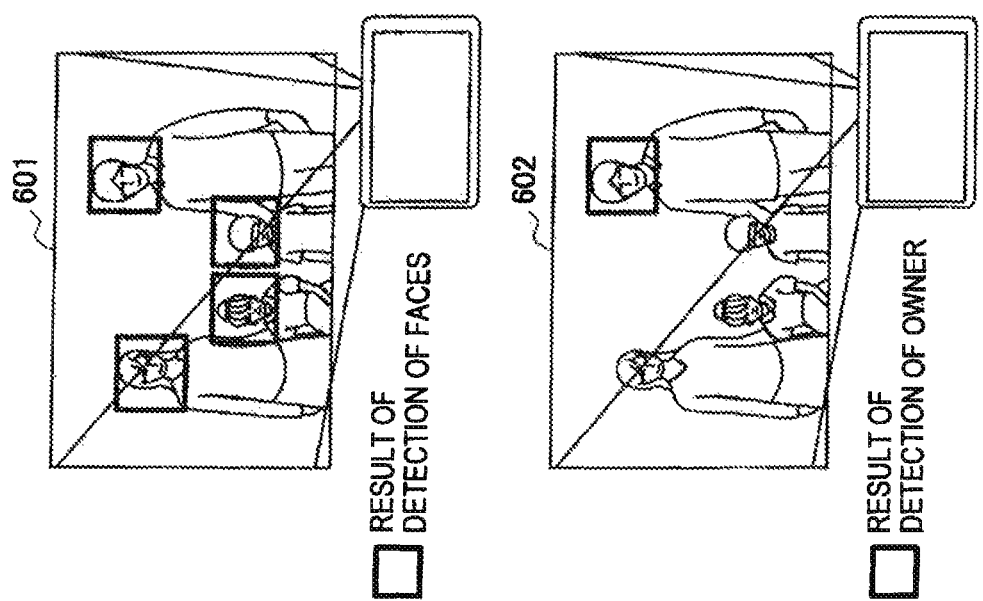

FIG. 47
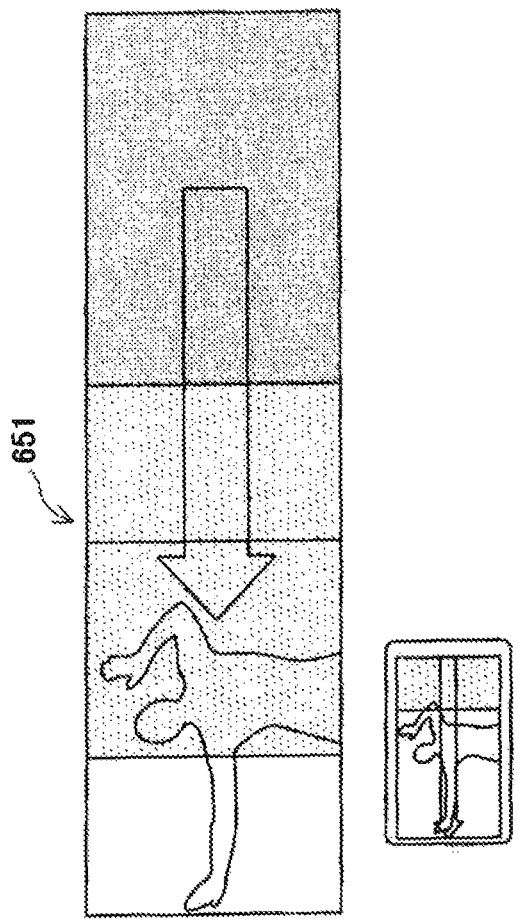
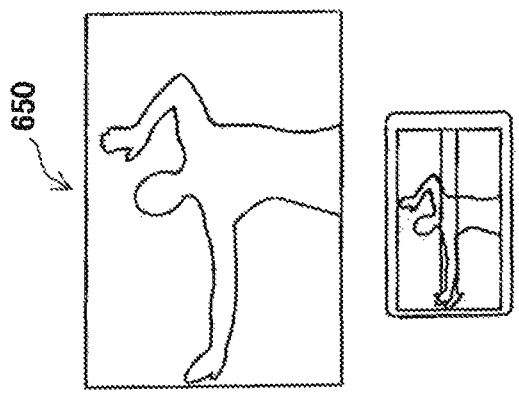

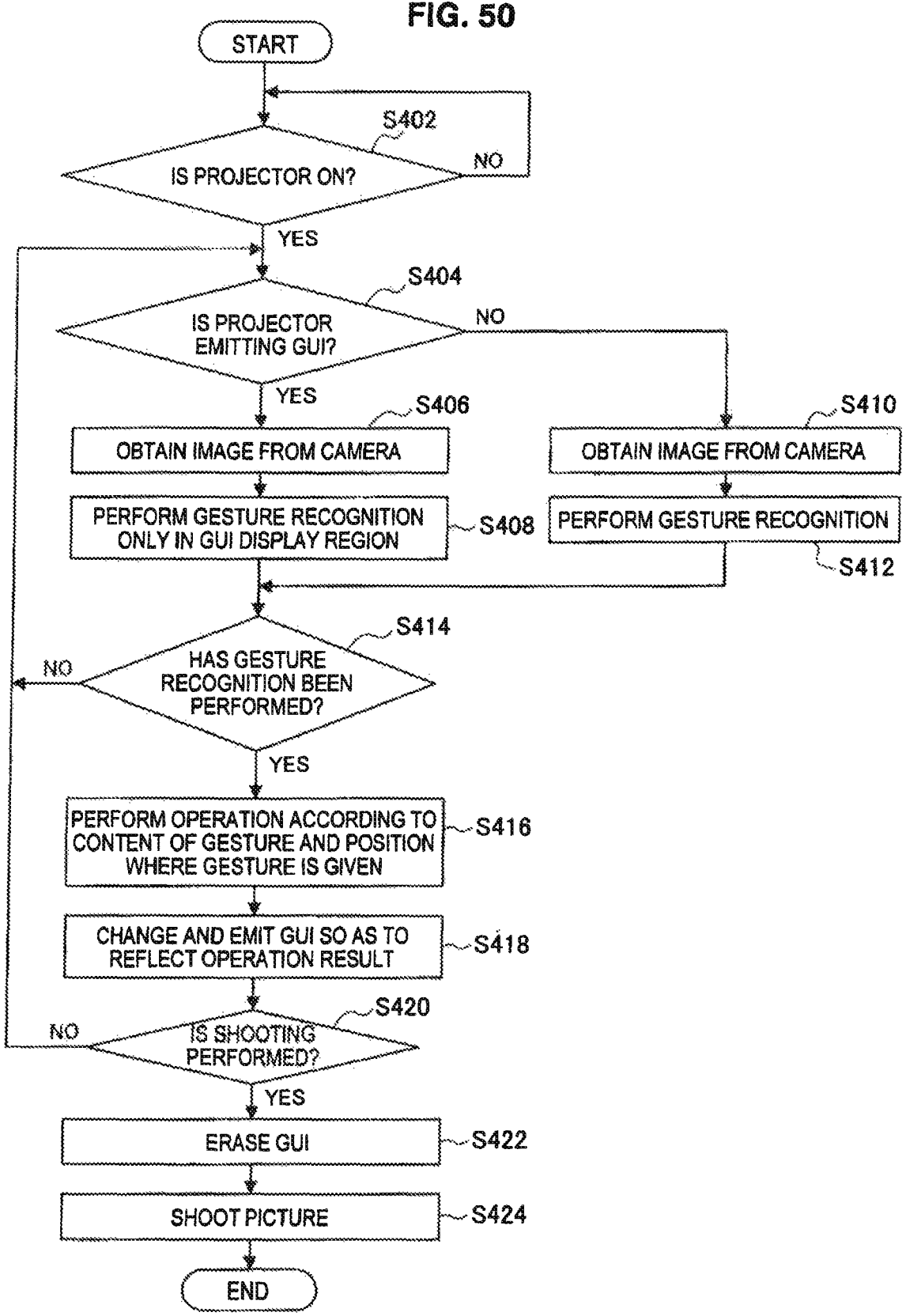

INFORMATION PROCESSING APPARATUS, INFORMATION PROCESSING METHOD, AND PROGRAM

CROSS-REFERENCE TO PRIOR APPLICATION

This application is a continuation of U.S. patent application Ser. No. 16/389,140 (filed on Apr. 19, 2019), which is a continuation of U.S. patent application Ser. No. 15/993,902 (filed on May 31, 2018 and issued as U.S. Pat. No. 10,306,136 on May 28, 2019), which is a continuation of U.S. patent application Ser. No. 15/340,382 (filed on Nov. 1, 2016 and issued as U.S. Pat. No. 10,015,392 on Jul. 3, 2018), which is a continuation of U.S. patent application Ser. No. 14/711,092 (filed on May 13, 2015 and issued as U.S. Pat. No. 9,516,206 on Dec. 6, 2016), which is a continuation of U.S. patent application Ser. No. 13/023,639 (filed on Feb. 9, 2011 and issued as U.S. Pat. No. 9,049,376 on Jun. 2, 2015), which claims priority to Japanese Patent Application No. 2010-048098 (filed on Mar. 4, 2010), which are all hereby incorporated by reference in their entirety.

BACKGROUND OF THE INVENTION

Field of the Invention

The present invention relates to an information processing apparatus, an information processing method, and a program.

Description of the Related Art

In the past, a flash is generally used as illumination when an image is captured with a camera. However, it used to be difficult to perform special illumination other than the flash with only the flash. With image processing, a desired pattern, a texture, and the like can be applied to an image captured by a camera. However, although a photographer who uses the camera can see the result of image processing, a third person and a subject may not see the result of image processing.

For example, Japanese Translation of PCT Application No. 2006-523067 and Japanese Patent Application Laid-Open No. 2009-76983 disclose techniques for causing a projector to project a graphic image onto a subject who is photographed. For example, Japanese Patent Application Laid-Open Nos. 2008-152622 and 2009-70245 disclose a technique for projecting a graphic image onto a desk and the like, detecting a direction of fingers and shapes of hands, and causing an information processing apparatus to perform predetermined processing.

SUMMARY OF THE INVENTION

However, it is desired to not only perform processing according to a direction of fingers and shapes of hands but also detect a certain movement of a subject with respect to a projected graphic image and execute processing in association with the detected movement.

In view of the foregoing, it is desirable to provide a novel and improved information processing apparatus, information processing method, and program, wherein processing can be executed according to subject's interaction with a projected image.

According to an embodiment of the present invention, here is provided an information processing apparatus including an emission unit for emitting a projection image onto a subject, which is to be photographed, so as to allow the subject to perform a predetermined operation, a recognizing unit for recognizing operation performed by the subject, and an execution unit for executing a predetermined processing according to the operation of the subject that is recognized by the recognizing unit.

The recognizing unit may recognize the operation of the subject based on an image of the subject captured by an image capturing device.

The emission device may emit the projection image onto the subject, and the image capturing device and the emission device may be arranged at fixed positions of the information processing apparatus.

The emission unit may emit the projection image for allowing the subject to perform selection operation, the recognizing unit may recognize the selection operation performed by the subject, and the execution unit may execute operation selected by the subject.

The emission unit may emit the projection image selected by user's operation onto the subject.

The recognizing unit may recognize an object and a person included in the subject, and the emission unit may emit the projection image onto a region of the object and the person included in the subject, which is recognized by the recognizing unit.

The recognizing unit may recognize movement of the subject in an emission range onto which the projection image is emitted.

The execution unit may execute a predetermined processing corresponding to movement of the subject in the emission range recognized by the recognizing unit.

The execution unit may cause the emission unit to emit a projection image according to operation of the subject recognized by the recognizing unit.

According to another embodiment of the present invention, here is provided an information processing method including the steps of emitting a projection image onto a subject, which is to be photographed, so as to allow the subject to perform a predetermined operation, recognizing operation performed by the subject, and executing a predetermined processing according to the operation of the subject that is recognized by the recognizing unit.

According to another embodiment of the present invention, here is provided a program for causing a computer to function as an information processing apparatus including an emission unit for emitting a projection image onto a subject, which is to be photographed, so as to allow the subject to perform a predetermined operation, a recognizing unit for recognizing operation performed by the subject, and an execution unit for executing a predetermined processing according to the operation of the subject that is recognized by the recognizing unit.

As described above, according to the present invention, processing can be executed according to subject's interaction with a projected image.

BRIEF DESCRIPTION OF THE DRAWINGS

FIG. 1 is an explanatory diagram illustrating an overview of an embodiment of the present invention;

FIG. 26 is an explanatory diagram illustrating an example of a projection image emitted according to the embodiment;

FIG. 38 is an explanatory diagram illustrating an example of a projection image emitted according to the embodiment;

FIG. 47 is an explanatory diagram illustrating an example of a projection image emitted according to the embodiment;

FIG. 50 is a flowchart illustrating operation of an information processing apparatus according to the embodiment in detail.

DETAILED DESCRIPTION OF THE EMBODIMENT

Figure 2:
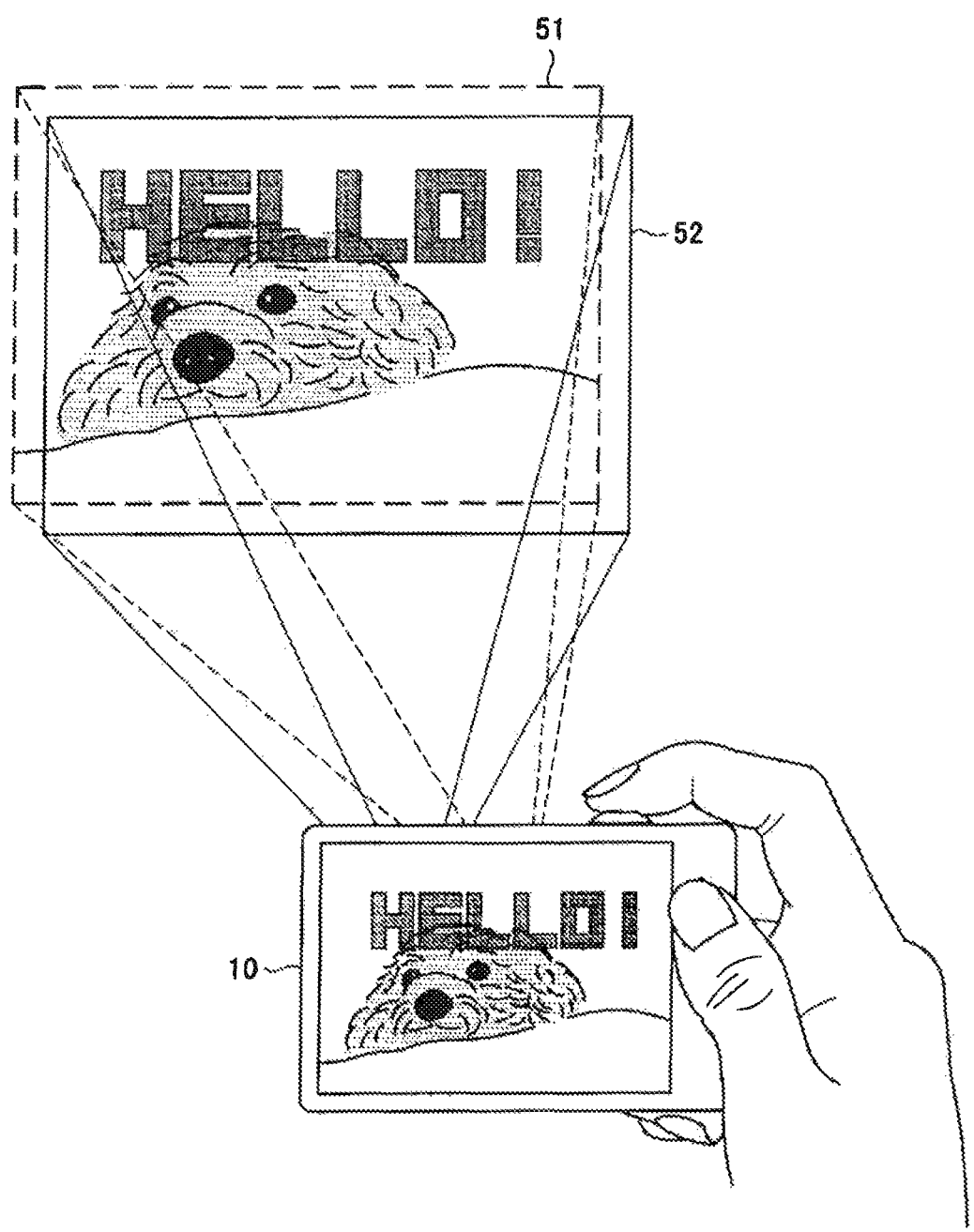
FIG. 2 is an explanatory diagram illustrating an overview of an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<1. Overview of the present embodiment>
<2. First embodiment>
<2-1. Hardware configuration of information processing apparatus>
<2-2. Functional configuration of information processing apparatus>
<2-3. Operation of information processing apparatus in detail>
<3. Second embodiment>
<3-1. Hardware configuration of information processing apparatus>
<3-2. Functional configuration of information processing apparatus>
<3-3. Operation of information processing apparatus in detail>
<4. Third embodiment>
<4-1. Hardware configuration of information processing apparatus>
<4-2. Functional configuration of information processing apparatus>
<4-3. Operation of information processing apparatus in detail>

1. Overview of the Present Embodiment

First, an overview of the present embodiment will be explained with reference to FIG. 1 and FIG. 2. The information processing apparatus 10 according to the present embodiment mainly includes an image capturing device (camera) for capturing an image of a subject, an emission device (projector) for projecting a video image onto the subject, a display device (display) for displaying the captured image taken by the camera, and the like. As shown in FIG. 1, one face (front surface) of the information processing apparatus 10 is arranged with a display 11. The other face (back surface) of the information processing apparatus 10 is arranged with a camera lens 12 and a projector lens 13. In the explanation below, the camera including the camera lens 12 is referred to as an image capturing device 12 or a camera 12. The projector including the projector lens 13 is referred to as an emission device 13 or a projector 13.

In the information processing apparatus 10, the camera 12 and the projector 13 are arranged at fixed positions of the casing of the information processing apparatus 10. An image of a subject captured by the camera 12 is displayed on the display 11. The projector 13 projects a projection image onto the subject. Then, the display 11 displays the subject onto which the projection image is projected.

As shown in FIG. 2, a photo shooting region 51 is a region that can be captured by the camera. A projection region 52 is a region onto which the projector can emit light. In the explanation about the embodiments below, the photo shooting region 51 and the projection region 52 are considered to be in synchronization. In this case, "being in synchronization" means that the photo shooting region 51 captured by the camera lens 12, i.e., a display region displayed on the display 11, is the same as the projection region 52 onto which light is emitted by the projector lens 13. When the photo shooting region 51 and the projection region 52 are not in synchronization, the display 11 may indicate the projection region. The overview of the present embodiment has been hereinabove explained.

2. First Embodiment

Subsequently, the first embodiment will be explained. In the past, a flash is generally used as illumination when an image is captured with a camera. However, it used to be difficult to perform special illumination other than the flash with only the flash. With image processing, a desired pattern, a texture, and the like can be applied to an image captured by a camera. However, although a photographer who uses the camera can see the result of image processing, a third person and a subject may not see the result of image processing.

Accordingly, there are disclosed techniques for causing a projector to project a graphic image onto a subject who is photographed. In these techniques, a position to which a graphic image is to be projected is recognized using a marker and the like in advance, and the graphic image is projected onto the marker. In the above techniques, however, the graphic image is projected onto a position recognized using the marker and the like in advance. Therefore, the above techniques have an issue in that the graphic image may not be projected in such a manner as to enable illumination expression with a high degree of flexibility, e.g., using a graphic image projected onto all over a photographed target as illumination and projecting a graphic image only onto a specified position.

Accordingly, the information processing apparatus 10 according to the embodiment of the present invention has been created in view of the above circumstance as one of issues taken into consideration. With the information processing apparatus 10 according to the present embodiment, a graphic image suitable for a photographed image can be projected.

<2-1. Hardware Configuration of Information Processing Apparatus>

Figure 3:
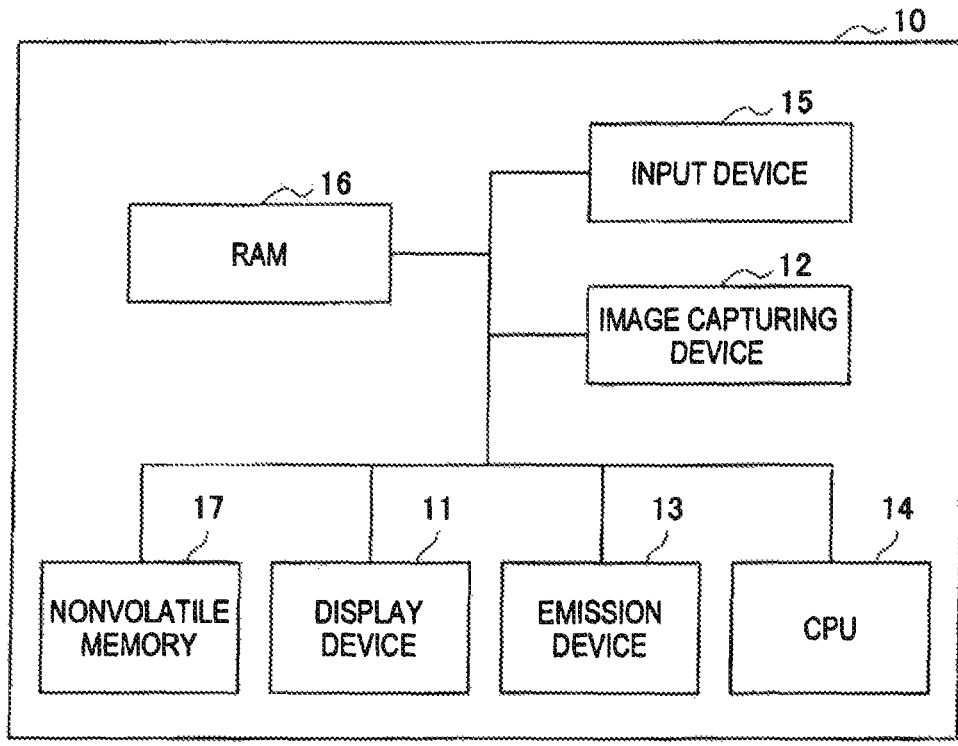
FIG. 3 is a block diagram illustrating a hardware configuration of an information processing apparatus according to a first embodiment of the present invention.

Subsequently, a hardware configuration of the information processing apparatus 10 will be explained with reference to FIG. 3. FIG. 3 is a block diagram illustrating the hardware configuration of the information processing apparatus 10. As shown in FIG. 3, the information processing apparatus 10 includes a display device (display) 11, an image capturing device (camera) 12, an emission device (projector) 13, a CPU 14, an input device 15, a RAM (Random Access Memory) 16, a nonvolatile memory 17, and the like.

The CPU 14 functions as a calculation processing unit and a control device, so as to control overall operation in the information processing apparatus 10 according to various kinds of programs. The CPU 104 may be a microprocessor. The RAM 16 temporarily stores programs used during execution of the CPU 14 and parameters and the like that change as necessary during the execution. These are connected with each other by a host bus constituted by a CPU bus and the like. The nonvolatile memory 17 stores programs, calculation parameters, and the like used by the CPU 14. The nonvolatile memory 17 may be, for example, a ROM (Read Only Memory), a flash memory, and the like.

The display device 11 is an example of an output device for outputting information. The display device 11 may be, for example, a liquid crystal display (LCD) device, and an OLED (Organic Light Emitting Diode) device.

The image capturing device 12 has a function of causing a CCD to convert light obtained through an image capturing lens into an electric signal so as to convert an analog signal into a digital signal, thus capturing an image of a subject. The image taken by the image capturing device 12 is displayed on the display device 11.

The emission device 13 has a function of emitting light onto a subject through an emission lens. The emission device 13 projects a predetermined projection image onto a subject according to control of the CPU 14. As described above, the image capturing device 12 and the emission device 13 are arranged at fixed positions in the information processing apparatus 10. The following explanation will be given under an assumption that the photo shooting region captured by the image capturing device 12 and the projection region onto which light is emitted by the emission device 13 are in synchronization, in other words, they are in the same region.

The input device 15 includes, for example, input means for a user to input information such as a touch panel, buttons, switches, and levers, and an input control circuit for generating an input signal based on user input and outputting the input signal to the CPU 14.

<2-2. Functional Configuration of Information Processing Apparatus>

Figure 4:
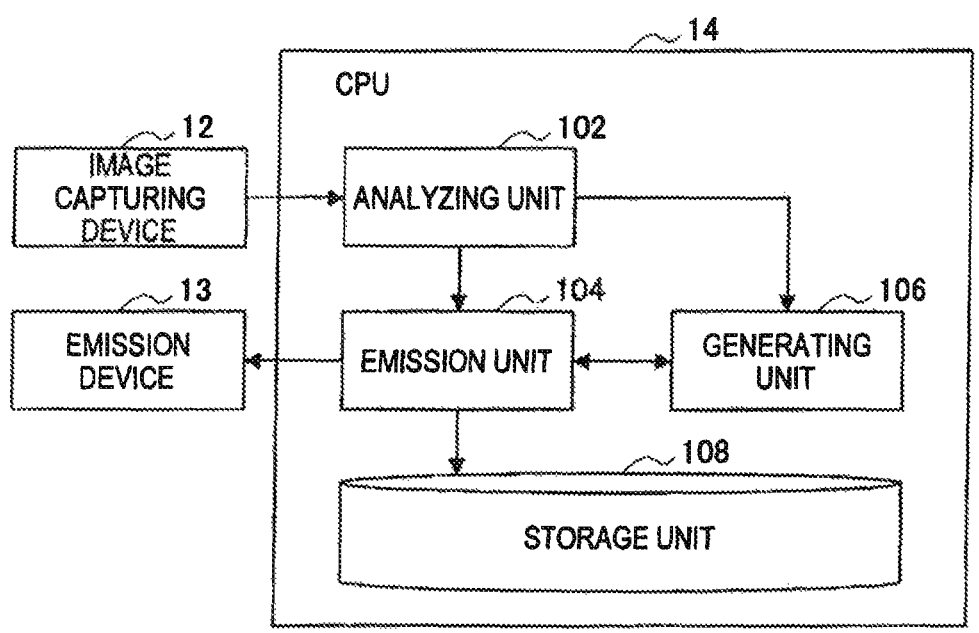
FIG. 4 is a block diagram illustrating a functional configuration of a control unit according to the embodiment.

The hardware configuration of the information processing apparatus 10 has been hereinabove explained. Subsequently, a functional configuration of a control unit (CPU 14) of the information processing apparatus 10 will be explained with reference to FIG. 4. Reference is made to FIGS. 5 to 16 as necessary when the functional configuration of FIG. 4 is explained. FIGS. 5 to 16 are explanatory diagrams each illustrating an example of a projection image emitted. FIG. 4 is a block diagram illustrating a functional configuration of the control unit of the information processing apparatus 10.

As shown in FIG. 4, the control unit of the information processing apparatus includes an analyzing unit 102, an emission unit 104, a generating unit 106, a storage unit 108, and the like. The analyzing unit 102 has a function of analyzing an image of a subject captured by the image capturing device 12. The analyzing unit 102 analyzes the image of the subject, and recognizes an image of an object included in the subject. In addition, the analyzing unit 102 detects an image of a person included in the subject by analyzing the image of the subject, and detects the image of a face. In addition, the analyzing unit 102 analyzes the image of the subject, and detects the color of the subject. An analysis result of the image of the subject analyzed by the analyzing unit 102 is provided to the emission unit 104 and the generating unit 106.

The emission unit 104 has a function of emitting a projection image using the emission device 13 according to the analysis result of the image of the subject analyzed by the analyzing unit 102. The storage unit 108 stores a projection image corresponding to the analysis result of the image of the subject. The emission unit 104 obtains the projection image corresponding to the analysis result of the image provided by the analyzing unit 102 from the storage unit 108, and emits the projection image to the subject using the emission device 13.

Figure 5:
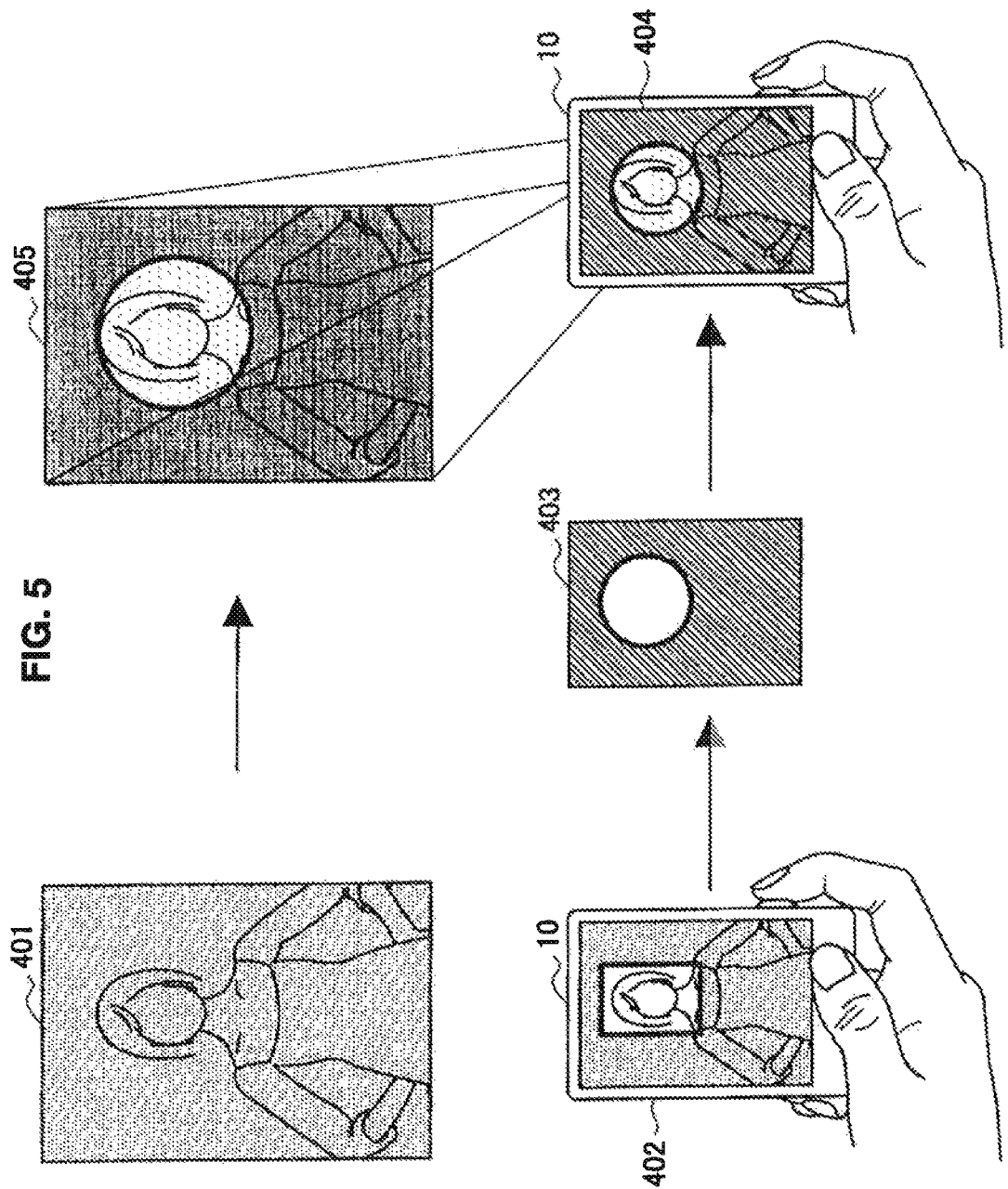
FIG. 5 is an explanatory diagram illustrating an example of a projection image emitted according to the embodiment.

For example, as shown in FIG. 5, the image capturing device 12 captures an image of the subject 401, and recognizes an image 402 of the subject. Then, a projection image 403 is selected according to the image 402 of the recognized subject, and the projection image 403 is emitted onto the subject by the emission device 13. In FIG. 5, the face included in the subject is recognized, and the projection image for illuminating the facial portion is selected. Then, the image capturing device 12 captures an image of a subject 405 onto which the projection image 403 is projected, and a display image 404 is displayed on the display device 11.

Explanation will be continued with reference back to FIG. 4. For example, when the analyzing unit 102 recognizes an image of an object included in the subject, a projection image for the image of the object is obtained from the storage unit 108 and is emitted onto the subject. Alternatively, when an image of a person or an image of a face included in the subject is detected, a projection image for the image of the person or the face is obtained from the storage unit 108 and is emitted onto the subject. On the other hand, when the image of the subject is analyzed, and a particular color included in the subject is detected, a projection image for the particular color is obtained from the storage unit 108 and is emitted onto the subject.

The generating unit 106 has a function such that, when the storage unit 108 stores a predicted image in advance for predicting an image where a projection image is emitted, the generating unit 106 generates a projection image according to a comparison result obtained by comparing the predicted image with an emission image onto which the projection image is projected by the emission unit 104. The projection image generated by the generating unit 106 is emitted by the emission unit 104, and the projection image generated by the emission unit 104 is emitted onto the subject.

As described above, the storage unit 108 stores the analysis result of the image of the subject and the projection image, which are associated with each other. In addition, the storage unit 108 stores a predicted image in advance for predicting an image onto which a stored projection image is emitted.

Figure 6:
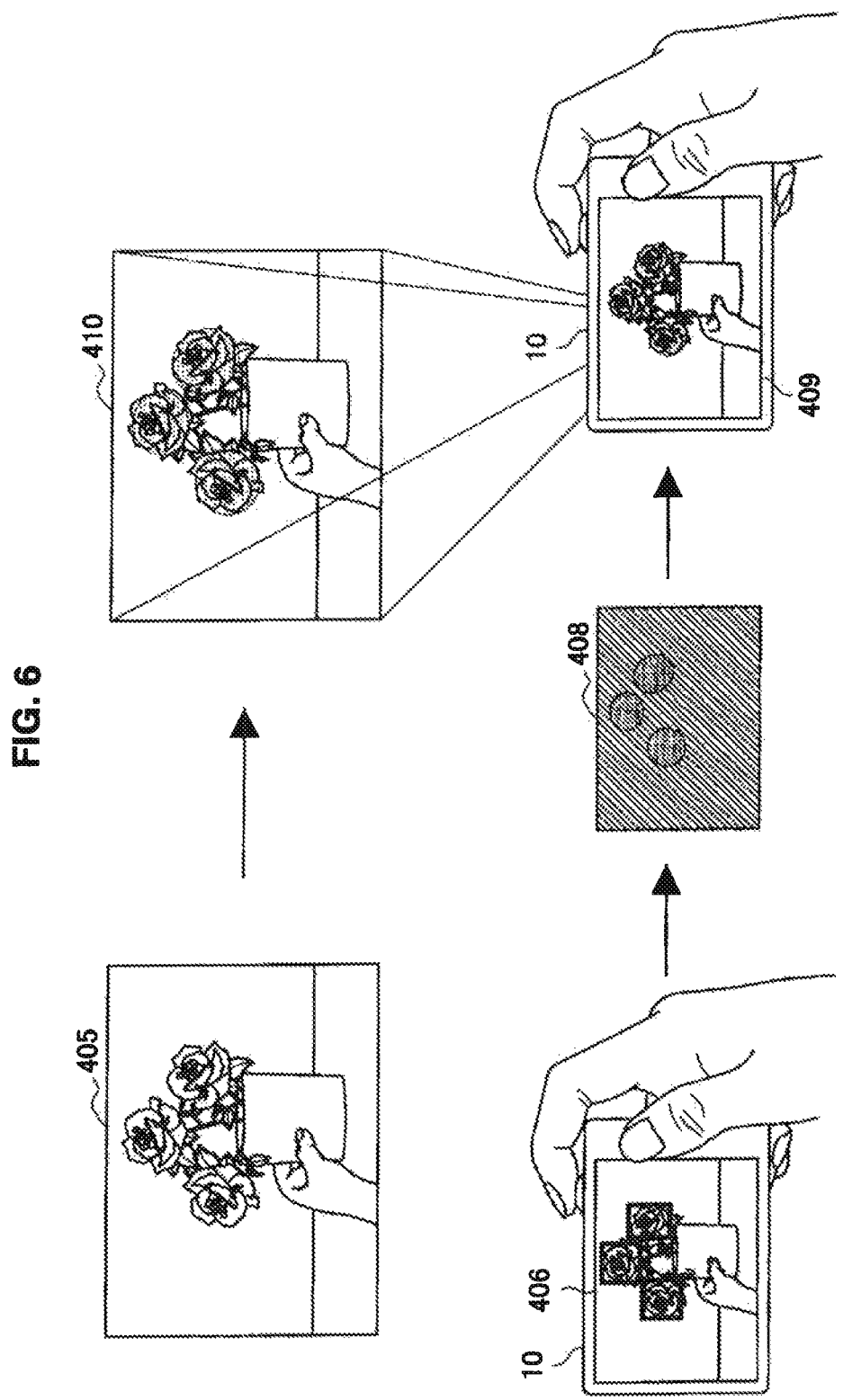
FIG. 6 is an explanatory diagram illustrating an example of a projection image emitted according to the embodiment.

An example of a projection image emitted by the emission device 13 will be hereinafter explained with reference to FIGS. 6 to 16. FIG. 6 shows a case where a projection image is projected onto an object having a particular color so that a color different from the particular color is applied to the object. In FIG. 6, for example, the subject includes a plurality of white flowers. First, the analyzing unit 102 detects objects 406 having the particular color included in the subject 405. As shown in an explanatory diagram 406, a plurality of "white flowers" in which a white region has a certain size or more is detected. Then, the projection image according to the shapes of the objects 406 and the positions of the objects 406 is generated, and the generated projection image is projected onto the subject. As shown in an explanatory diagram 408, a projection image having a color different from white such as pink is generated and is emitted onto the regions of the "white flowers". Therefore, a color different from the original color is emitted onto the subject, and the subject onto which the projection image is projected can be captured as an image.

Figure 7:
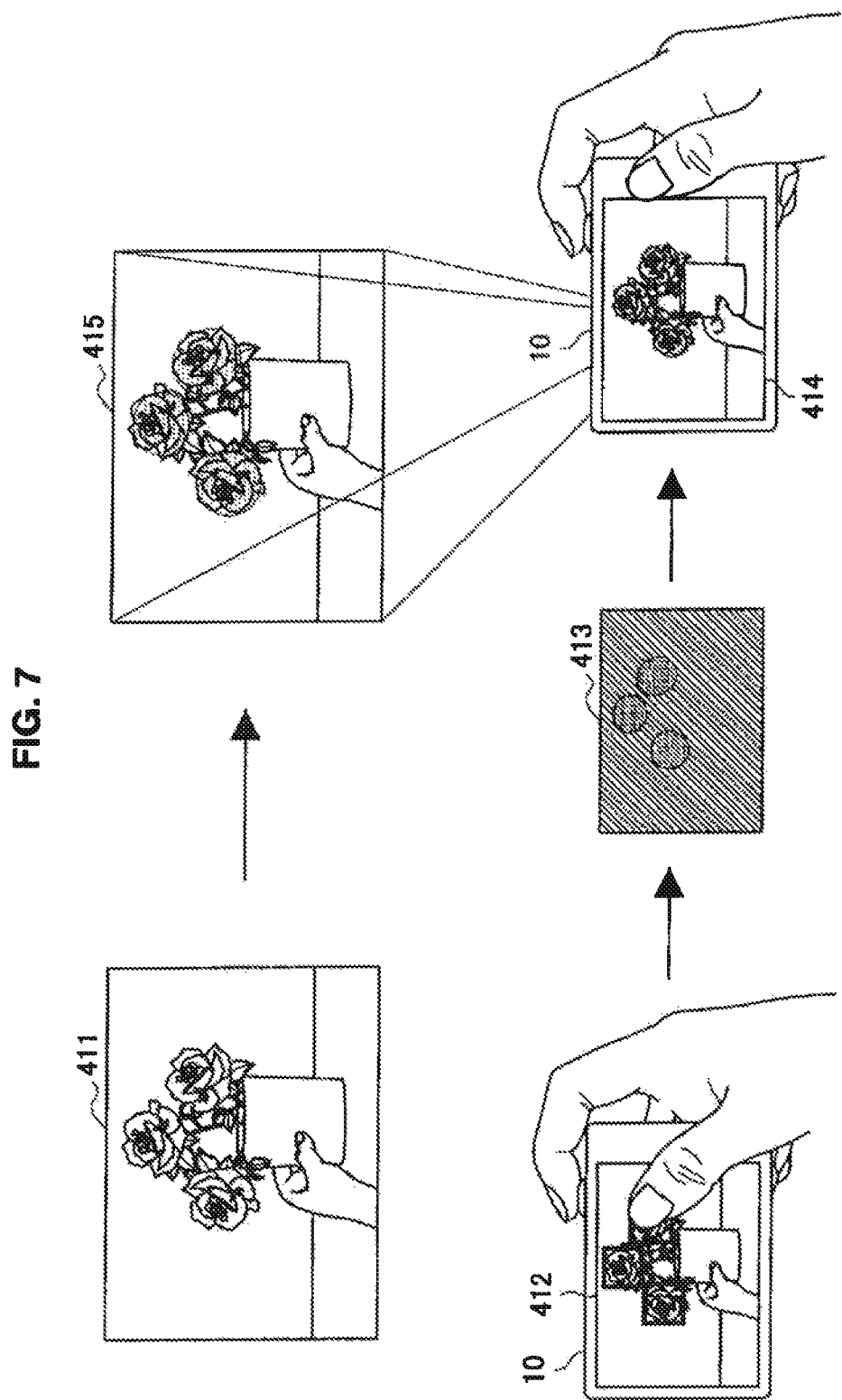
FIG. 7 is an explanatory diagram illustrating an example of a projection image emitted according to the embodiment.

As shown in FIG. 7, when the display screen is a touch panel, an object included in the subject onto which a projection image is emitted may be selected by user's input. As shown in an explanatory diagram 412, when the "white flowers" are selected by user's input, objects in which a white region has a certain size or more are selected. Objects having the same shape or the same color as the object selected by user's input may also be selected at the same time. Then, the projection image according to the shapes of the objects 412 and the positions of the objects 412 is generated, and the generated projection image is projected onto the subject. As shown in an explanatory diagram 413, a projection image having a color different from white such as pink is generated and is emitted onto the region of the "white flowers" selected by a user.

Figure 8:
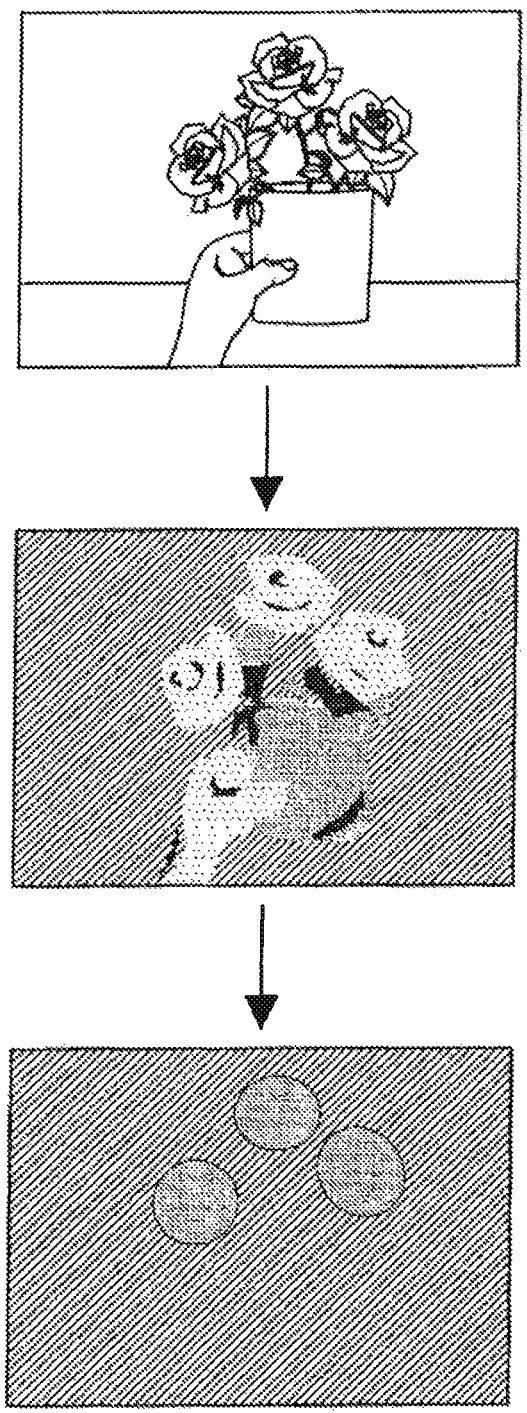
FIG. 8 is an explanatory diagram illustrating an example of a projection image emitted according to the embodiment.

FIG. 8 is an explanatory diagram illustrating an internal processing when the projection images shown in FIGS. 6 and 7 are projected. As shown in FIG. 8, first, the image capturing device 12 captures an image of a subject, and analyzes regions such as objects and colors included in the captured image. Then, a projection image is generated based on the analysis result. In the example shown in FIG. 8, objects in which a white region has a certain size or more are detected from the captured image, and a projection image is generated such that a projection color is arranged so as to exert effect only on the pixels constituting the objects and black pixels are arranged for pixels constituting those other than the objects in question. Then, as a result of emission of the generated projection image, the projection color is emitted onto portions of the subject in which a white region has a certain size or more.

Figure 9:
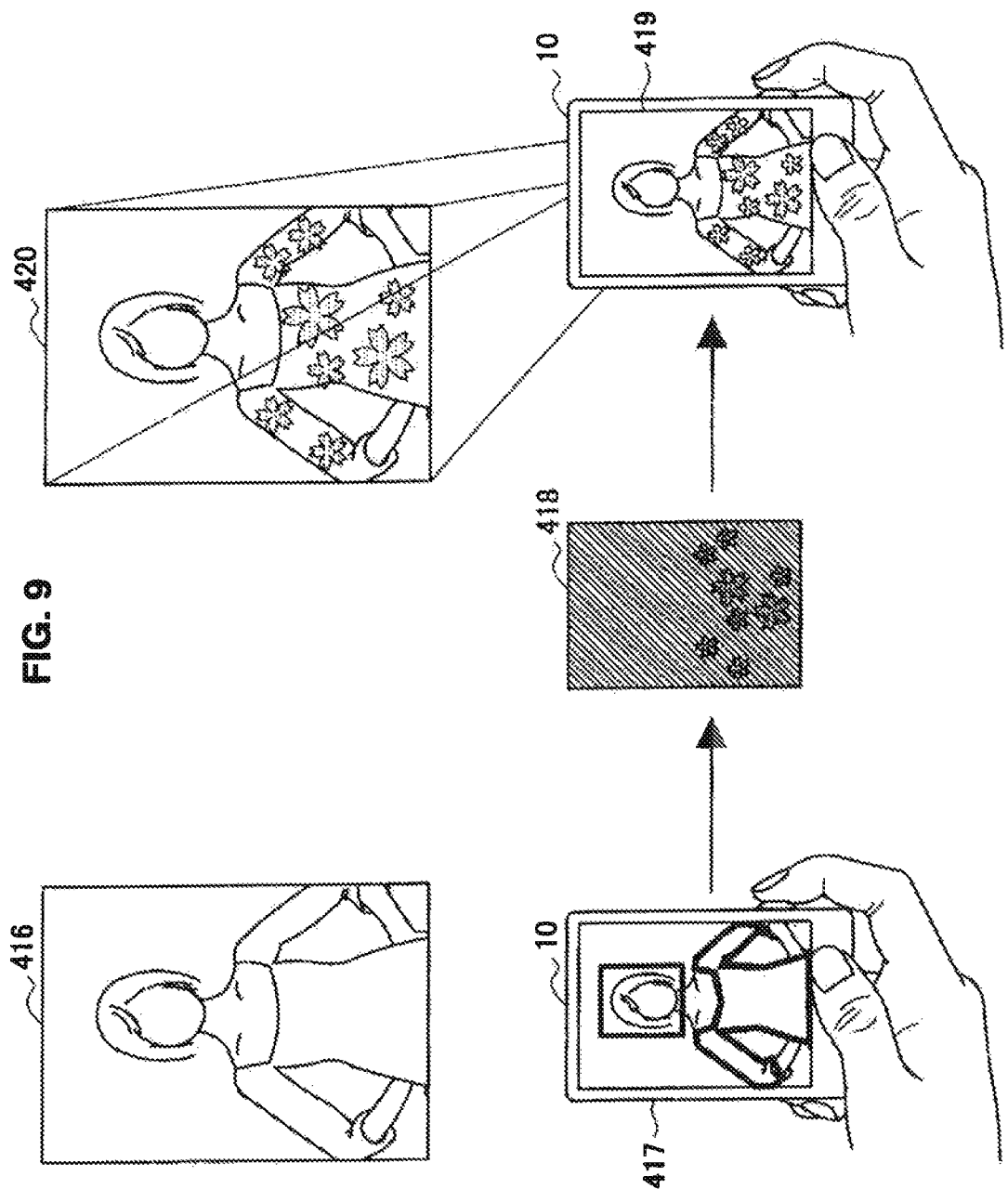
FIG. 9 is an explanatory diagram illustrating an example of a projection image emitted according to the embodiment.

FIG. 9 shows an example where a particular region is detected, and a projection image such as a pattern and texture is emitted onto the detected region. As shown in FIG. 9, an image 417 captured by the image capturing device 12 is analyzed, and a face included in a subject is detected. Then, as shown in the explanatory diagram 417, positions of a body and clothes are detected based on an arrangement between the size of the face and the size of the subject. Then, as shown in an explanatory diagram 418, a projection image to be emitted onto the regions at the positions of the body and the clothes is generated. In the explanatory diagram 418, a projection image for emitting a flower pattern onto the region of the clothes is generated. Then, as shown in an explanatory diagram 420, the flower pattern is emitted onto the region of the clothes of the subject.

Figure 10:
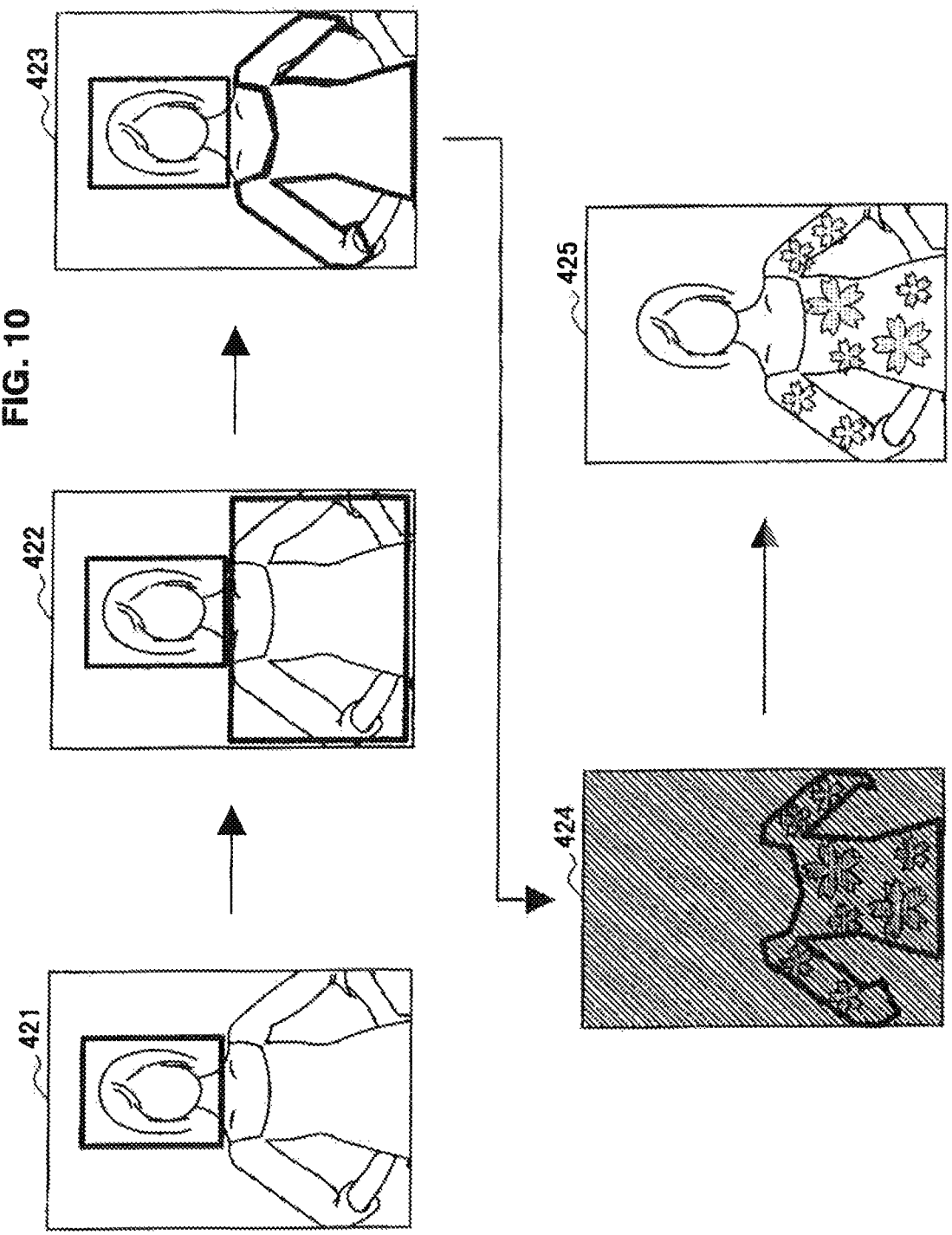
FIG. 10 is an explanatory diagram illustrating an example of a projection image emitted according to the embodiment.

Now, the internal processing for emitting the projection image shown in FIG. 9 will be explained with reference to FIG. 10. As shown in an explanatory diagram 421 of FIG. 10, first, a face included in a subject is recognized from an image captured by the image capturing device 12. Then, as shown in an explanatory diagram 422, a body is estimated from a recognition result of a face. Further, as shown in an explanatory diagram 423, a possible projection region is estimated from the estimated region of the body. In this case, the white region in the body is adopted as the possible projection region. Then, a projection image is generated so as to project a predetermined pattern onto the possible projection region estimated in the explanatory diagram 423. Then, as shown in an explanatory diagram 425, the generated projection image is emitted onto the subject.

Figure 11:
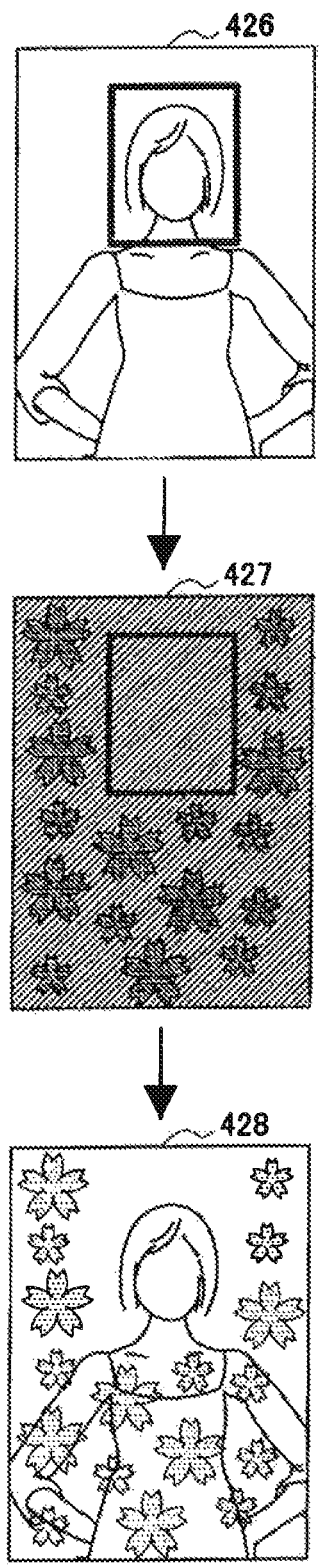
FIG. 11 is an explanatory diagram illustrating an example of a projection image emitted according to the embodiment.

Subsequently, an example will be explained with reference to FIG. 11, in which a particular object is detected, and a projection image is emitted avoiding the detected object. As shown in an explanatory diagram 426 of FIG. 11, first, a face included in a subject is recognized from an image captured by the image capturing device 12. Then, a projection image shown in an explanatory diagram 427 is generated to project a predetermined pattern onto a region other than the recognized region of the face. Then, as shown in an explanatory diagram 428, the generated projection image is emitted onto the subject.

Figure 12:
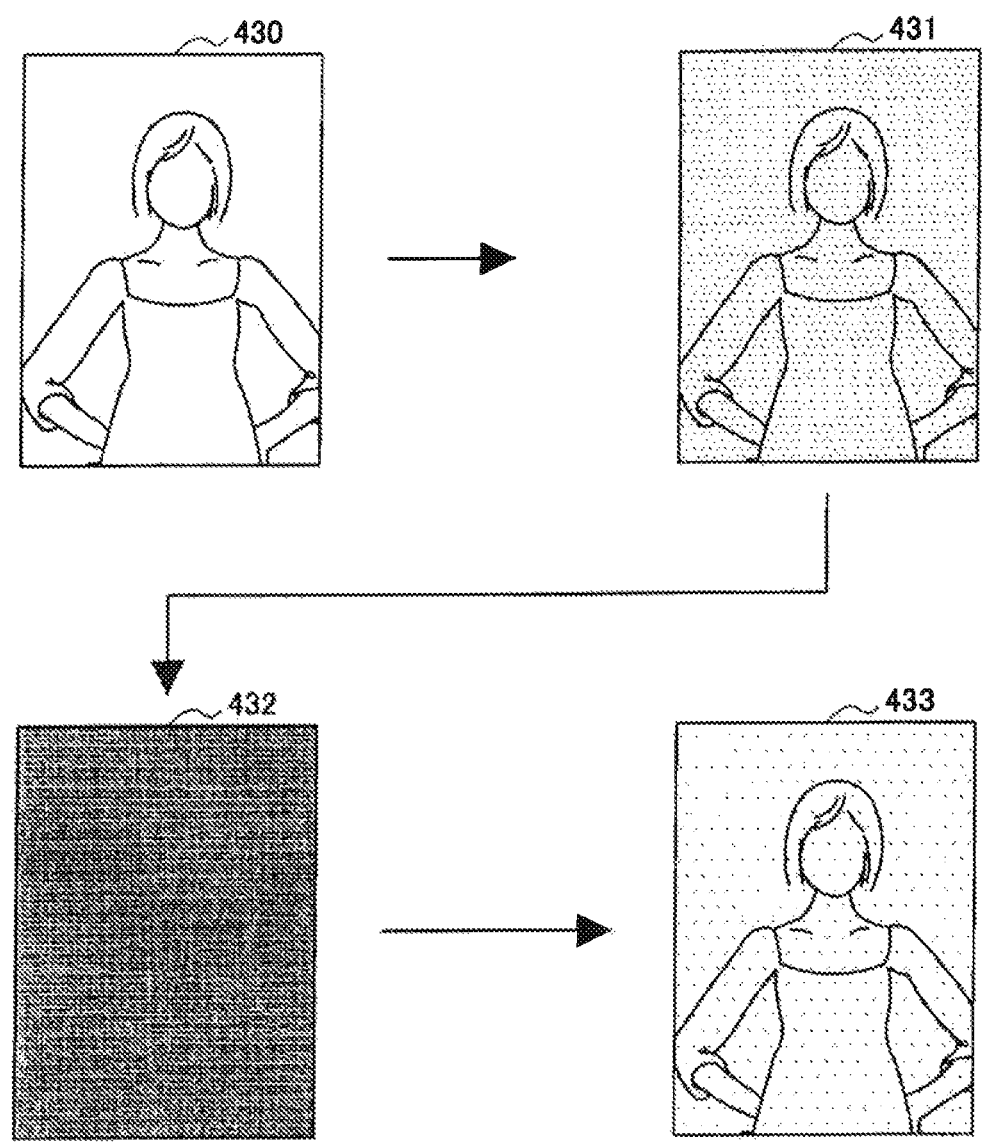
FIG. 12 is an explanatory diagram illustrating an example of a projection image emitted according to the embodiment.

Subsequently, a case will be explained with reference to FIG. 12, where a projection image is generated using a predicted image. As described above, when the storage unit 108 stores the predicted image, a projection image can be generated according to a comparison result obtained by comparing the predicted image with the emission image onto which the projection image is projected. As shown in an explanatory diagram 430 of FIG. 12, first, the image capturing device 12 captures an image of a subject, and analyzes the image of the subject. Then, as shown in an explanatory diagram 431, a projection image having a predetermined color is emitted onto the subject.

Then, the predicted image stored in the storage unit 108 and the emission image as shown in the explanatory diagram 431 are compared, and a difference therebetween is detected. A projection image as shown in an explanatory diagram 432 is generated according to the difference. For example, in the explanatory diagram 431, a projection image capable of outputting yellow color effect is emitted onto the subject. The yellow color effect caused by the predicted image and the yellow color effect of the emission image are compared. When the yellow color effect exerted on the emission image is strong, a projection image exerting a lighter yellow color effect is generated. Then, as shown in an explanatory diagram 433, the generated projection image is emitted onto the subject.

Figure 13:
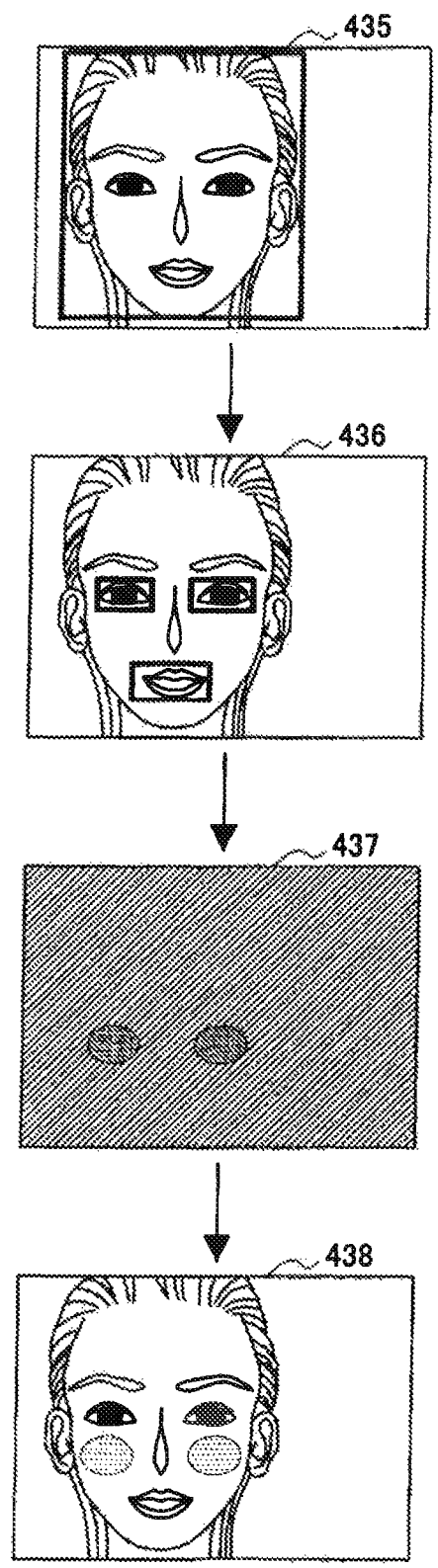
FIG. 13 is an explanatory diagram illustrating an example of a projection image emitted according to the embodiment.

Subsequently, emission of a projection image where a subject is a face will be explained with reference to FIG. 13. As shown in FIG. 13, first, an image captured by the image capturing device 12 (explanatory diagram 435) is analyzed, and as shown in an explanatory diagram 436, the positions of the mouth and the eyes are detected in the face. Then, a projection image to be emitted onto the face is obtained from the storage unit 108, and a projection image as shown in an explanatory diagram 437 is generated. In the explanatory diagram 437, the positions of cheeks in the face are identified from the positions of the mouth and the eyes in the face, and a projection image is generated to emit a rouge color such as pink onto the positions of the cheeks in the face. Then, as shown in an explanatory diagram 438, the generated projection image is projected onto the subject.

Figure 14:
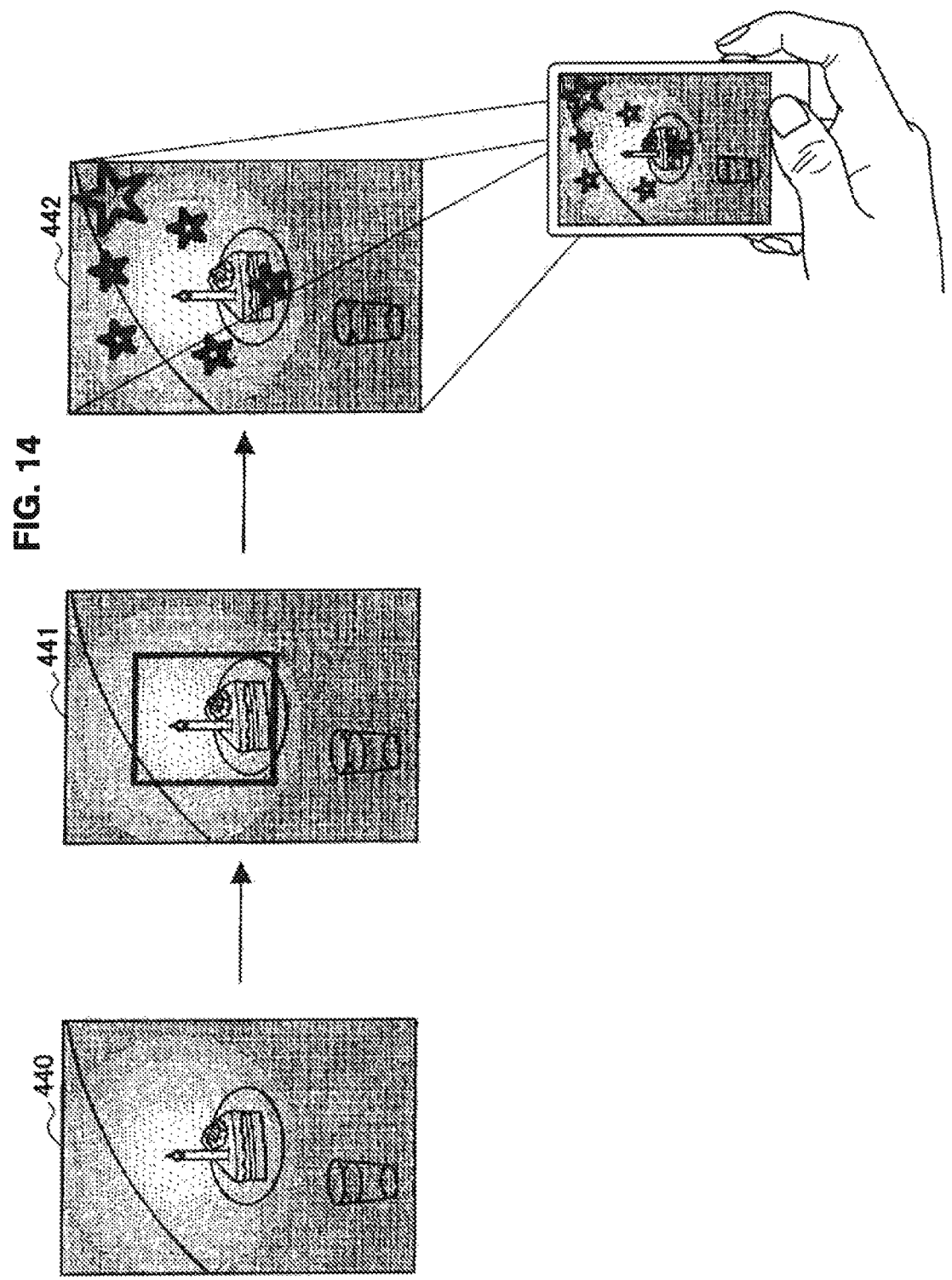
FIG. 14 is an explanatory diagram illustrating an example of a projection image emitted according to the embodiment.

Subsequently, emission of a projection image according to a brightness of a captured image will be explained with reference to FIG. 14. As shown in FIG. 14, first, an image captured by the image capturing device 12 (explanatory diagram 440) is analyzed, and as shown in an explanatory diagram 441, a highly bright region is detected. Then, when a region having a brightness equal to or higher than a certain level is detected, a projection image is generated according to the level of the brightness. In an explanatory diagram 441, a region around a candle of a cake is detected as a region having a brightness higher than other regions. Then, as shown in an explanatory diagram 442, the generated projection image is projected onto the subject. In the explanatory diagram 442, a star pattern is emitted to a region around the candle of the cake detected as the highly bright region.

Figure 15:
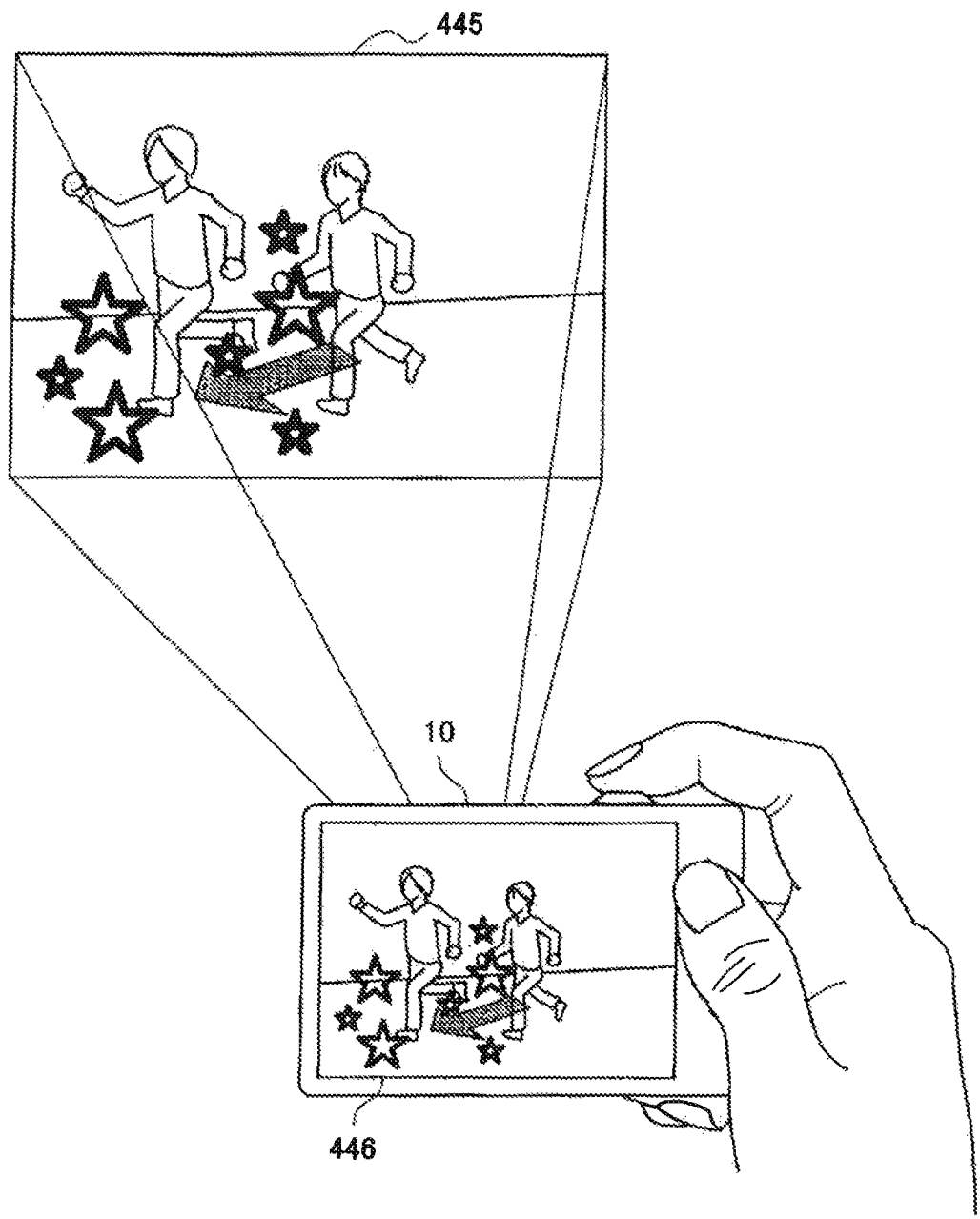
FIG. 15 s an explanatory diagram illustrating an example of a projection image emitted according to the embodiment.

Subsequently, emission of a projection image according to movement of a target to be photographed will be explained with reference to FIG. 15. As shown in FIG. 15, movement of a subject is detected from a motion picture captured by the image capturing device 12. For example, the movement of the subject may be detected by detecting change of pixel values. Then, a projection image is generated according to the movement of the detected object. As shown in an explanatory diagram 445, the subject running to the left is detected, and a star pattern is emitted in the direction the subject is running. The projection image according to the movement of the object is emitted while the projection image is moved together with the subject who is running in the direction in which the subject is running.

Figure 16:
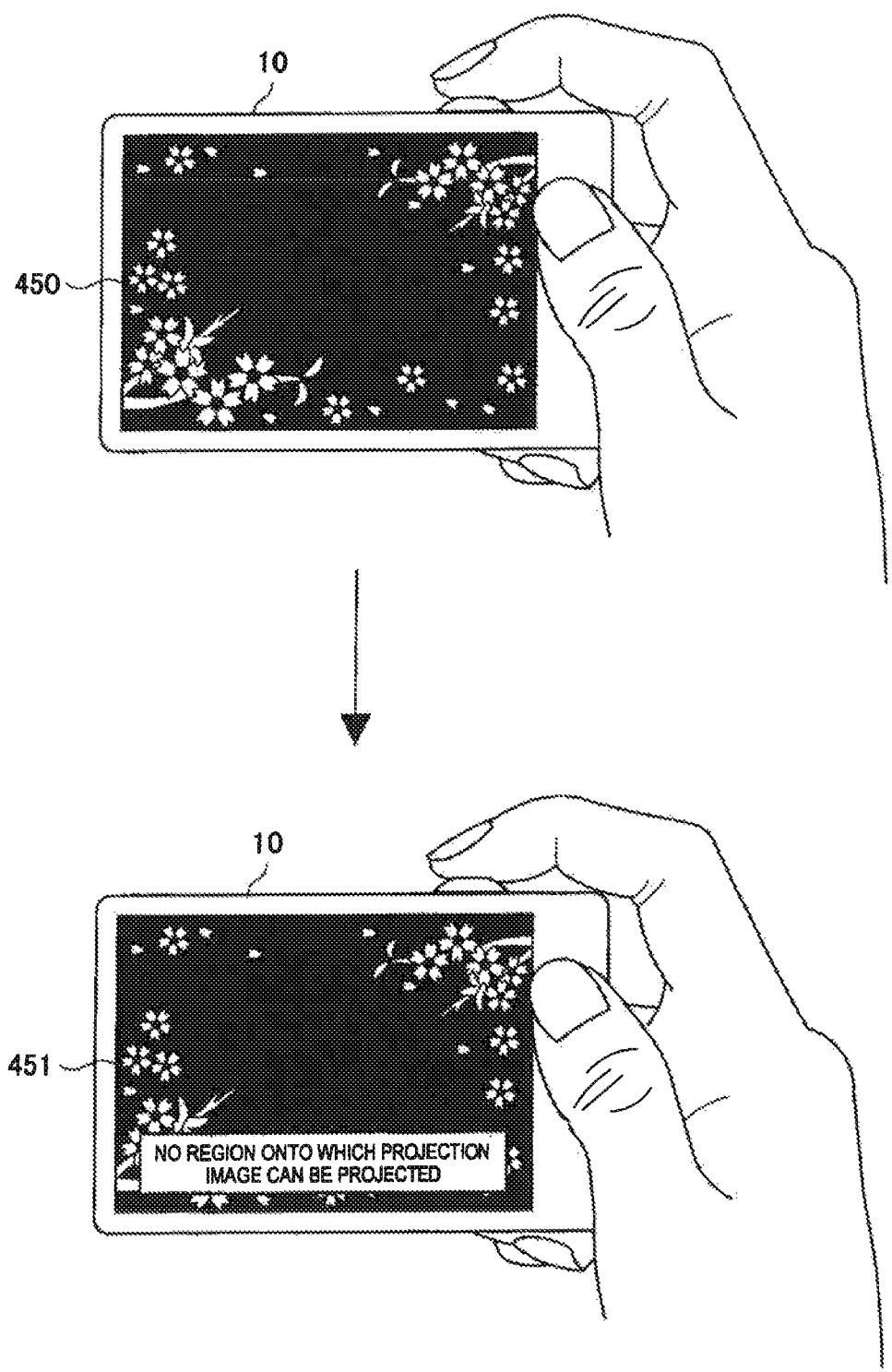
FIG. 16 is an explanatory diagram illustrating an example of a projection image emitted according to the embodiment.

As shown in FIG. 16, the analyzing unit 102 analyzes an image captured by the image capturing device 12. When it is determined that a subject has no region onto which a projection image can be projected, a message may be presented to tell that there is on possible projection region. An example of a case where a subject does not have a region onto which a projection image can be projected is that the background color is black and the like, and even when the projection image is emitted, the projection image may not be formed on the subject. For example, as shown in an explanatory diagram 450, when the background of the captured image is black, a dialogue "there is no possible projection region" is displayed as shown in an explanatory diagram 451.

<2-3. Operation of Information Processing Apparatus in Detail>

Figure 17:
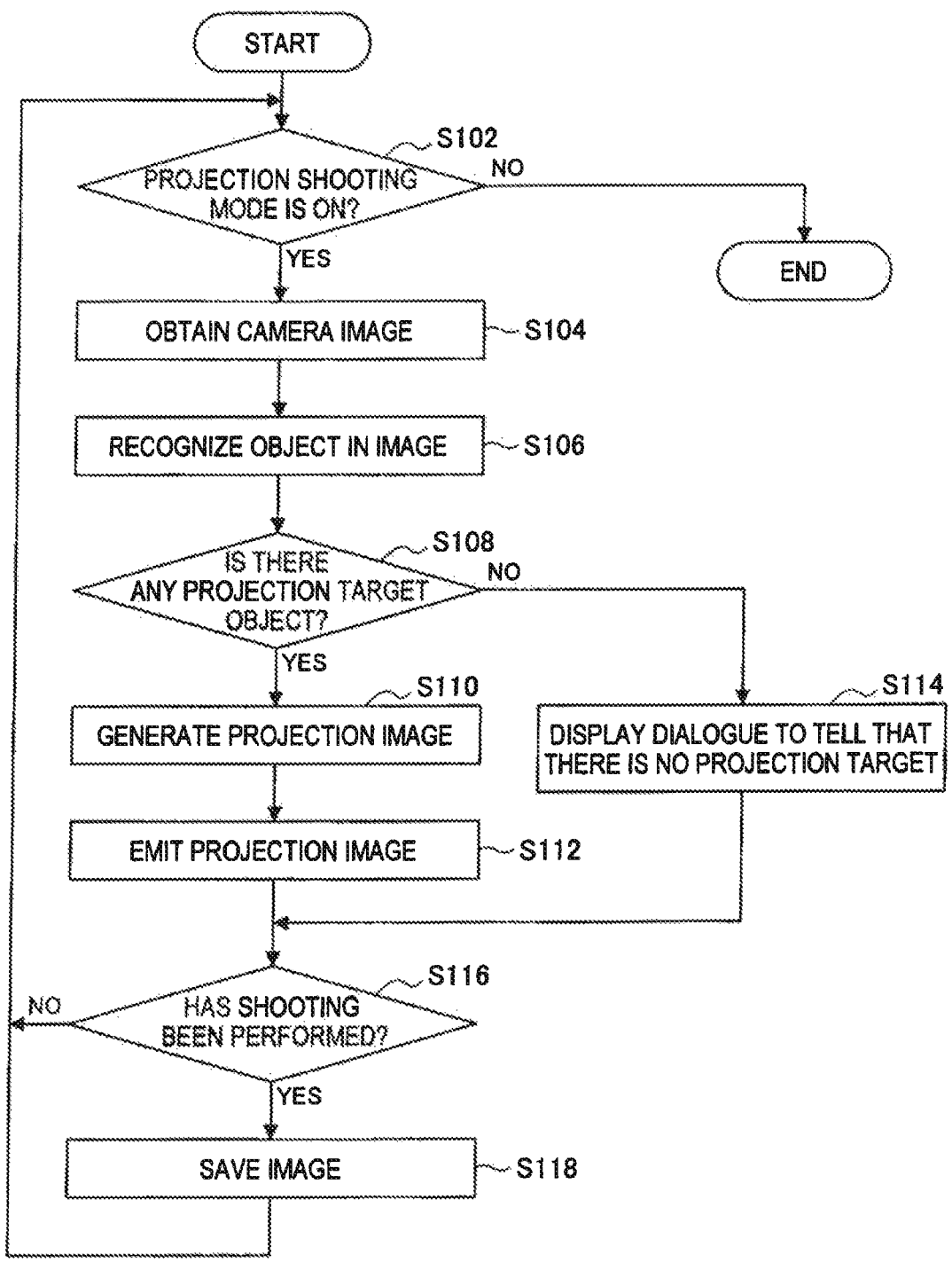
FIG. 17 is a flowchart illustrating operation of the information processing apparatus according to the embodiment in detail.
Figure 18:
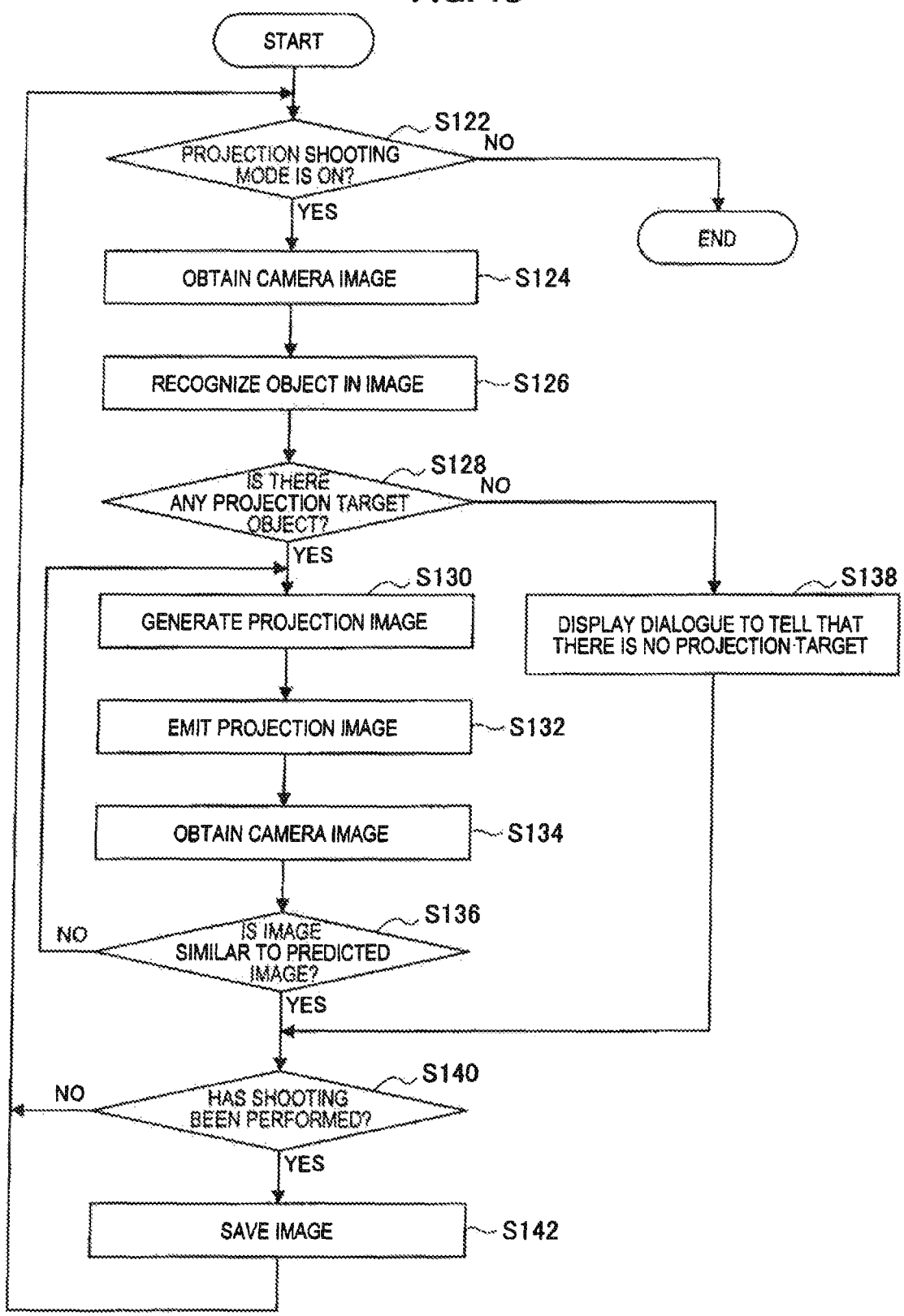
FIG. 18 is a flowchart illustrating operation of the information processing apparatus according to the embodiment in detail.

The functions of the control unit of the information processing apparatus 10 have been hereinabove explained. Subsequently, operation of the information processing apparatus 10 will be explained in detail with reference to FIGS. 17 to 18. FIGS. 17 and 18 are flowcharts each illustrating operation of the information processing apparatus 10 in detail.

As shown in FIG. 17, first, the information processing apparatus 10 determines whether a shooting mode is a projection shooting mode onto which a projection image can be emitted (S102). When the shooting mode is determined to be the projection shooting mode in step S102, an image captured by the image capturing device 12 is obtained (S104).

Then, the analyzing unit 102 recognizes objects included in the image obtained in step S104 (S106). Then, a determination is made as to whether the objects recognized in step S106 include any target object onto which a projection image can be emitted (S108). The determination in step S108 can be made by determining whether the storage unit 108 stores a projection image corresponding to the object recognized in step S106. Further, whether the projection image can be emitted may be determined by detecting a background color of the image.

When the subject is determined to include a target object onto which a projection image can be emitted in step S108, the projection image corresponding to the target object is obtained from the storage unit 108, and a projection graphic image is generated (S110). Then, the projection graphic image generated in step S110 is emitted onto the subject (S12). When the subject is determined not to include a target object onto which a projection image can be emitted in step S108, a dialogue is displayed on the display screen to tell that there is no projection target (S114).

Then, a determination is made as to whether photo shooting is performed or not (S116). When it is determined that photo shooting is performed in step S116, the captured image is saved (S118). When it is determined that photo shooting is not performed in step S116, processings of step S102 and subsequent steps are repeated. The processings shown in the flowchart of FIG. 17 have been hereinabove explained. Subsequently, processings as shown in the flowchart of FIG. 18 will be explained.

FIG. 18 is a flowchart illustrating operation of the information processing apparatus 10 in detail where the storage unit 108 stores a predicted image. As shown in FIG. 18, first, the information processing apparatus 10 determines whether a shooting mode is a projection shooting mode in which a projection image can be emitted (S122). When the shooting mode is determined to be the projection shooting mode in step S122, an image captured by the image capturing device 12 is obtained (S124).

Then, the analyzing unit 102 recognizes objects included in the image obtained in step S104 (S126). Then, a determination is made as to whether the objects recognized in step S126 include any target object onto which a projection image can be emitted (S128). When the subject is determined to include a target object onto which a projection image can be emitted in step S128, the projection image corresponding to the target object is obtained from the storage unit 108, and a projection graphic image is generated (S130). Then, a projection graphic image generated in step S130 is emitted onto the subject (S132). In this case, in step S136, it is considered that the storage unit 108 stores a predicted image for predicting an image where a desired projection image is emitted onto the object recognized in step S126.

Then, an image of a subject onto which a graphic image is projected in step S132 is obtained (S134). Then, it is determined that the emission image obtained in step S134 has become similar to the predicted image stored in the storage unit 108 (S136). When it is determined that the emission image has become similar to the predicted image in step S136, the processing of step S140 is executed. When it is determined that the emission image has not become similar to the predicted image in step S136, the processings of step S130 and subsequent steps are repeated.

When the subject is determined not to include a target object onto which a projection image can be emitted in step S128, a dialogue is displayed on the display screen to tell that there is no projection target (S138).

Then, a determination is made as to whether photo shooting is performed or not (S40). When it is determined that photo shooting is performed in step S140, the captured image is saved (S142). When it is determined that photo shooting is not performed in step S140, the processings of step S122 and subsequent steps are repeated. The processings shown in the flowchart of FIG. 18 have been hereinabove explained.

As described above, according to the first embodiment, an image of a subject captured by the image capturing device 12 is analyzed, and the projection image according to the analysis result of the image is emitted by the emission device 13 onto the subject. Therefore, the graphic image appropriate for the captured image can be projected. The first embodiment has been hereinabove explained.

3. Second Embodiment

Subsequently, the second embodiment will be explained. As described above, in the techniques in the related art, a graphic image is projected onto a position recognized using a marker and the like in advance. Therefore, there is an issue in that a graphic image may not be projected onto a position directly specified by a user on the display screen which displays the captured image. Accordingly, an information processing apparatus 20 according to the embodiment of the present invention has been created in view of the above circumstance as one of issues taken into consideration. According to the information processing apparatus 20 according to the present embodiment, a desired graphic image can be projected with intuitive operation performed by a user.

<3-1. Hardware Configuration of Information Processing Apparatus>

Figure 19:
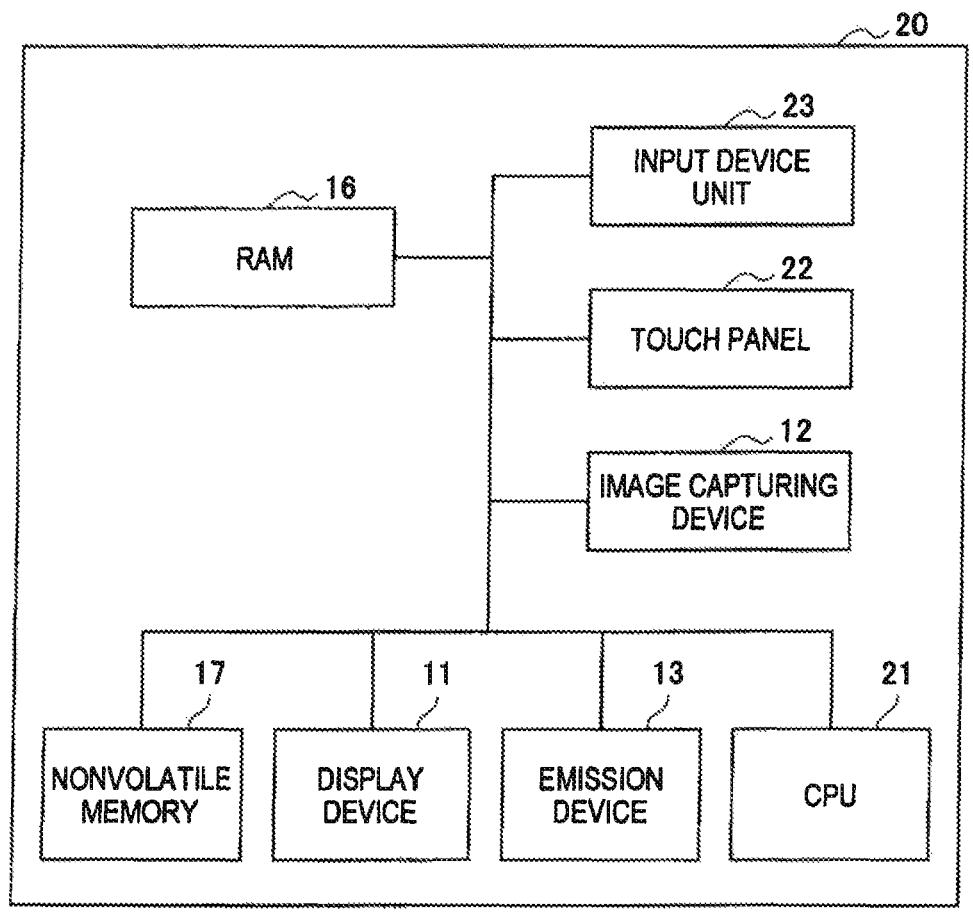
FIG. 19 is a block diagram illustrating a hardware configuration of an information processing apparatus according to a second embodiment of the present invention.

A hardware configuration of the information processing apparatus 20 will be explained with reference to FIG. 19. FIG. 19 is a block diagram illustrating a hardware configuration of the information processing apparatus 20. As shown in FIG. 10, the information processing apparatus 20 includes a display device (display) 11, an image capturing device (camera) 12, an emission device (projector) 13, a CPU 21, an input device 15, a RAM (Random Access Memory) 16, a nonvolatile memory 17, a touch panel 22, a motion sensor 23, and the like. In the present embodiment, the camera 12 and the projector 13 are arranged at fixed positions of the casing of the information processing apparatus 20.

The same configurations as those of the first embodiment are not explained in the explanation below. Configurations different from the first embodiment will be particularly explained in detail. The touch panel 22 has two functions, i.e., display and input. The touch panel 22 according to the present embodiment can detect input to the touch panel, which is given with a finger and the like of the user, and a specified position is obtained. The detection method may be any method as long as position information of a manipulating object on the display can be detected. Examples of the detection method include a resistive film method using a thin metallic film constituting a transparent electrode, a capacitive method for detecting a position by finding a change of capacitance between a finger tip and a conductive film, an infrared light shielding method, and an electromagnetic induction method.

In the following explanation, for example, a method for detecting operation of the manipulating object using an electrostatic touch panel will be explained in particular. The electrostatic touch panel has electrostatic sensors arranged in a matrix form. The values of the electrostatic sensors keep on changing according to changes of capacitances. When a finger, i.e., a manipulating object, comes into proximity to or contact with an electrostatic sensor, the capacitance detected by the electrostatic sensor increases. The capacitances of the electrostatic sensors can be obtained at a time. The electrostatic touch panel detects and interpolates changes of capacitances of all the electrostatic sensors at a time, thereby detecting operation performed by a finger that is in proximity to or in contact with the electrostatic touch panel. The touch panel 22 outputs the values of the detected capacitances to the CPU 21.

The CPU 21 associates various kinds of information given by the touch panel 22 with display positions of display contents displayed on the display device 11, and analyzes movement of the manipulating object. Then, the CPU 21 recognizes input information given to the information processing apparatus 10 based on analyzed movement of the manipulating object, and executes processing corresponding to the input information. As described above, the user can manipulate the contents displayed on the display screen, and can input the input information.

The motion sensor 23 has a function of detecting a rotation angle and an inclination of a main body of the information processing apparatus 20. The motion sensor 23 may be, for example, an acceleration sensor and a gyro sensor. The information about the rotation angle and the inclination of the information processing apparatus 20 detected by the motion sensor 23 is output to the CPU 21. The CPU 21 detects movement of the main body of the information processing apparatus 20 based on the rotation angle and the inclination output from the motion sensor 23.

<3-2. Functional Configuration of Information Processing Apparatus>

Figure 20:
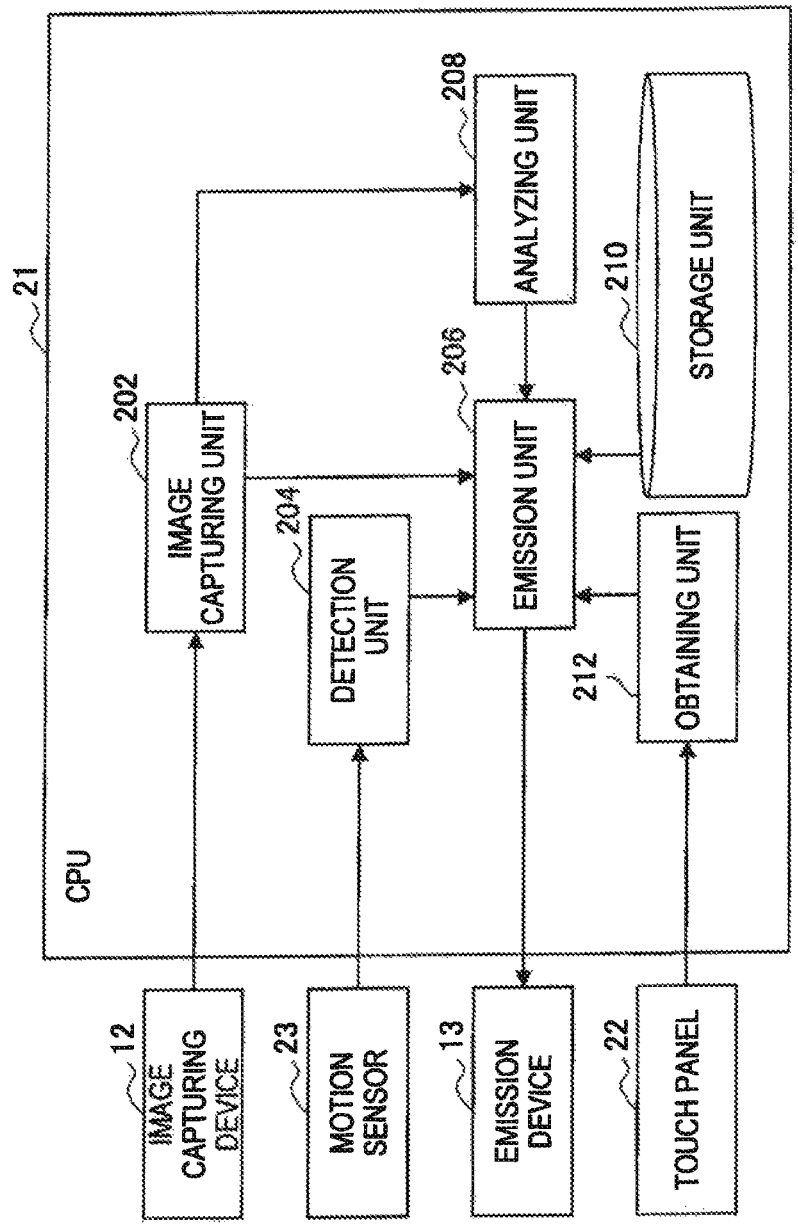
FIG. 20 is a block diagram illustrating a functional configuration of a control unit according to the embodiment.

The hardware configuration of the information processing apparatus 20 has been hereinabove explained. Subsequently, a functional configuration of a control unit (CPU 21) of the information processing apparatus 20 will be explained with reference to FIG. 20. Reference is made to FIGS. 21 to 31 as necessary when the functional configuration of FIG. 20 is explained. FIG. 20 is a block diagram illustrating the functional configuration of the control unit of the information processing apparatus 20.

As shown in FIG. 20, the control unit of the information processing apparatus 20 includes an image capturing unit 202, a detection unit 204, an emission unit 206, an analyzing unit 208, a storage unit 210, an obtaining unit 212, and the like. The image capturing unit 202 has a function of causing an image capturing device 12 to capture an image of the subject. Further, the image capturing unit 202 has a function of capturing an image of the subject onto which the projection image is emitted by the emission unit 206. The image captured by the image capturing unit 202 is provided to the emission unit 206 and the analyzing unit 208.

The emission unit 206 has a function of causing the emission device 13 to emit a projection image based on users input to the subject. The projection image based on user's input is a projection image specified and selected by a user with the touch panel 22 and the like. The projection image may be obtained from the storage unit 108 based on user's input, and may be emitted onto the subject.

Figure 21:
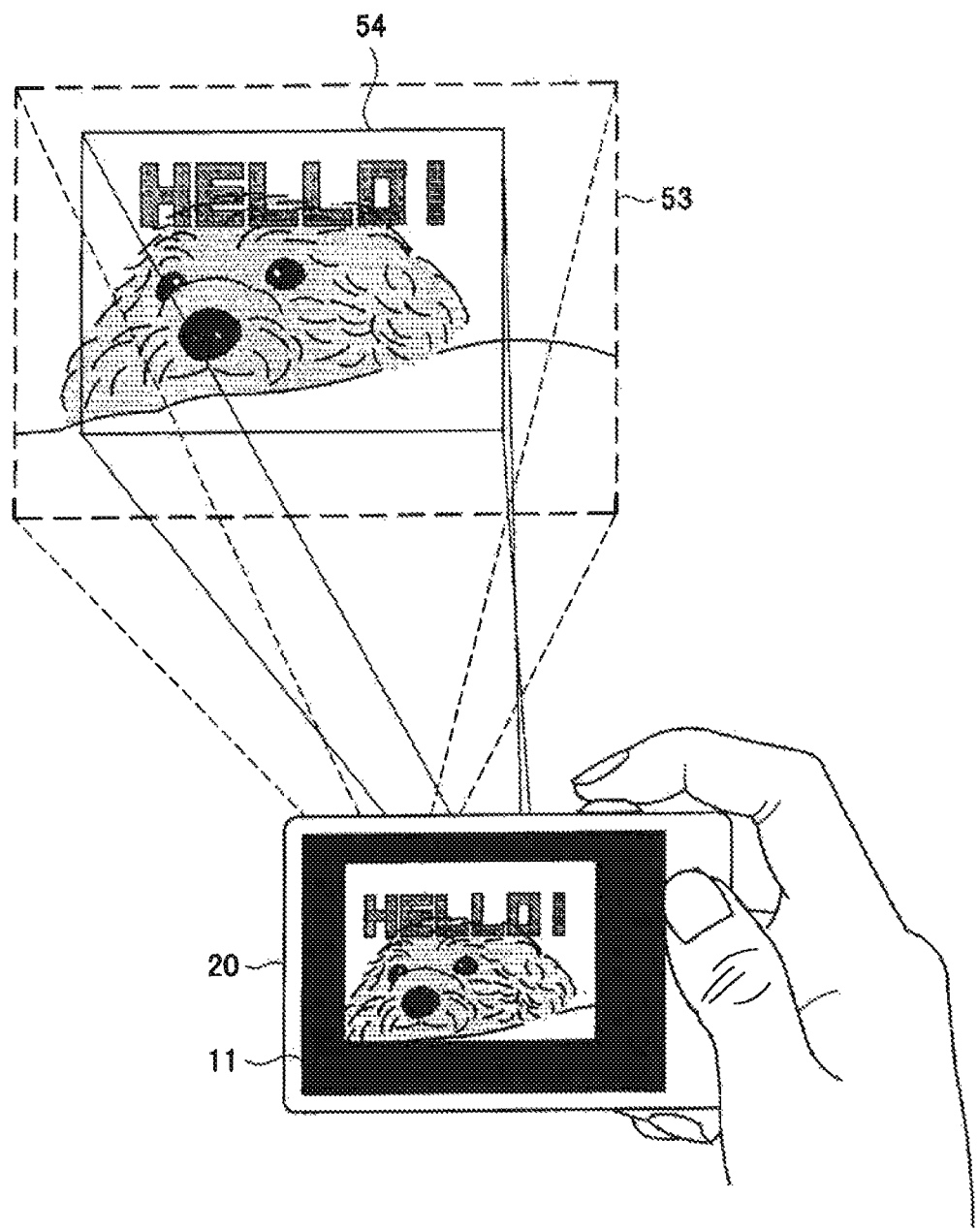
FIG. 21 is an explanatory diagram illustrating an example of a projection image emitted according to the embodiment.

As described above, in the present embodiment, a photo shooting region that can be captured by the image capturing device 12 is in synchronization with a projection region onto which the emission device 13 can emit a projection image. As shown in FIG. 21, when the photo shooting region 53 and the projection region 54 are not in synchronization, the display 11 of the information processing apparatus 20 may indicate the projection region. For example, as shown in FIG. 21, a frame representing the projection region may be displayed on the display 11, and a possible emission region may be presented to a user. In FIG. 21, a possible projection region is a region 53, and a possible emission region is a region 54. Therefore, the frame representing the possible emission region is displayed on the display screen.

Reference is made back to FIG. 20. The obtaining unit 212 has a function of obtaining a specified position specified by user's input on the display screen showing the subject. As described above, a user's input is given from the touch panel 22, and the obtaining unit 212 obtains the user's input on the display screen. The obtaining unit 212 may obtain a projection image drawn by user's operation on the display screen showing a subject, and may select a desired projection image from among projection images displayed on the display screen.

Figure 22:
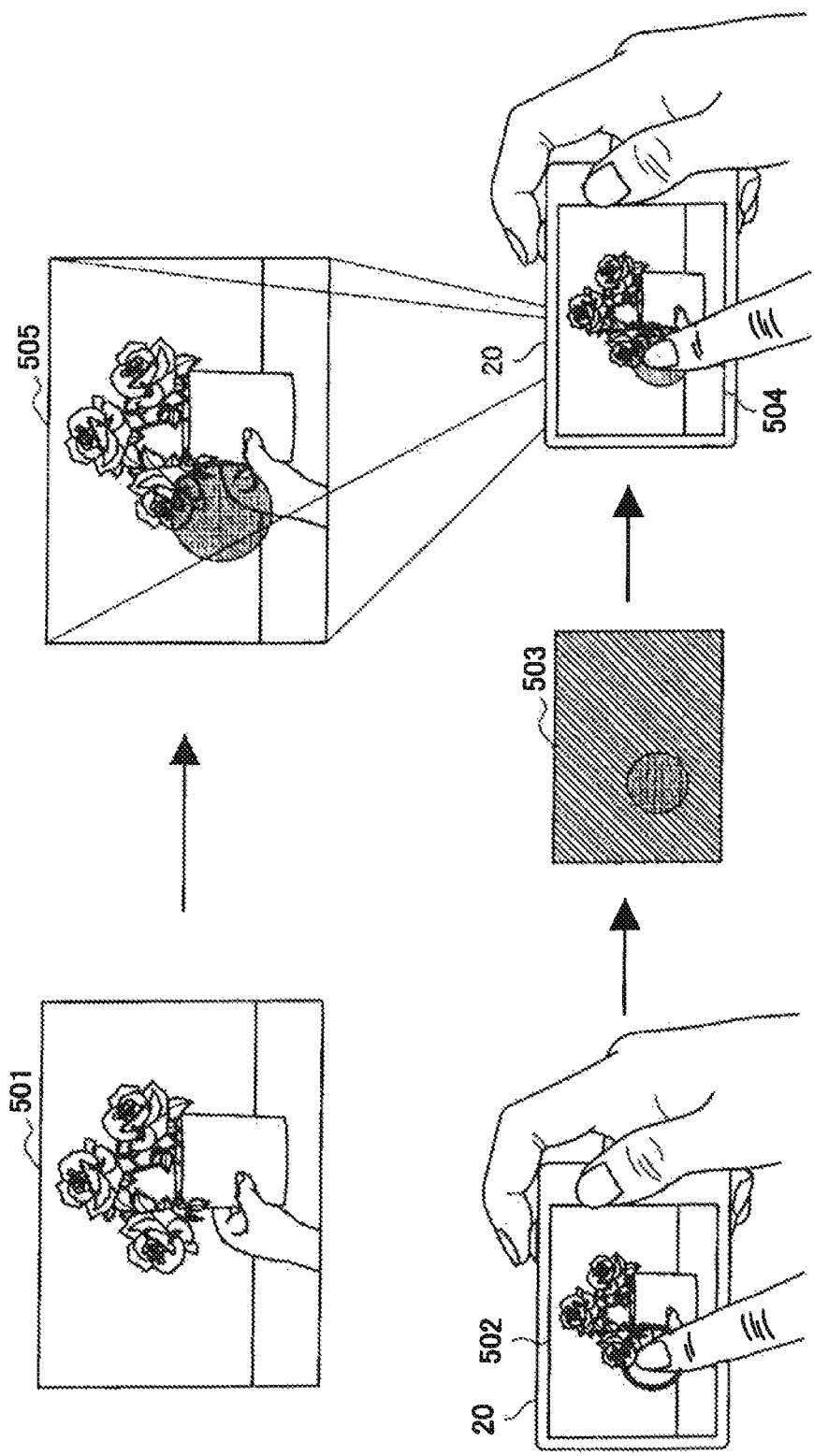
FIG. 22 is an explanatory diagram illustrating an example of a projection image emitted according to the embodiment.

For example, as shown in FIG. 22, an image capturing unit 202 captures an image of a subject 501, and a display image 502 is displayed on the display screen. A user touches the display screen (touch panel 22) to specify a desired position on the display image 502. In the present embodiment, the touch panel 22 is used to specify a desired position within the display image 502. However, the present embodiment is not limited to such example. Alternatively, a desired position may be specified using an input device such as a button and a lever with which a desired position can be specified within the display image 502.

Then, the obtaining unit 212 obtains the specified position specified by a user, and as shown in an explanatory diagram 503, a projection image is generated so that the projection image is emitted onto a specified position. As shown in the explanatory diagram 503, a projection image may be generated so as to emit a predetermined color onto a position specified by a user. Then, as shown in an explanatory diagram 505, the projection image is emitted onto a subject. As shown in an explanatory diagram 504, the image capturing device 12 captures an image of the subject onto which the projection image is emitted. As described above, when the storage unit 108 stores a projection image which is to be emitted, the projection image is obtained from the storage unit 108 based on a user's instruction.

Figure 23:
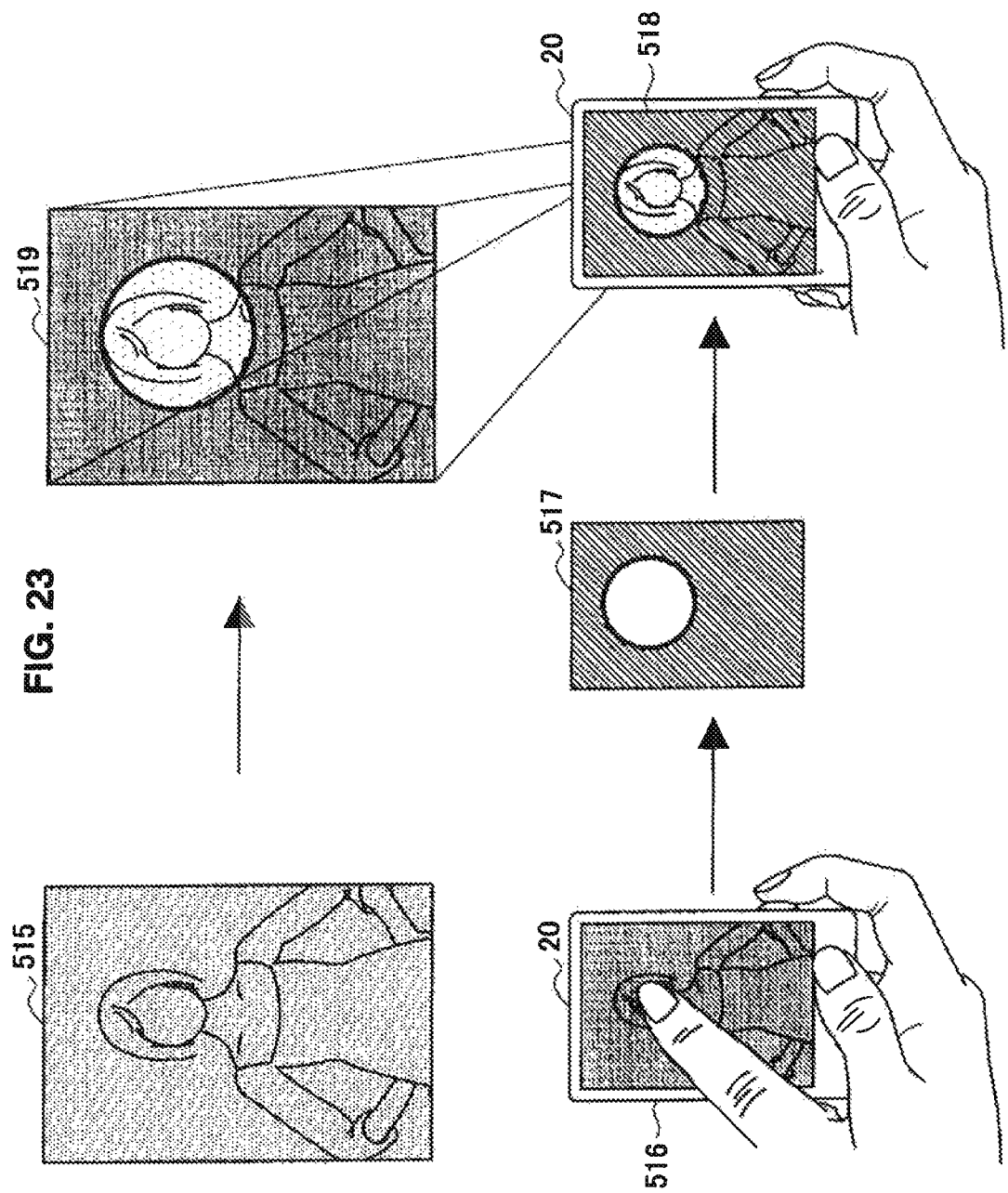
FIG. 23 is an explanatory diagram illustrating an example of a projection image emitted according to the embodiment.

As shown in FIG. 23, a projection image may be emitted to exert illumination effect to a specified position specified by a user. For example, as shown in an explanatory diagram 516, the image capturing device 12 captures an image of a subject 515, and the image is displayed on the display screen. Then, when a user specifies a facial portion of a subject, a projection image is generated to exert illumination effect to a specified portion as shown in an explanatory diagram 517. Then, as shown in an explanatory diagram 519, the projection image is emitted onto the subject. As shown in an explanatory diagram 518, the image capturing device 12 captures an image of the subject onto which the projection image is emitted. In an explanatory diagram 518, a projection image is emitted to illuminate the face of the subject.

Figure 24:
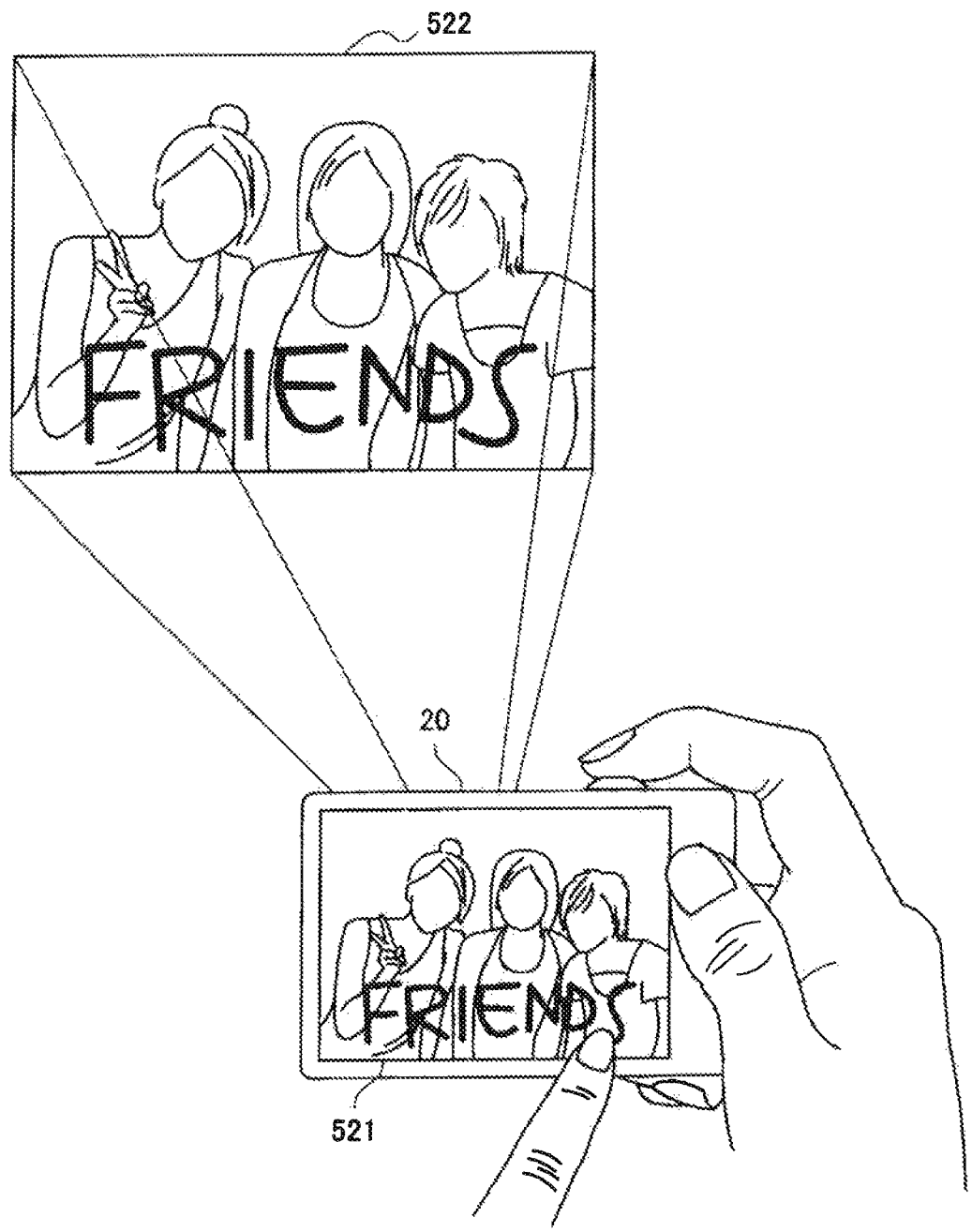
FIG. 24 is an explanatory diagram illustrating an example of a projection image emitted according to the embodiment.

As shown in FIG. 24, a projection image drawn according to user's operation performed on a display screen showing a subject may be emitted onto the subject. For example, as shown in an explanatory diagram 521, when the user writes a text "friend" on the display screen (touch panel), the projection image is generated to emit the text "friend" to the subject. Then, as shown in an explanatory diagram 522, the projection image including the text "friend" written by the user is emitted onto the subject.

Figure 25:
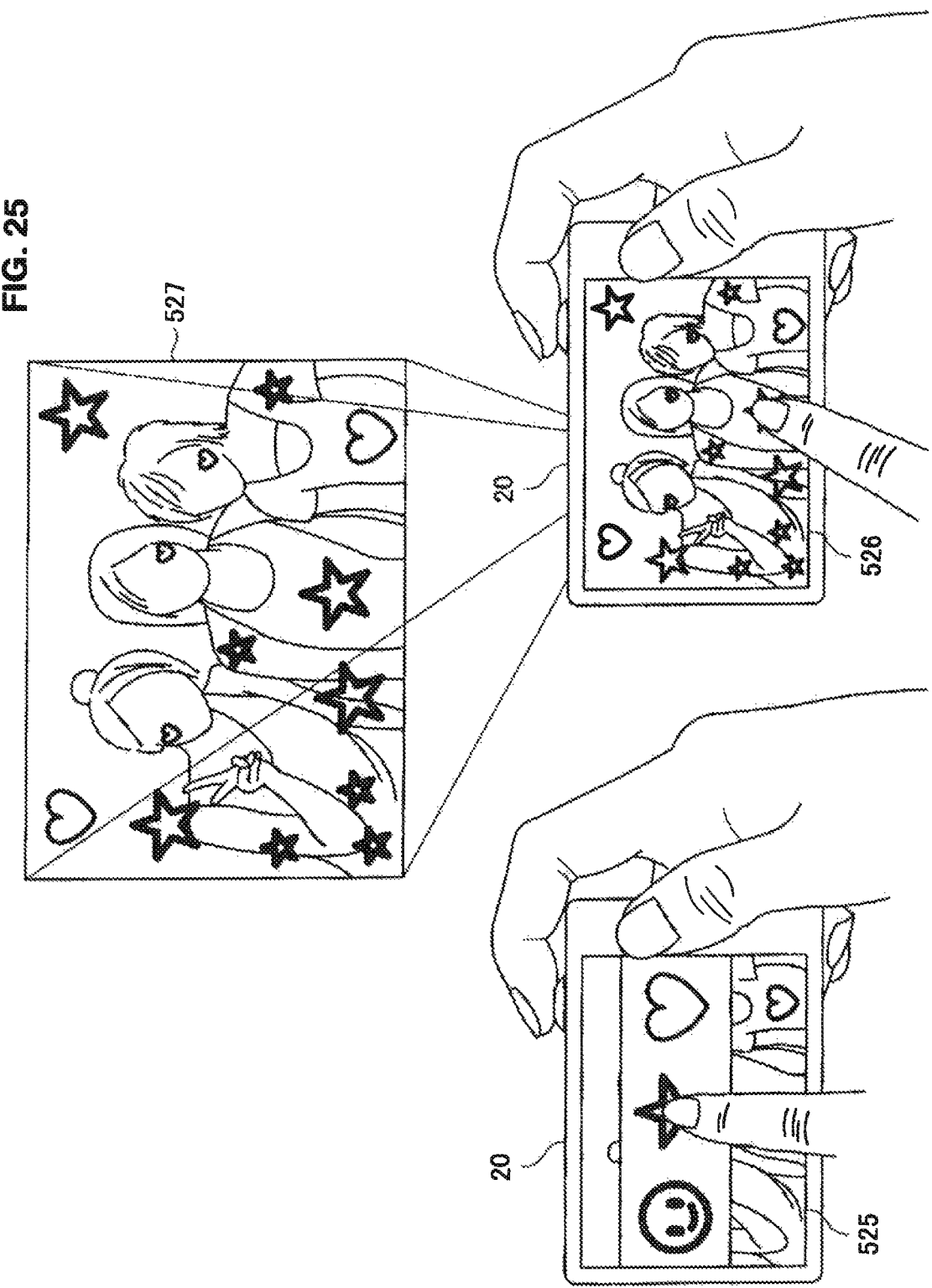
FIG. 25 is an explanatory diagram illustrating an example of a projection image emitted according to the embodiment.

As shown in FIG. 25, a desired projection image may be selected according to user's input from among a plurality of projection images displayed on the display screen. For example, in an explanatory diagram 525, a plurality of graphic images of projection images are displayed on the display screen. The user selects a desired graphic image on the display screen (touch panel). In this case, the user may select a desired graphic image by touching the display screen, or may select a desired graphic image using an input device such as buttons and levers.

Further, as shown in an explanatory diagram 526, a position is specified by user's input, so that the selected graphic image is emitted onto the specified position. Then, as shown in an explanatory diagram 527, a projection image is generated so that the selected graphic image is emitted to the specified position, and the projection image is emitted onto the subject. As described above, the user can emit the projection image onto the subject with intuitive operation such as directly drawing and selecting the graphic image on the display screen.

Explanation about the functional configuration of the information processing apparatus 20 will be continued with reference back to FIG. 20. The analyzing unit 202 has a function of analyzing an image of a subject captured by the image capturing device 202. The analyzing unit 208 extracts feature points of the captured image of the subject, and provides the information about the extracted feature points of the image to the emission unit 206. The emission unit 206 emits a projection image onto the subject according to the feature points of the subject extracted by the analyzing unit 208.

Now, the extraction of the feature points of the subject will be explained with reference to FIG. 26. For example, in an explanatory diagram 505 of FIG. 26, feature points of an image are extracted before persons in the subject move, and a projection image is emitted according to positions of the persons. In the explanatory diagram 505, for example, the projection image is emitted to a region close to the heads of the persons. At this occasion, as shown in an explanatory diagram 507, relative positions of the feature points and the projection image are recorded. Then, as shown in an explanatory diagram 506, feature points of the image are extracted after the persons in the subject move, and a projection image is emitted according to the feature points of the image. In other words, even when the persons in the image move, the emission position is corrected based on the relative positions of the feature points of the persons and the projection image so that the projection image is emitted to a region close to the heads of the persons.

Explanation about the functional configuration of the information processing apparatus 20 will be continued with reference back to FIG. 20. The detection unit 204 uses the motion sensor 23 to detect movement of the body of the information processing apparatus 20. As described above, the rotation speed and the inclination of the main body of the information processing apparatus 20 can be detected by the motion sensor 23. Therefore, the detection unit 204 detects the movement of the main body of the information processing apparatus 20 based on the rotation angle and the inclination output from the motion sensor 23. Then, the emission unit 206 emits a projection image onto a subject according to the movement of the main body of the information processing apparatus 20 detected by the detection unit 204.

Figure 27:
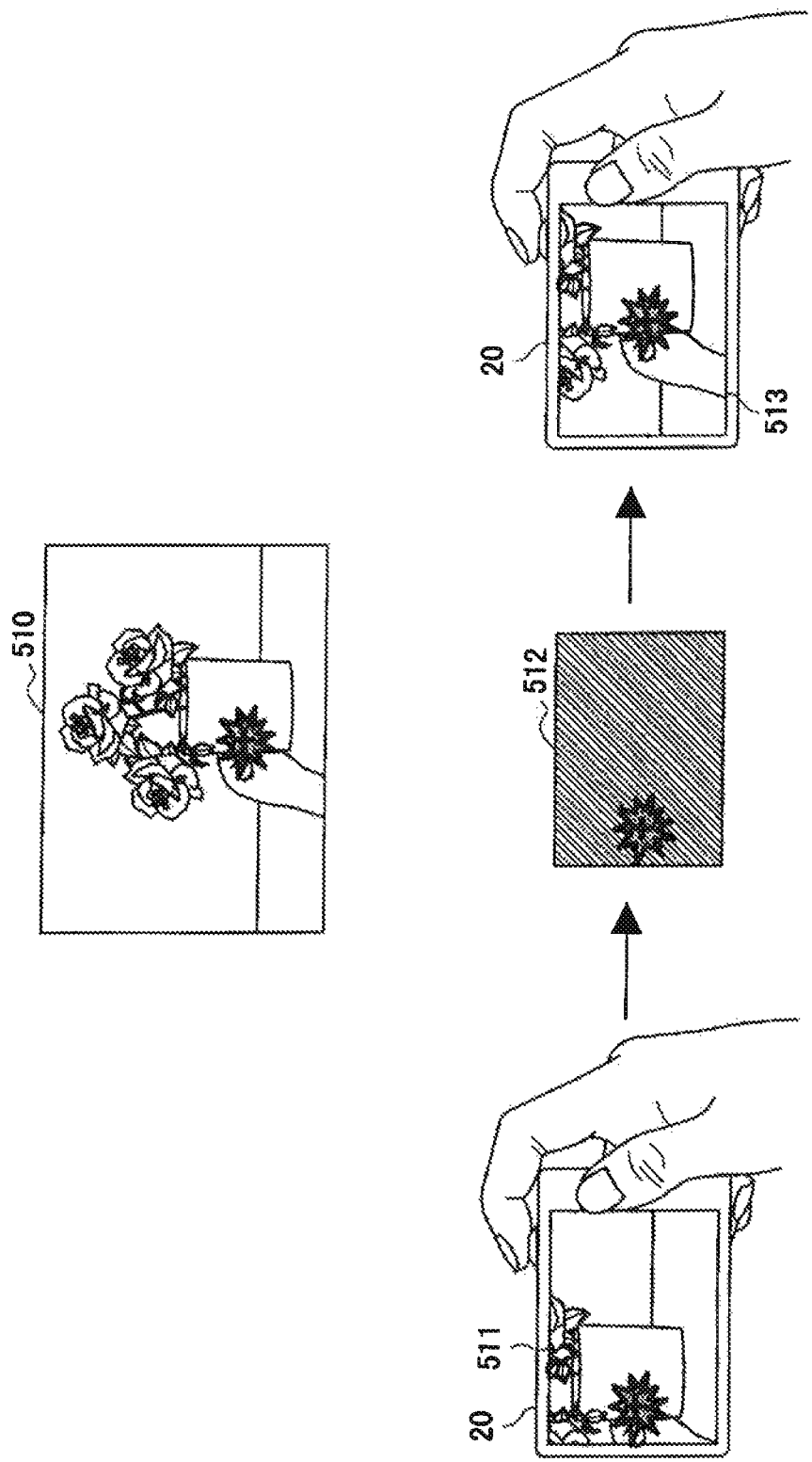
FIG. 27 is an explanatory diagram illustrating an example of a projection image emitted according to the embodiment.

Now, a projection image emitted according to movement of the information processing apparatus 20 will be explained with reference to FIG. 27. An explanatory diagram 510 of FIG. 27 is an image captured before the information processing apparatus 20 moves. For example, as shown in an explanatory diagram 511, it is assumed that the information processing apparatus 20 moves to the left after the image shown in the explanatory diagram 510 is captured. The detection unit 204 uses the motion sensor 23 to detect that the main body of the information processing apparatus 20 moves to the left, and provides the detection result to the emission unit 206.

As shown in an explanatory diagram 512, the emission unit 206 corrects the position of a graphic image emitted according to the movement of the main body of the information processing apparatus 20. In other words, a projection image is generated in which the position of the emitted graphic image is shifted to the left according to a distance the information processing apparatus 20 moves to the left. Then, as shown in an explanatory diagram 513, a graphic image is emitted to a particular position of an image even when the information processing apparatus 20 moves to either the right or left.

Figure 28:
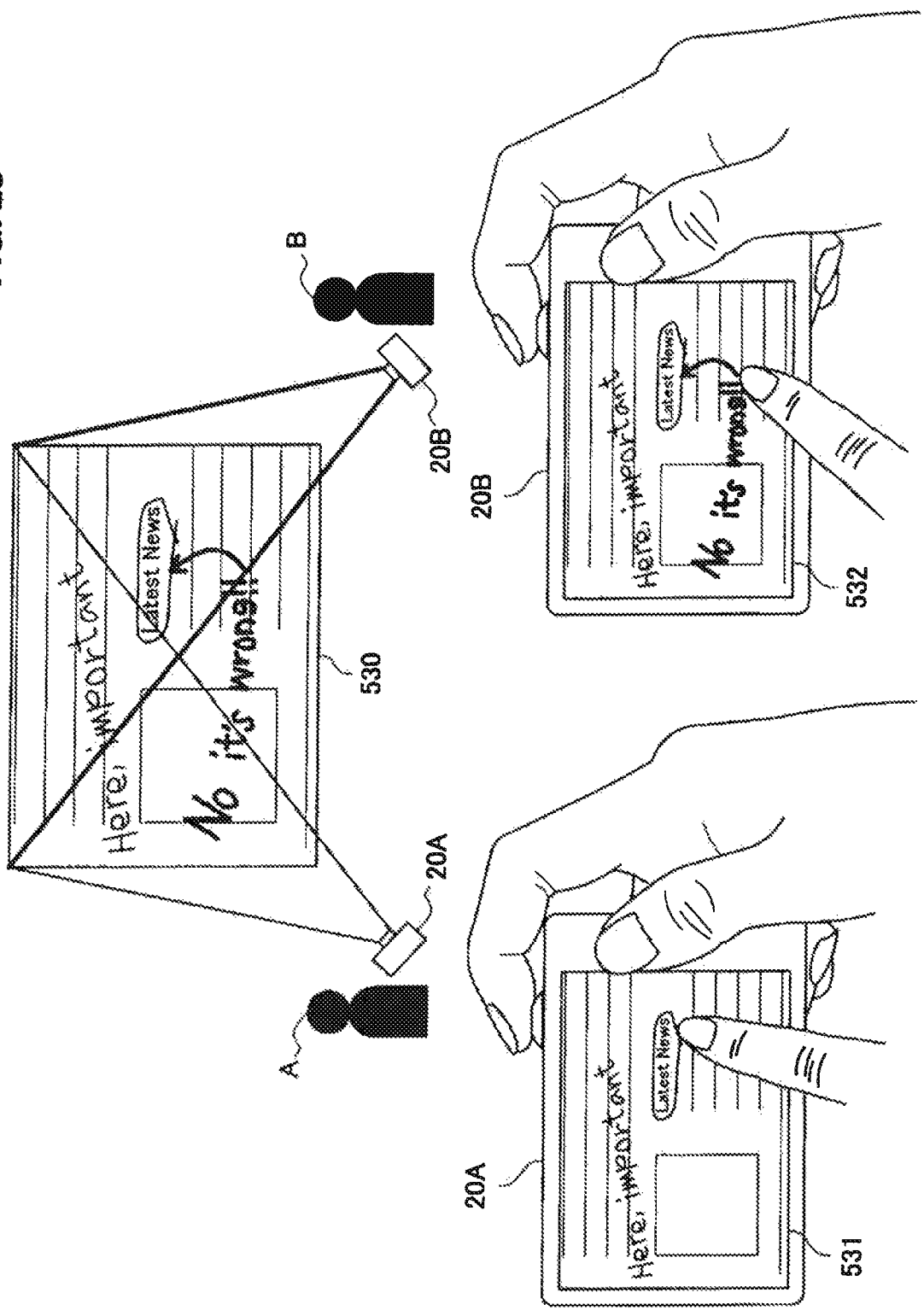
FIG. 28 is an explanatory diagram illustrating an example of a projection image emitted according to the embodiment.

As shown in FIG. 28, a plurality of information processing apparatuses 20 may emit different projection images onto one subject. For example, as shown in FIG. 28, an information processing apparatus 20A held by a user A and an information processing apparatus 20B held by a user B emit respective projection images onto a subject 527. It is assumed that, first, the information processing apparatus 20A emits a projection image as shown in an explanatory diagram 531, and then, the information processing apparatus 20B emits a projection image as shown in an explanatory diagram 532. In this case, both of the projection image emitted by the information processing apparatus 20A and the projection image emitted by the information processing apparatus 20B are projected onto the subject. Both apparatuses capture an image of the projection image shown in the explanatory diagram 530.

In this case, in order to successively emit different projection images onto one subject and capture images thereof, the photo shooting region and the projection region need to be in synchronization (in agreement) in each apparatus. Accordingly, the image processing as shown in FIG. 26 is performed to extract feature points of the subject and detect movement of the main body of the apparatus, so that the position of the projection region is corrected so as to bring the photo shooting region and the projection region into synchronization with each other. Alternatively, when different apparatuses emit projection images, emission synchronization according to which a projection image is emitted from an emission device needs to be in agreement. For example, both apparatuses may be connected via a network to share information about emission synchronization. Alternatively, information about emission synchronization may be embedded in a projection image, and the information about emission synchronization is obtained by taking an image of the projection image.

Alternatively, different apparatuses may have emission synchronizations in different cycles, and may capture a different projection image for each cycle. For example, the information processing apparatus 20A and the information processing apparatus 20B have different emission synchronizations. An image may be captured in the same cycle as the emission synchronization in which a projection image is emitted by the information processing apparatus 20A, and an image may be captured in the same cycle as the emission synchronization in which a projection image is emitted by the information processing apparatus 20B, so that a different projection image can be captured for each cycle.

When the cycles are changed in this manner, it is possible to distinguish which apparatus emits a projection image. Alternatively, a predetermined pattern is embedded into a projection image, and the projection image may be captured and analyzed in image processing to find a predetermined pattern, so as to distinguish which apparatus emits the projection image. Alternatively, a pattern including time-series information may be embedded into a projection image, and time-series information such as a projection order of a plurality of projection images may be analyzed by capturing the image of the pattern.

Figure 29:
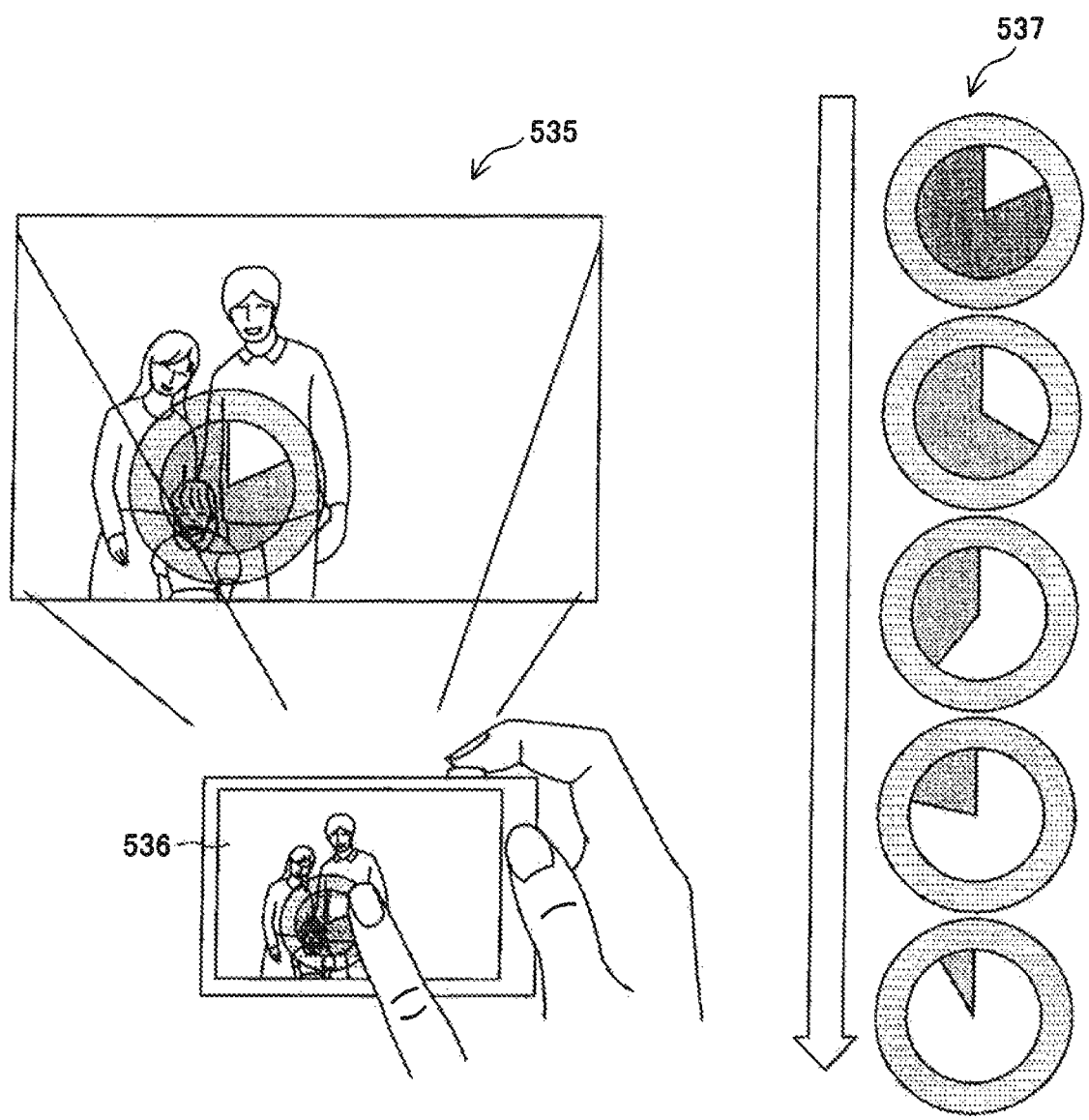
FIG. 29 is an explanatory diagram illustrating an example of a projection image emitted according to the embodiment.

As shown in FIG. 29, a projection image changing according to time may be projected onto a subject. For example, as shown in an explanatory diagram 536, a position where the projection image is emitted is specified by a finger and the like of a user. Then, as shown in an explanatory diagram 535, a circular projection image is emitted onto the subject. As shown in an explanatory diagram 537, the circular projection image changes according to time. For example, the circular projection image is changed as shown in the explanatory diagram 537, and a remaining time until a shutter is released is presented to the subject.

Figure 30:
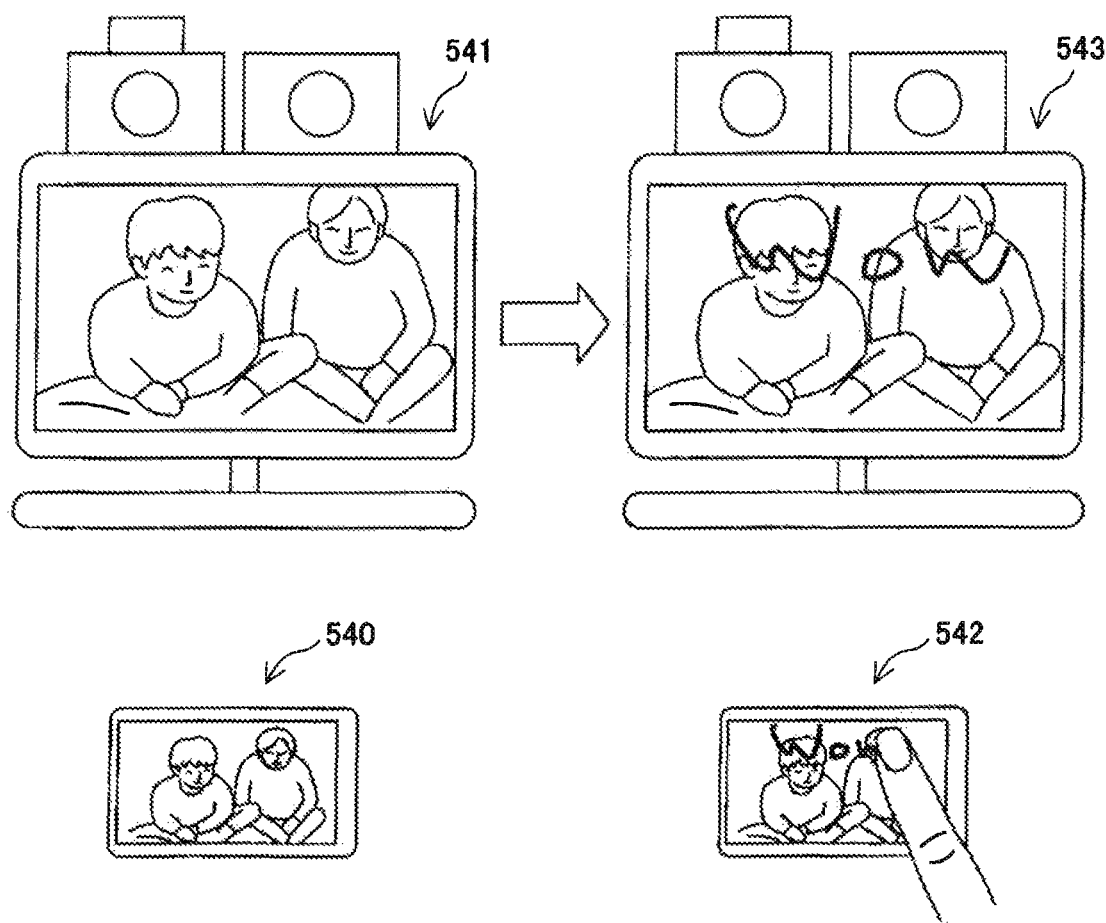
FIG. 30 is an explanatory diagram illustrating an example of a projection image emitted according to the embodiment.

As shown in FIG. 30, an information processing apparatus 30 may be associated with a television receiver and a remote controller, and a projection image specified on a touch panel of a remote controller is displayed on a display screen of a television receiver. For example, as shown in an explanatory diagram 541, the television receiver has an image capturing device and an emission device, which respectively captures an image of users who watch the television receiver and emits a projection image onto the users. The user has a remote controller, and as shown in an explanatory diagram 540, the display screen of the remote controller displays the image captured by the image capturing device of the television receiver. Then, when the user writes a predetermined text and the like on the touch panel of the remote controller as shown in an explanatory diagram 542, the projection image drawn by the user is emitted onto the subject as shown in an explanatory diagram 543. Then, the image capturing device of the television receiver captures an image of the subject onto which the projection image is emitted, and the image is displayed on the display screen of the television receiver.

Figure 31:
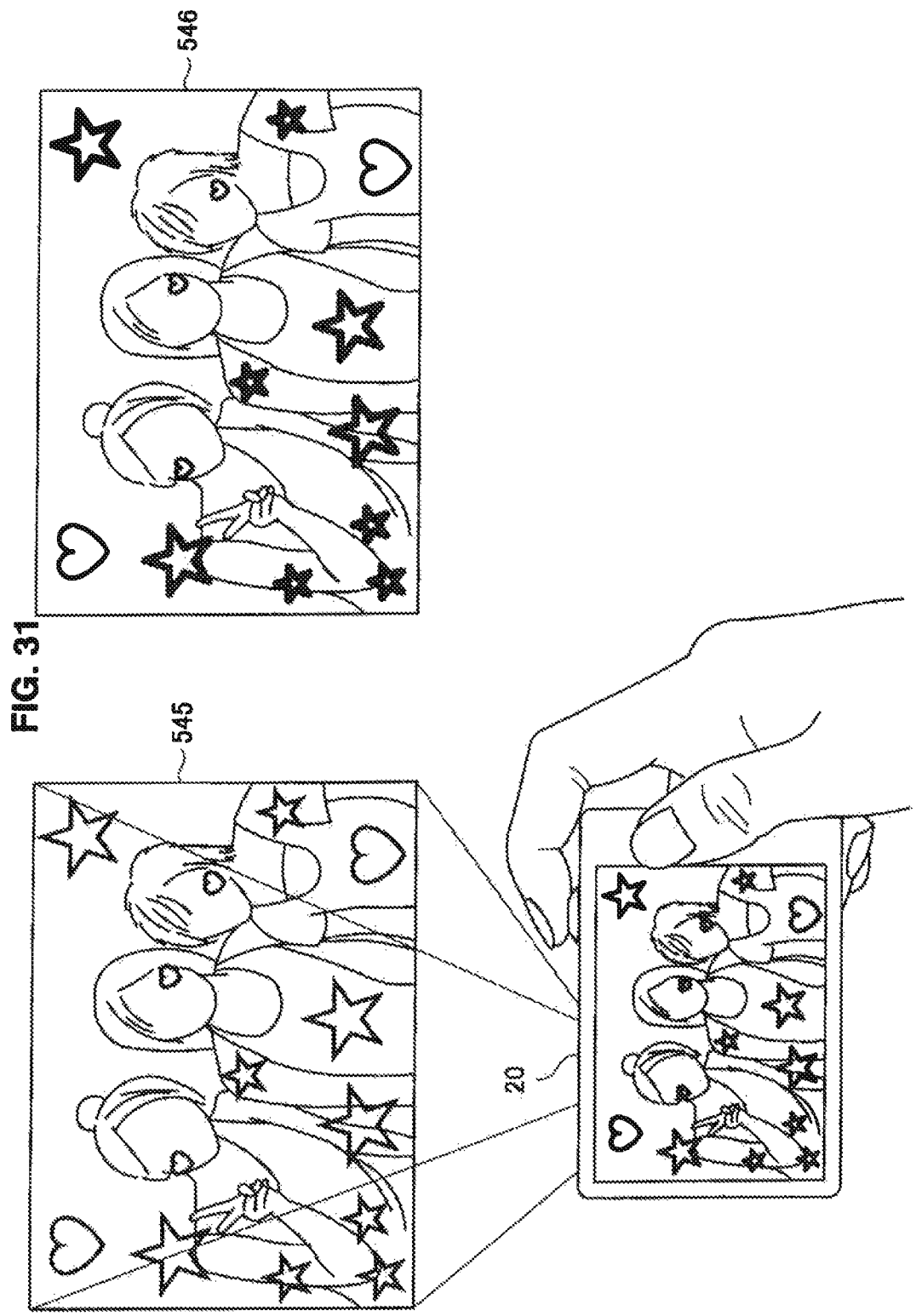
FIG. 31 is an explanatory diagram illustrating an example of a projection image emitted according to the embodiment.

As shown in FIG. 31, after an image of a subject is captured onto which a projection image is emitted, the emitted projection image may be corrected or recomposed by image processing. For example, as shown in an explanatory diagram 545, a projection image is emitted onto a subject, and an image of the subject is captured onto which the projection image is emitted. Then, as shown in an explanatory diagram 546, the image of the subject onto which the projection image is emitted is processed to perform color correction of the projection image. Therefore, not only a photographer but also a subject can find what kind of graphic image is output to which portion of the subject, and a desired composite graphic image can be made.

<3-3. Operation of Information Processing Apparatus in Detail>

Figure 32:
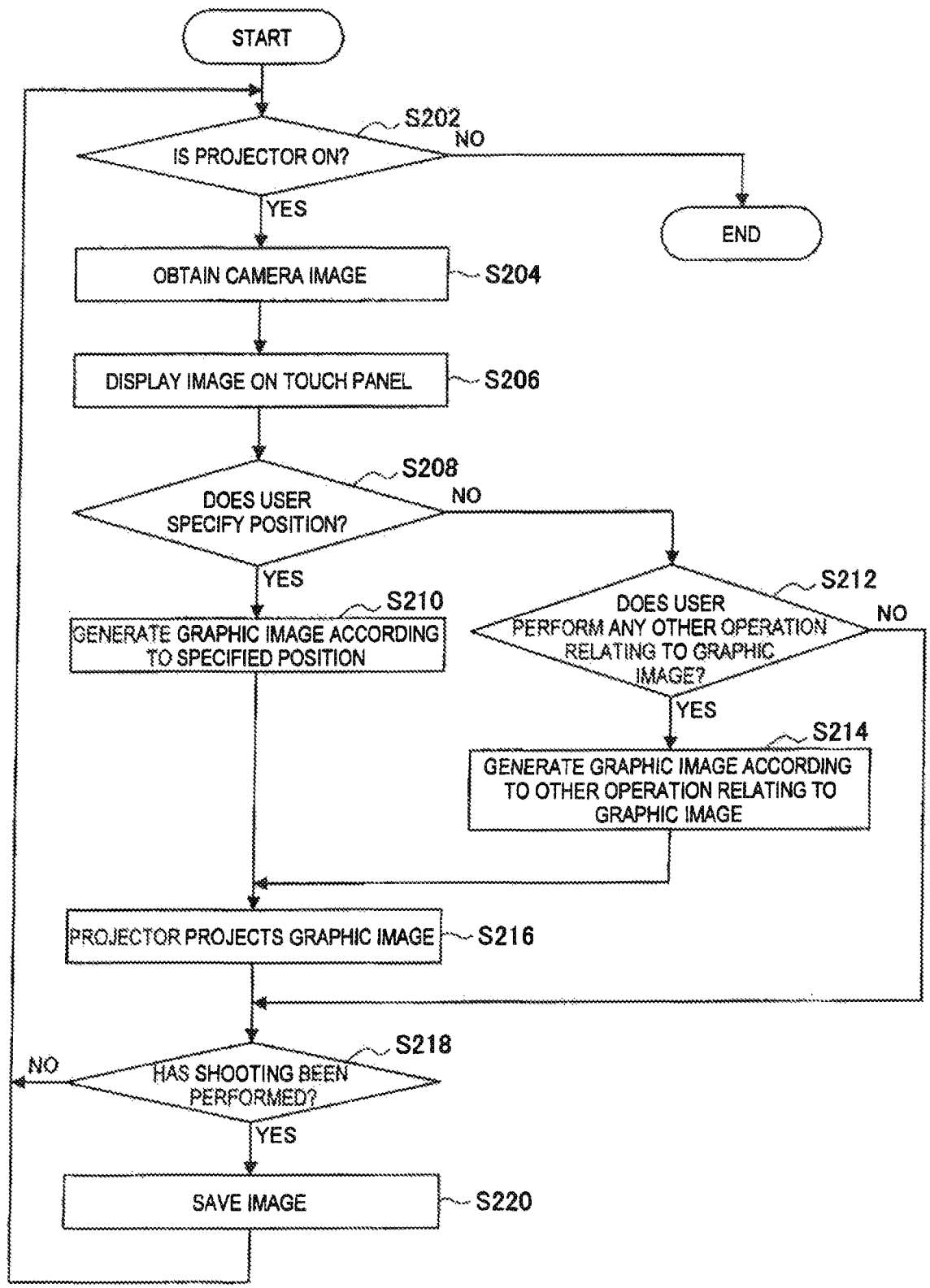
FIG. 32 is a flowchart illustrating operation of the information processing apparatus according to the embodiment in detail.
Figure 33:
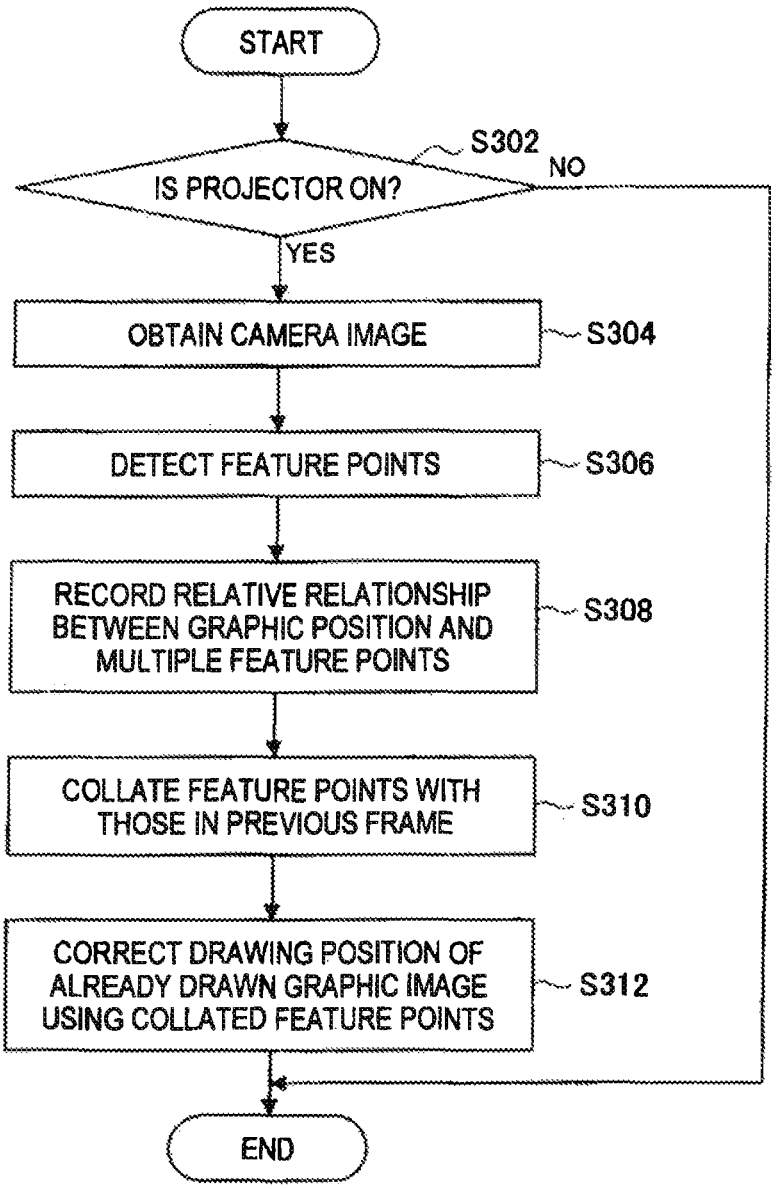
FIG. 33 is a flowchart illustrating operation of the information processing apparatus according to the embodiment in detail.
Figure 34:
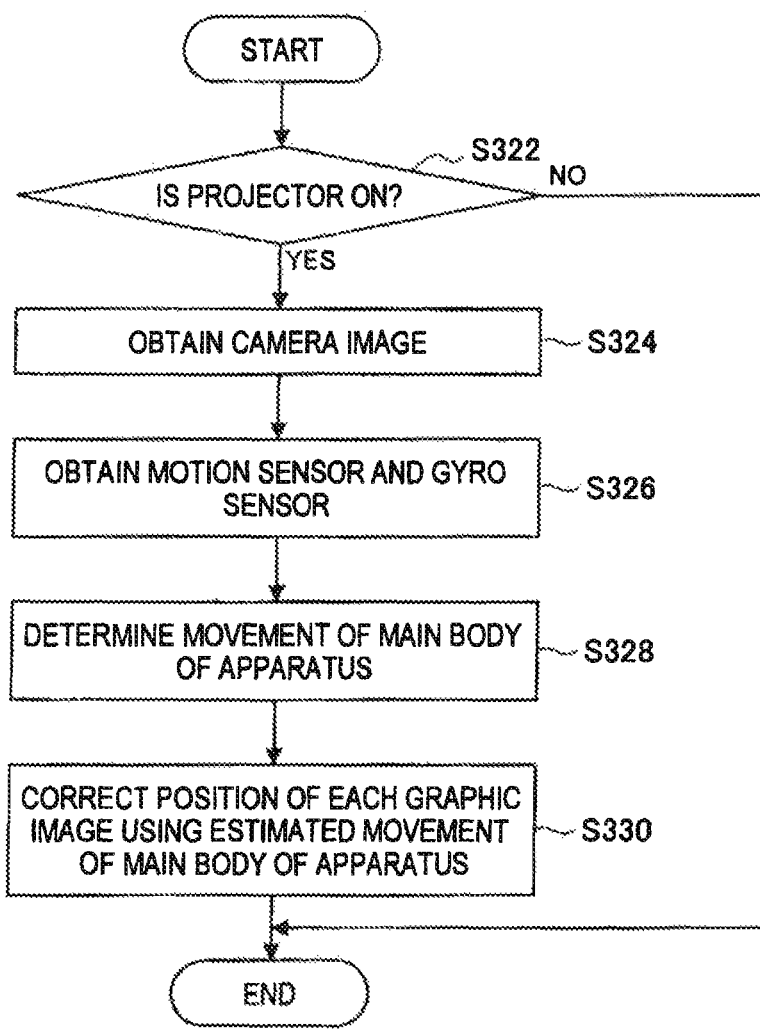
FIG. 34 is a flowchart illustrating operation of the information processing apparatus according to the embodiment in detail.

The functions of the control unit of the information processing apparatus 20 have been hereinabove explained. Subsequently, operation of the information processing apparatus 20 will be explained in detail with reference to FIGS. 32 to 34. FIGS. 32 to 34 are flowcharts each illustrating operation of the information processing apparatus 20 in detail.

As shown in FIG. 32, first, the information processing apparatus 20 determines whether a projector (emission device 13) is ON or not (S202). When the projector is determined to be ON in step S202, an image captured by the image capturing device 12 is obtained (S204). The image obtained in step S204 is displayed on the touch panel (S206). Then, a determination is made as to whether a user specifies a position on the touch panel showing the image (S208). In this embodiment, a determination is made as to whether a user specifies a position on the touch panel in step S208. However, this embodiment is not limited to such example. For example, whether the user specifies a position may be determined based on input to operation buttons and operation levers of the information processing apparatus 20.

When it is determined that the user specifies a position in step S208, a graphic image is generated according to the position specified by the user (S210). When it is determined that the user does not specify a position in step S208, a determination is made as to whether the user performs any operation relating to a graphic image other than the specifying position (S212). Examples of operations other than specifying position include selecting a desired graphic image from among a plurality of graphic images. When it is determined that the user performs another operation relating to the graphic image in step S212, a graphic image is generated according to the operation (S214).

Then, a projection image including the graphic image generated in step S210 or step S214 is emitted onto a subject (S216). Then, a determination is made as to whether an image of a subject is captured onto which the projection image is emitted (S218). When it is determined that photo shooting is performed in step S218, the captured image is saved (S220).

Subsequently, processing for fixing a position of an emitted projection image by image processing will be explained with reference to FIG. 33. In the explanation below, it is assumed that a graphic image has already been generated and a projection image is emitted onto a subject according to the processing of FIG. 32. As shown in FIG. 33, first, a determination is made as to whether the projector is ON or not (S302). When the projector is determined to be ON in step S302, an image captured by the image capturing device 12 is obtained (S304). The image obtained in step S304 is an image of the subject onto which a projection image is emitted.

Subsequently, feature points of the image obtained in step S304 are detected (S306). Then, relative relationship between a projected graphic position and the feature points detected in step S306 is recorded (S308). Then, it is collated with feature points in a previous frame (S310). Then, the drawing position of the already drawn graphic image is corrected using the feature points collated in step S310 (S312). The processings of step S306 and subsequent steps may be repeated every time an object and a person included in the subject move. Therefore, the projection image can be emitted to a fixed position at all times with respect to the object and the person included in the subject.

Subsequently, processing for fixing a position of an emitted projection image by detecting movement of the apparatus will be explained with reference to FIG. 34. In the explanation below, it is assumed that a graphic image has already been generated and a projection image is emitted onto a subject according to the processing of FIG. 32. As shown in FIG. 34, first, a determination is made as to whether the projector is ON or not (S322). When the projector is determined to be ON in step S322, an image captured by the image capturing device 12 is obtained (S324). Then, an output value output from a motion sensor (gyro sensor) is obtained (S326).

Then, movement of the main body of the information processing apparatus 20 is estimated based on the output value obtained in step S326 (S328). Then, the position of the projection image emitted onto the subject is corrected based on movement of the main body of the information processing apparatus 20 estimated in step S308 (S320). For example, when the main body of the information processing apparatus 20 is determined to move to the right and left in step S328, the emission position of the projection image is moved to the right and left. On the other hand, when the main body of the information processing apparatus 20 is rotated, the emitted projection image is rotated according to rotation of the main body of the apparatus. Therefore, the projection image can be emitted to a fixed position with respect to the object and the person included in the subject. The operation of the information processing apparatus 20 has been hereinabove explained in detail.

As described above, according to the second embodiment, the projection image based on user's input is emitted onto the subject, and the image capturing device 12 captures the image of the subject onto which the projection image is emitted. For example, the user operates the touch panel 22 to specify the position onto which the projection image is emitted and select a projection image to be emitted. Therefore, with intuitive operation, a user can have a desired graphic image projected onto a subject to be photographed. The second embodiment has been hereinabove explained.

4. Third Embodiment

Subsequently, the third embodiment will be explained. As described above, the technique is disclosed in the past to use a projector to project a graphic image onto a subject to be photographed. Further, another technique is disclosed to project a graphic image onto a desk and the like, detect a direction of fingers and shapes of hands, and cause an information processing apparatus to perform predetermined processing. However, it is desired to not only perform processing according to a direction of fingers and shapes of hands but also detect a certain movement of a subject with respect to a projected graphic image and execute processing in association with the detected movement.

Accordingly, the information processing apparatus 30 according to the embodiment of the present invention has been created in view of the above circumstance as one of issues taken into consideration. The information processing apparatus 30 according to the present embodiment can execute processing according to subject's interaction with a projection image.

Figure 35:
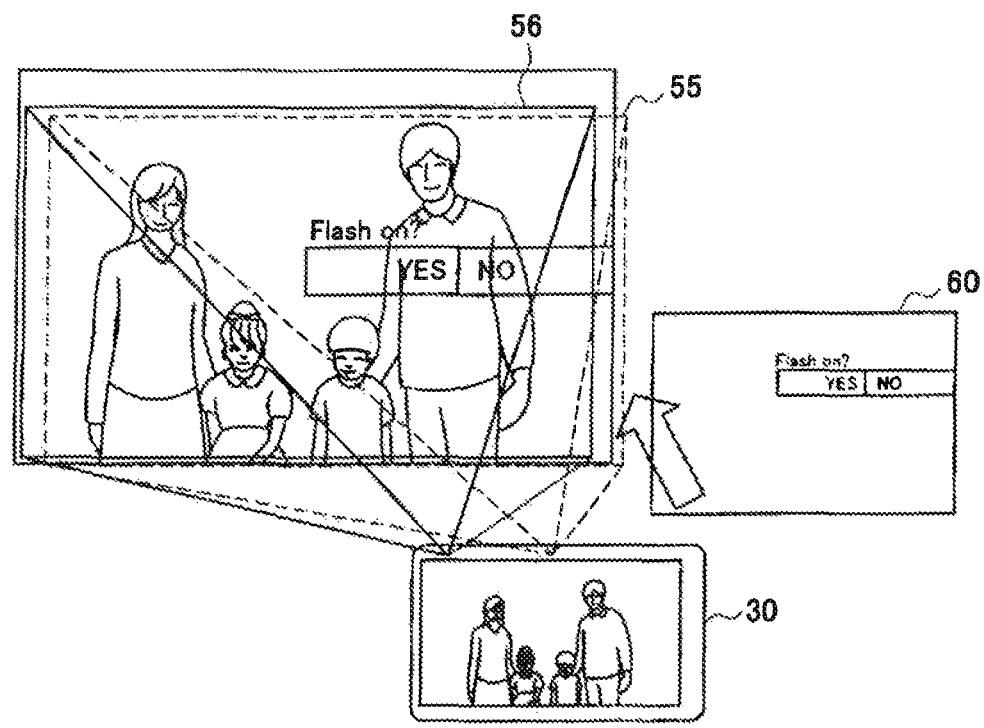
FIG. 35 is an explanatory diagram illustrating an overview of a third embodiment of the present invention.
Figure 36:
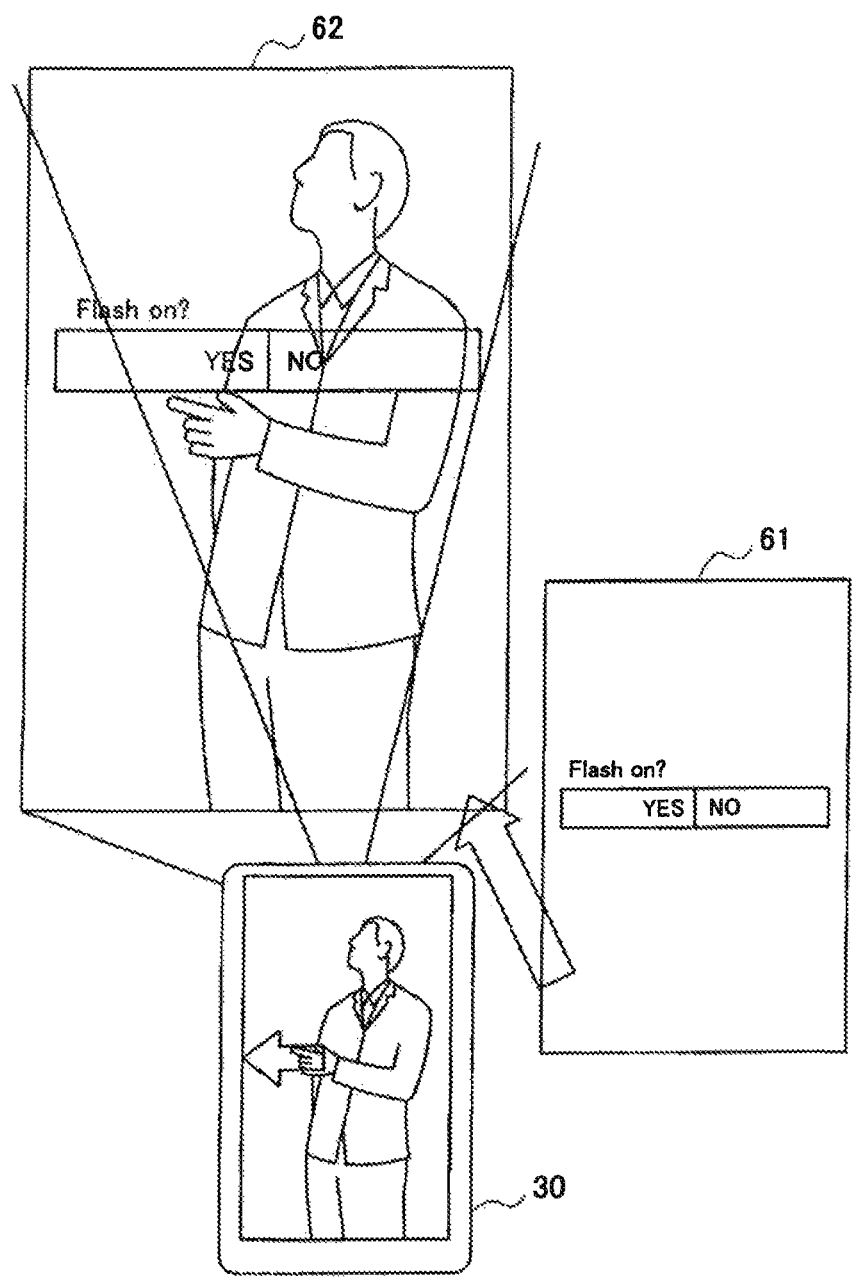
FIG. 36 is an explanatory diagram illustrating an overview of the embodiment.

An overview of the present embodiment will be explained with reference to FIGS. 35 and 36. For example, FIGS. 35 and 36 are explanatory diagrams each illustrating an overview of the present embodiment. Like the first embodiment, a projection image is emitted onto a subject by an emission device 13 of the information processing apparatus 30, and an image capturing device 12 captures an image of the subject onto which the projection image is emitted. As shown in FIG. 35, a photo shooting region 55 and a projection region 56 are in synchronization in the present embodiment. A projection image 60 including a graphic image for allowing the subject to perform predetermined operation is emitted onto the projection region 56. Then, the image capturing device 12 captures an image of the photo shooting region 55 onto which the projection image 60 is emitted.

As shown in an explanatory diagram 62 of FIG. 36, a projection image 61 including graphic images of "Yes" and "No" is emitted onto the projection region. Then, a person included in the subject gives a gesture for pointing at "Yes" in the emitted projection image. Then, the image of the subject giving the gesture for pointing at "Yes" is recognized, and it is determined that the subject is pointing at "Yes". In FIG. 36, the projection image allows the subject to select whether the flash of the image capturing device 12 is turned on or off. Accordingly, it is detected that the subject is pointing at "Yes", and an image capturing processing is executed with the flash turned on.

As described above, according to the information processing apparatus 30 of the present embodiment, the main body of the information processing apparatus 30 can be operated when the subject interacts with the projection image emitted by the emission device (projector) 13.

<4-1. Hardware Configuration of Information Processing Apparatus>

The hardware configuration according to the present embodiment has the same hardware configuration as the first embodiment shown in FIG. 3, and the detailed explanation thereof is omitted.

<4-2. Functional Configuration of Information Processing Apparatus>

Figure 37:
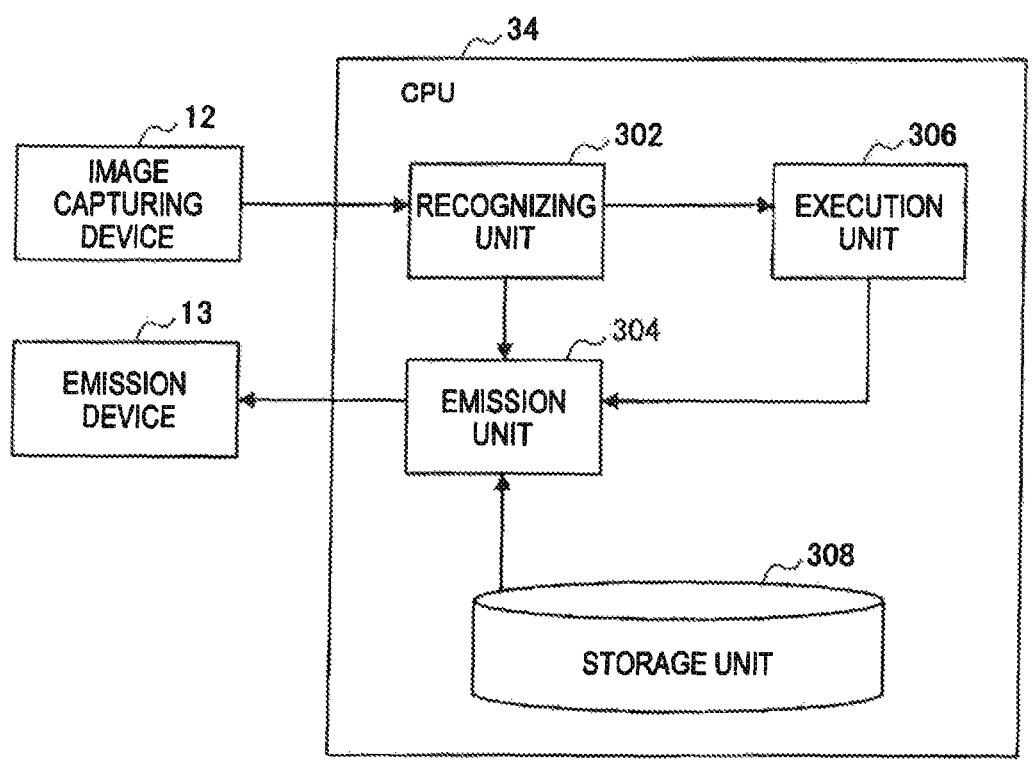
FIG. 37 is a block diagram illustrating a functional configuration of a control unit according to the embodiment.

Subsequently, a functional configuration of the information processing apparatus 30 will be explained with reference to FIG. 37. In FIG. 37, a functional configuration of the control unit (CPU 34) of the information processing apparatus 30 will be explained in particular. Reference is made to FIGS. 38 to 49 as necessary when the functional configuration of FIG. 37 is explained. As shown in FIG. 37, the control unit of the information processing apparatus 30 includes a recognizing unit 302, an emission unit 304, an execution unit 306, a storage unit 308, and the like. The recognizing unit 302 has a function of recognizing operation of the subject to be photographed.

The recognizing unit 302 recognizes operation of the subject based on the image of the subject captured by the image capturing device 12. In the explanation below, the image of the subject captured by the image capturing device 12 is analyzed, and operation performed with a gesture given by the subject is recognized. However, the present embodiment is not limited to such example. For example, an infrared light may be emitted onto a subject, and a gesture given by the subject may be recognized using reflection result of the infrared light.

The emission unit 304 has a function of emitting a projection image onto a subject so as to allow the subject, to be photographed, to perform a certain operation. The emission unit 304 may also emit a projection image so as to allow the subject to perform a certain selection operation. The emission unit 304 may also emit a projection image according to subject's operation recognized by the recognizing unit 302. The emission unit 304 obtains a projection image from the storage unit 308, and emits the projection image onto the subject. The emission unit 304 may obtain a projection image from the storage unit 308 according to user operation, and may obtain a projection image according to a person and an object included in a subject from the storage unit 308.

When the recognizing unit 302 recognizes a person and an object included in a subject, the emission unit 304 may emit a projection image onto a region of the person and the object included in the subject, or may emit a projection image onto a region other than the person and the object. Further, when the recognizing unit 302 recognizes a face of a particular person included in a subject, a projection image may be emitted to a region around the particular person.

For example, as shown in an explanatory diagram 601 of FIG. 38, when the faces of persons included in a subject are detected, a projection image may be emitted onto a region other than the regions of the faces of the persons. Further, as shown in an explanatory diagram 602, when the face of an owner of the information processing apparatus 30 can be detected from among the faces of the persons, a projection image may be emitted to a region around the face of the owner. Accordingly, the persons included in the subject can easily perform operation on the projection image.

Reference is made back to FIG. 37. The execution unit 306 has a function of executing a predetermined processing according to subject's operation recognized by the recognizing unit 302. The execution unit 306 executes processing according to a gesture given by a subject, which is recognized by the recognizing unit 302. For example, when a gesture for turning on the flash is recognized as described above, the flash of the information processing apparatus 30 is turned on, and an image capturing processing is executed. When the recognizing unit 302 recognizes movement of a subject in a range onto which a projection image is emitted by the emission unit 304, processing corresponding to the movement of the subject in the emitted range may be executed.

Figure 39:
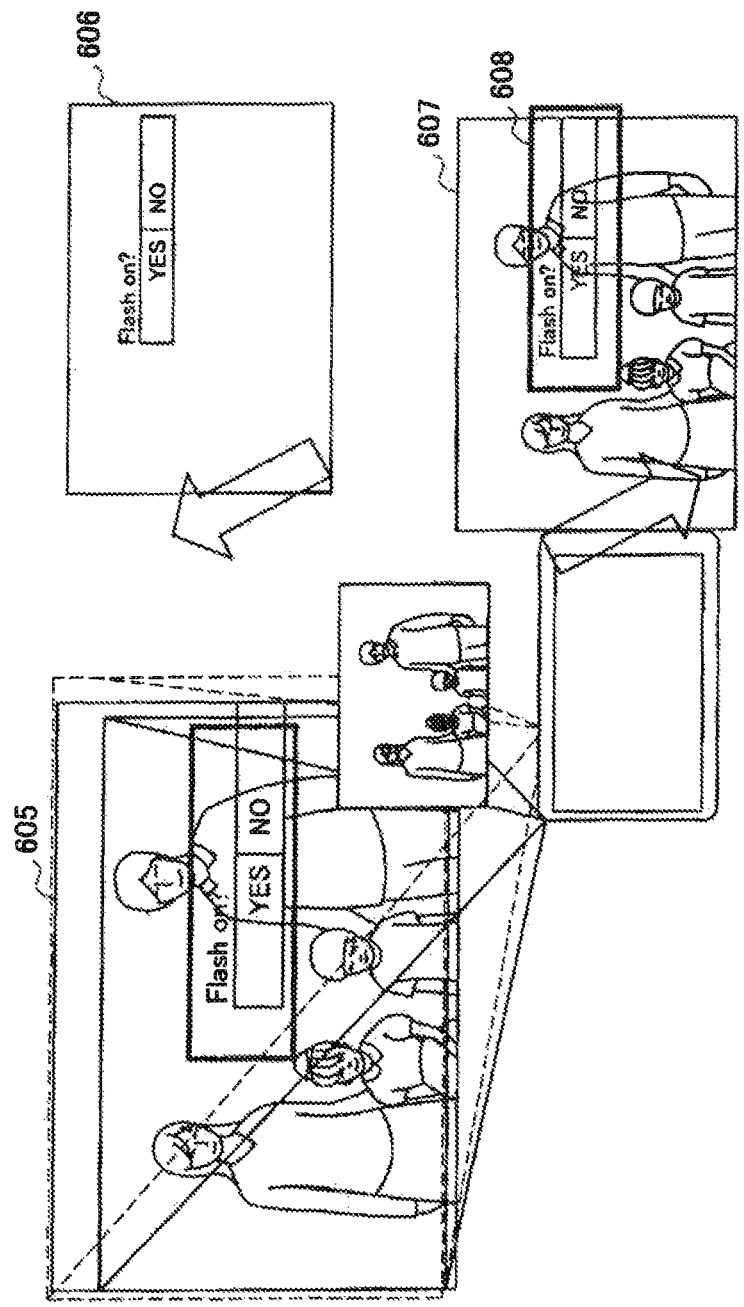
FIG. 39 is an explanatory diagram illustrating an example of a projection image emitted according to the embodiment.

For example, as shown in FIG. 39, a projection image shown in an explanatory diagram 606 is emitted onto the subject. In this case, as shown in an explanatory diagram 605, the projection image shown in the explanatory diagram 606 is emitted onto the subject. Then, as shown in an explanatory diagram 607, the image capturing device 12 captures an image of the subject onto which the projection image is emitted. At this occasion, the recognizing unit 302 recognizes only the region onto which the projection image is emitted. Therefore, the gesture given by the subject can be reliably recognized. That is, the recognizing unit 302 does not need to recognize predetermined operation in all of captured images. The recognizing unit 302 only needs to recognize predetermined operation included in a region 608. Therefore, processing load can be reduced.

Figure 40:
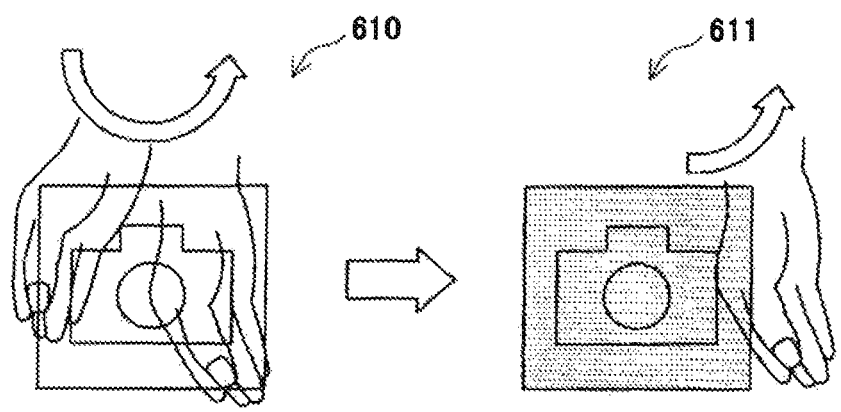
FIG. 40 is an explanatory diagram illustrating an example of a projection image emitted according to the embodiment.

Subsequently, an example of operation (interaction) performed by a subject on an emitted projection image will be explained with reference to FIGS. 39 to 48. For example, as shown in FIG. 40, when the recognizing unit 302 detects a certain movement, the recognizing unit 302 may recognize that operation is performed on a projection image. For example, in an explanatory diagram 610, an icon of a graphic image of a camera is emitted, and when movement of a hand is detected above the projection image of the icon, it is recognized that operation is performed on the projection image. When the movement of the hand above the projection image of the icon is detected, the color of the projection image of the icon is made deeper or the color is changed as shown in an explanatory diagram 611.

Figure 41:
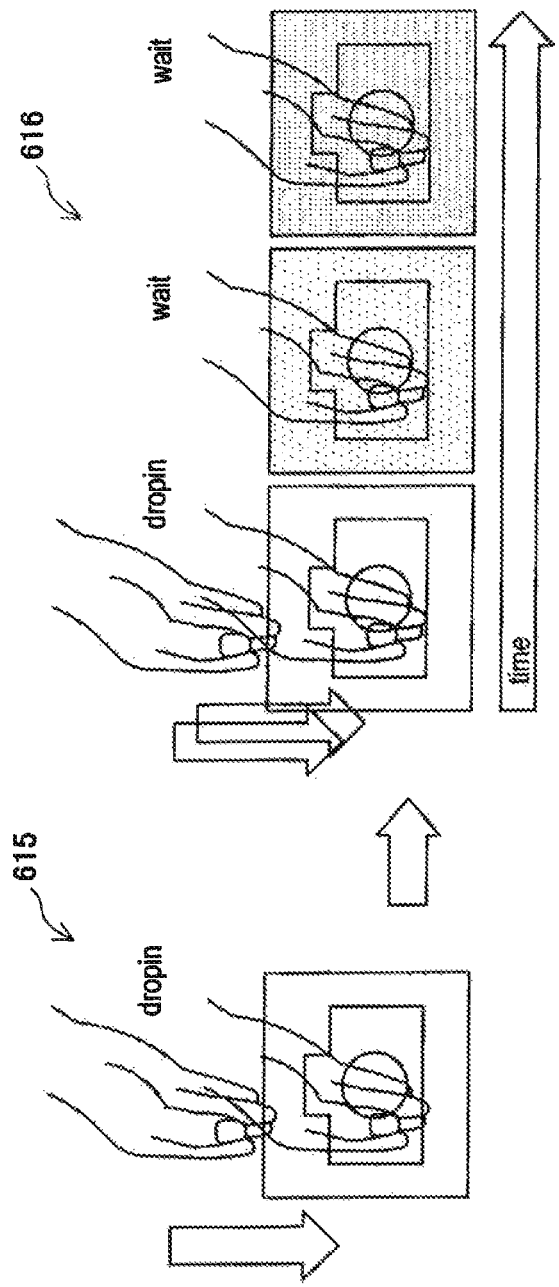
FIG. 41 is an explanatory diagram illustrating an example of a projection image emitted according to the embodiment.

As shown in FIG. 41, when a hand coming into the projection region to which the icon is projected is detected, the recognizing unit 302 may recognize that operation is performed on the projection image. Whether the hand enters the projection region can be determined based on, for example, whether an object substantially having flesh color comes into the region or not. For example, in an explanatory diagram 615, an icon of a graphic image of a camera is emitted onto a subject, and a determination is made as to whether a hand comes into a projection region of the projection image of the icon and stays there for a certain period or more. For example, as shown in an explanatory diagram 616, after the recognizing unit 302 recognizes that the hand comes into the projection region of the projection image of the icon, the color of the projection image is made deeper or the color is changed in a stepwise manner as the time passes.

Figure 42:
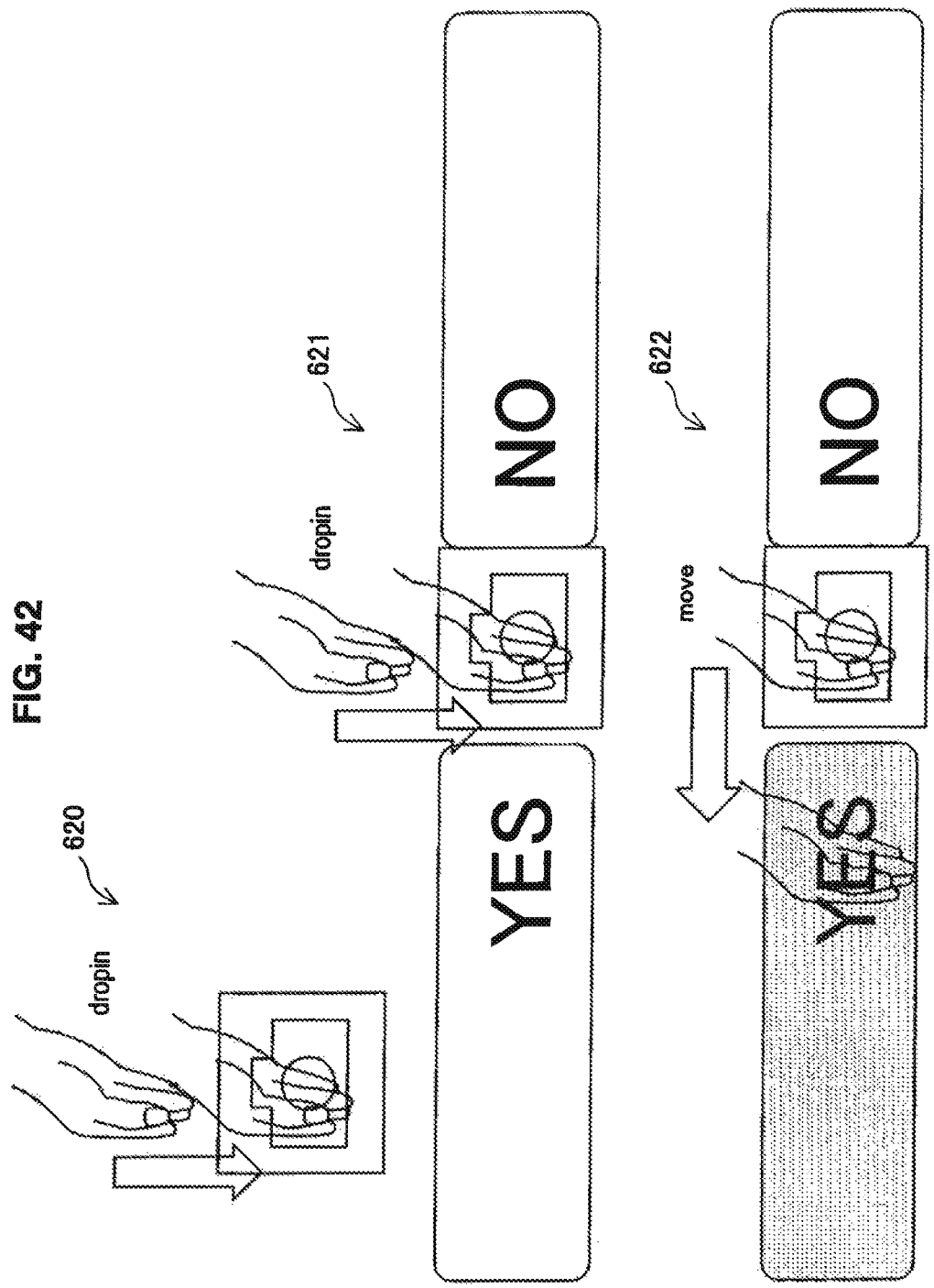
FIG. 42 is an explanatory diagram illustrating an example of a projection image emitted according to the embodiment.

FIG. 42 shows a case where a projection image is emitted to allow a subject to make a choice from two options. For example, as shown in an explanatory diagram 620, when a hand coming into the projection region to which the icon is projected is detected, a projection image for allowing a subject to make a choice from two options is emitted onto the subject. For example, as shown in an explanatory diagram 621, the projection image including "Yes" on the left side and "No" on the right side of the icon is emitted. Then, as shown in an explanatory diagram 622, when the hand is determined to move to the right side from the region onto which the icon is projected, it can be determined that "Yes" is selected. The execution unit 306 executes processing according to the selection. For example, when whether the flash is turned on or not is to be selected, an image capturing processing is executed with the flash turned on.

Figure 43:
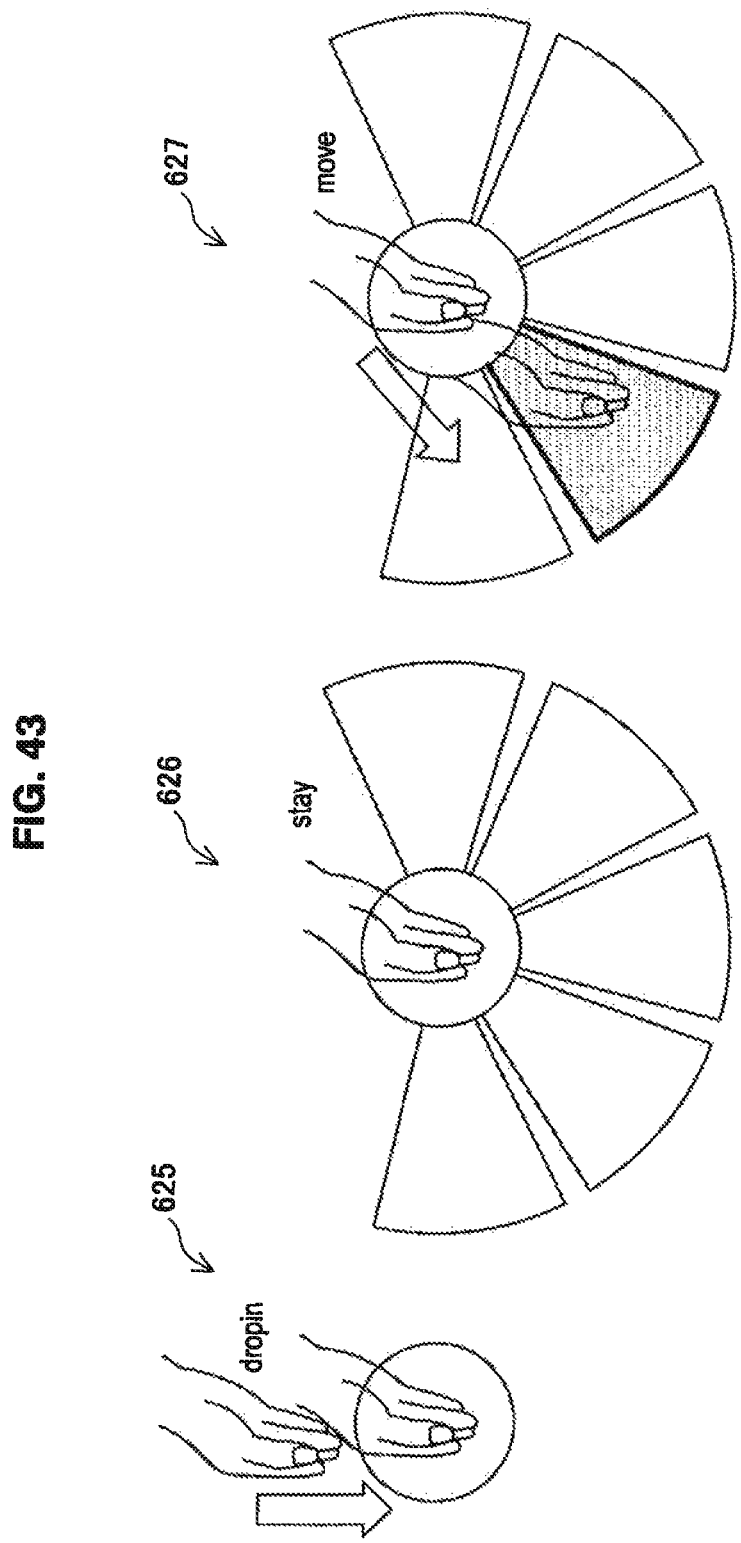
FIG. 43 is an explanatory diagram illustrating an example of a projection image emitted according to the embodiment.

FIG. 43 shows a case where a projection image is emitted to allow a subject to make a choice from a plurality of options. For example, as shown in an explanatory diagram 625, when a hand coming into the projection region to which a circular icon is projected is detected, a projection image for allowing a subject to make a choice from a plurality of options is emitted onto the subject. For example, as shown in an explanatory diagram 626, the projection image including options shown in a radiating manner from the circular icon is emitted. Then, as shown in an explanatory diagram 627, when a hand is determined to move to any one of the regions of the options from the region onto which the icon is projected, the option in the region where the hand is placed can be recognized as the selected option. The execution unit 306 executes processing according to the selection. For example, when a shooting mode such as white balance and shutter speed for photo shooting is selected in a stepwise manner, an image capturing processing is executed in the selected shooting mode.

Figure 44:
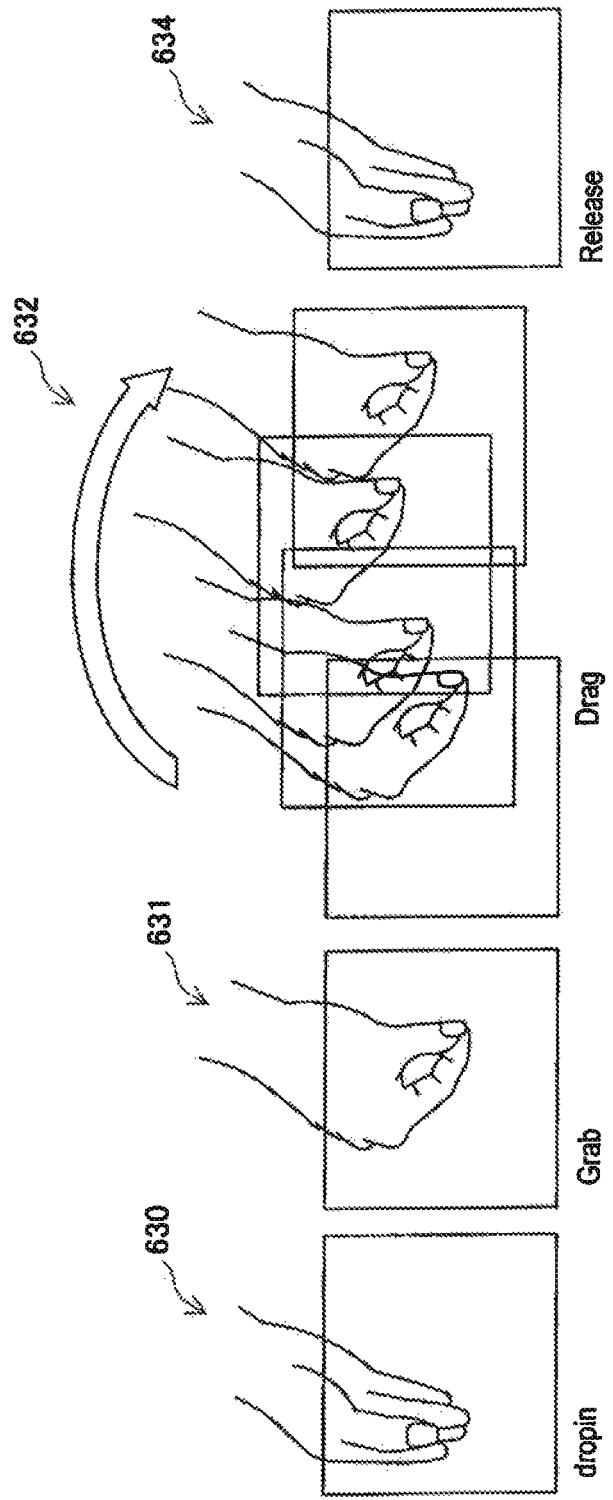
FIG. 44 is an explanatory diagram illustrating an example of a projection image emitted according to the embodiment.

FIG. 44 is a case where a projection image is changed according to movement of a subject. For example, as shown in an explanatory diagram 630, it is assumed that a hand coming into the projection region to which a rectangular icon is projected is detected, and thereafter, a clenched fist as shown in an explanatory diagram 631 is detected. When the recognizing unit 302 detects movement from an open hand to a clenched fist, the recognizing unit 302 determines that "grasping" action is performed. Then, as shown in an explanatory diagram 632, when a hand is moved while the "grasping" action is performed, the projection image tracks the movement. Then, as shown in an explanatory diagram 634, when it is detected that the state of the hand is changed from a clenched state to an opened state, the tracking of the projection image is terminated.

Figure 45:
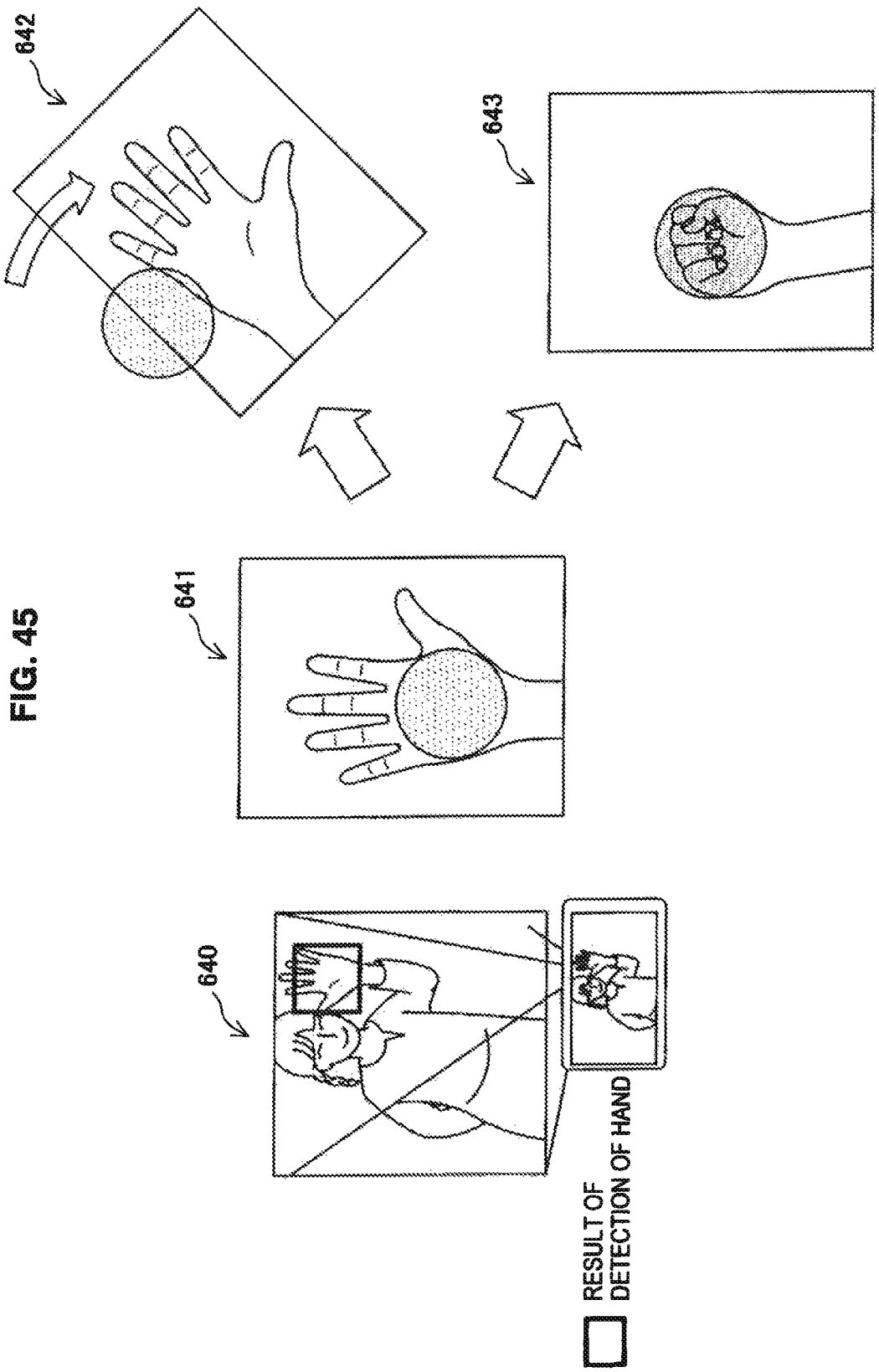
FIG. 45 is an explanatory diagram illustrating an example of a projection image emitted according to the embodiment.

FIG. 45 shows a case where a hand of a subject is detected, and a projection image is emitted onto the detected hand. For example, as shown in an explanatory diagram 640, the palm of the subject is detected. Then, as shown in an explanatory diagram 641, the circular projection image is emitted onto the region of the palm of the detected hand. In this case, the recognizing unit 302 keeps on detecting the region of the palm of the hand, and the emission unit 304 emits the projection image onto the region of the palm so as to track the movement of the palm of the hand.

Then, as shown in an explanatory diagram 642, when the palm of the hand moves quickly to go out of the region onto which the circular projection image is emitted and go far from the region, this may be recognized as operation performed on the projection image for canceling a certain processing. As shown in an explanatory diagram 643, when movement for clenching the palm of the hand is detected, this may be recognized as operation performed on the projection image for deciding a certain processing.

Figure 46:
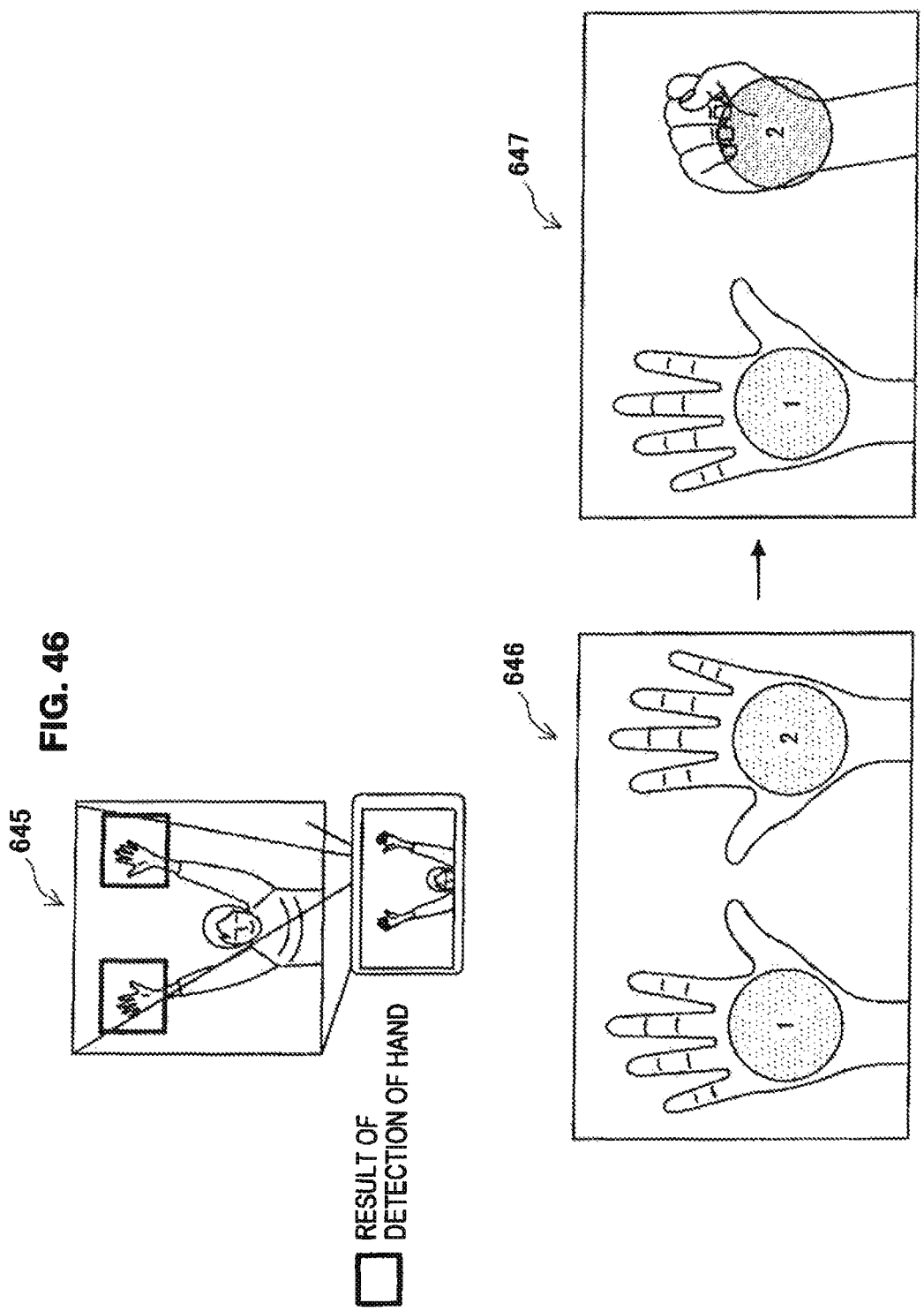
FIG. 46 is an explanatory diagram illustrating an example of a projection image emitted according to the embodiment.

FIG. 46 shows a case where palms of two hands are detected, and a projection image is emitted onto the detected two hands. For example, as shown in an explanatory diagram 645, the palms of the two hands of the subject are detected. Then, as shown in an explanatory diagram 646, a projection image is emitted so as to show different options on the palms of the two hands, respectively. Then, as shown in an explanatory diagram 647, when movement for clenching any one of the hands is detected, this is recognized as operation for selecting any one of the options.

FIG. 47 shows a case where a projection image is changed according to rough movement of a subject. For example, as shown in an explanatory diagram 650, the positions of both hands and the direction of the body of the subject are detected, so that movement of the subject is roughly detected. In the explanatory diagram 650, it is detected that the left arm is stretched, and the right arm is bent. For example, when processing is executed to change illumination light according to movement of the subject, a filter for representing the illumination light may be moved according to the position of the detected hand as shown in an explanatory diagram 651.

Figure 48:
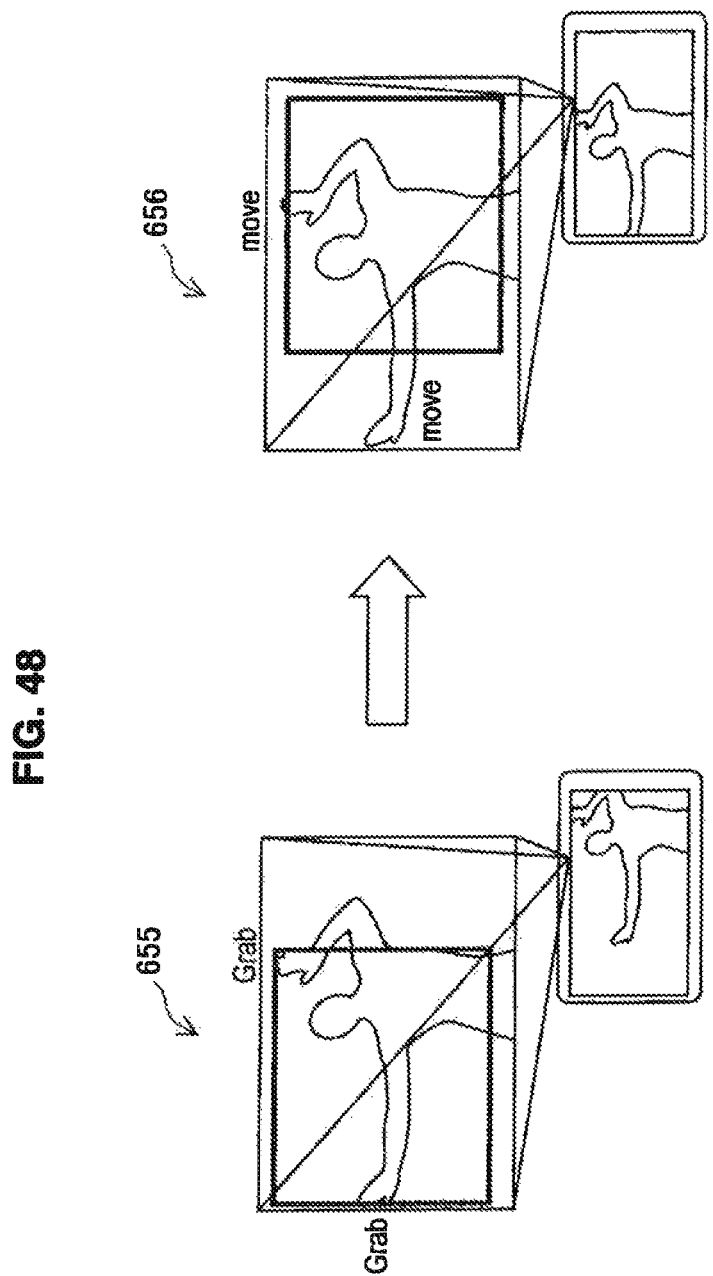
FIG. 48 is an explanatory diagram illustrating an example of a projection image emitted according to the embodiment.

FIG. 48 shows a case where a shooting field angle is changed according to opposite-like movement of a subject. For example, as shown in an explanatory diagram 655, the positions of both hands and movement of the hands of the subject are detected, and a projection image representing the shooting field angle is emitted. As described above, movement of the palms of the hands is detected so as to detect operation for "grabbing" the emitted shooting field angle and operation for "releasing" the shooting field angle. Then, as shown in an explanatory diagram 656, when the subject grabs and moves the shooting field angle of the projection image, the shooting range is moved.

Accordingly, zoom-in and zoom-out can be performed during photo shooting according to operation performed by the subject. Zoom-in and zoom-out processing may be performed in response to not only the rough operation of the subject as shown in FIG. 48 but also reciprocal movement of a hand. An image obtained as a result of zoom-in or zoom-out may be projected onto a region different from the region where the subject is located.

Figure 49:
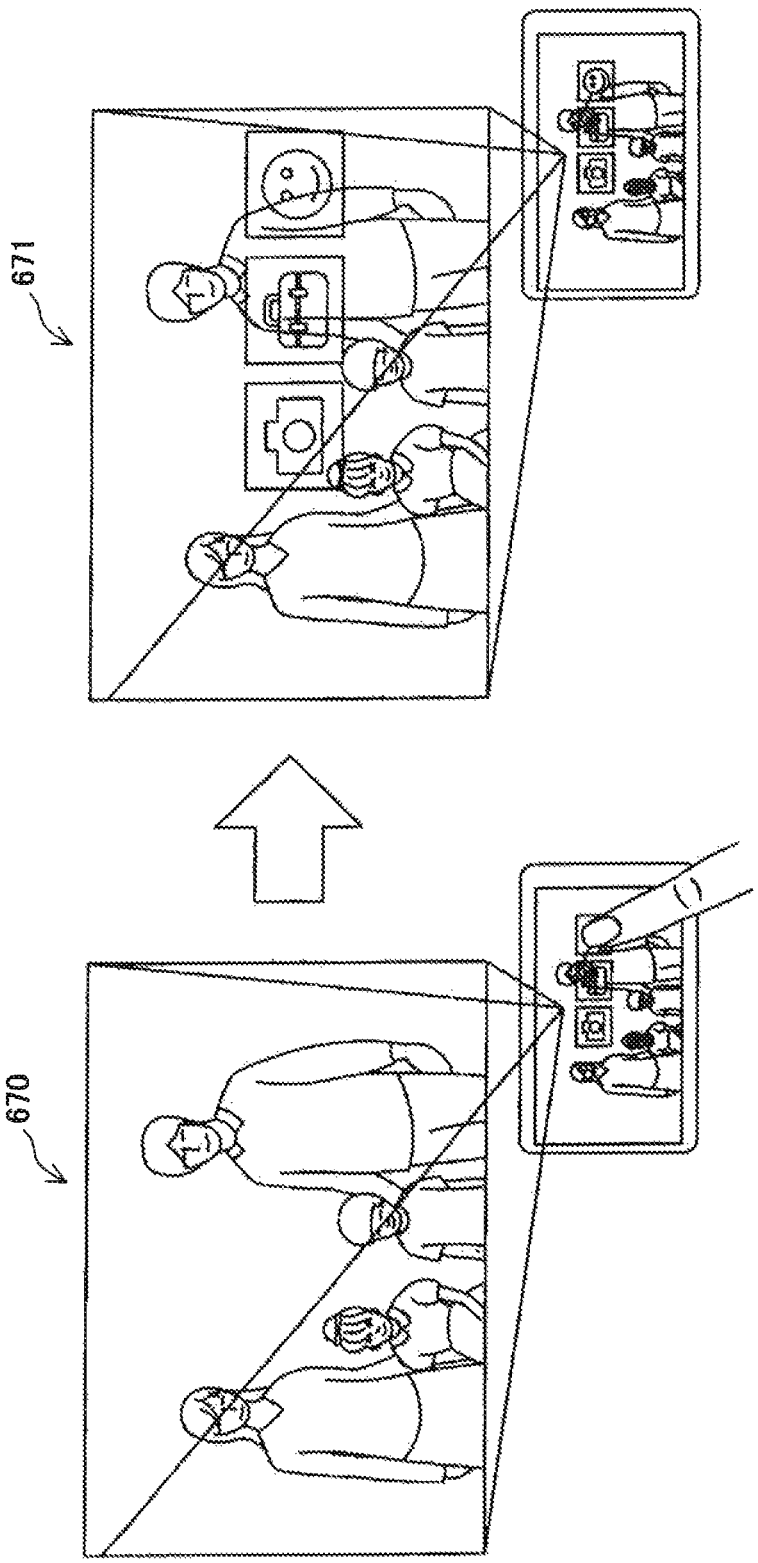
FIG. 49 is an explanatory diagram illustrating an example of a projection image emitted according to the embodiment.

FIG. 49 shows a case where a projection image is emitted to allow a subject to perform a predetermined operation according to operation of a photographer. For example, in a case where the information processing apparatus 30 is arranged with a touch panel like the second embodiment, a projection image may be emitted according to a photographer's input to the touch panel. As shown in an explanatory diagram 670 of FIG. 49, a photographer touches the touch panel of the information processing apparatus 30 to specify a position to which a projection image is emitted. Then, as shown in an explanatory diagram 671, the projection image is emitted to the position specified by the photographer.

<4-3. Operation of Information Processing Apparatus in Detail>

The functions of the control unit of the information processing apparatus 30 have been hereinabove explained. Subsequently, operation of the information processing apparatus 30 will be explained in detail with reference to FIG. 50. FIG. 50 is a flowchart illustrating operation of the information processing apparatus 30 in detail.

As shown in FIG. 50, first, a determination is made as to whether the projector (emission device 13) is ON or not (S402). When the projector is determined to be ON in step S402, a determination is made as to whether the projector emits a GUI or not (S404). The GUI emitted in step S404 is a projection image for allowing a subject, of which image is to be captured, to perform a predetermined operation.

When the projector is determined to emit the GUI in step S404, an image captured by the camera (image capturing device 12) is obtained (S406). Then, a gesture recognition is performed only in a region showing the GUI emitted in step S404 (S408). As described above, when the projector emits the GUI of the projection image for allowing the subject to perform a predetermined operation, a certain operation is performed on the emitted GUI. This means that it is sufficient to recognize operation of the subject only in the region onto which the GUI is emitted.

When the projector is determined not to emit the GUI in step S404, the image captured by the camera (image capturing device 12) is obtained (S410). Then, a gesture recognition is performed (S412). In step S412, operation performed by the subject on all over the image obtained in step S410 is recognized.

Then, whether a gesture is recognized or not is determined in step S408 or step S412 (S414). When it is determined that the gesture recognition is performed in step S414, operation is executed according to the content of the recognized gesture and the position where the gesture is given (S416). For example, the content of the gesture may be closing the palm of an open hand and pointing the fingers of a hand to a certain direction. For example, when a projection image including texts of "Yes and "No" is emitted, and the hand of the subject moves to a region of "Yes", operation is executed according to "Yes". For example, the flash is turned on.

Then, the GUI is changed or a new GUI is projected so as to reflect the result of operation executed in step S416 (S418). Then, a determination is made as to whether photo shooting is performed or not (S420). When it is determined that photo shooting is performed in step S420, the projection image (GUI) which is to be operated by the subject is erased before photo shooting is performed (S422). In step S422, erasing the GUI means that the emission device 13 no longer emits the projection image. Then, photo shooting is executed after the GUI is erased in step S422 (S424). The operation of the information processing apparatus 30 has been hereinabove explained in detail.

As described above, according to the third embodiment, the projection image for allowing the subject, which is to be photographed, to perform a predetermined operation is emitted onto the subject, and operation performed by the subject on the emitted projection image is recognized. Then, the predetermined processing is executed according to the recognized operation performed by the subject. Therefore, operation performed on the information processing apparatus 30, such as photo shooting processing, can be executed according to subject's interaction with the projection image.

It should be understood by those skilled in the art that various modifications, combinations, sub-combinations and alterations may occur depending on design requirements and other factors insofar as they are within the scope of the appended claims or the equivalents thereof.

For example, each step in the processings performed by the information processing apparatuses 10, 20, 30 in this specification may not be necessarily processed in time-series according to an order described in the flowcharts. For example, the steps of the processings performed by the information processing apparatuses 10, 20, 30 may be performed in a different order from the order described in the flowcharts, or may be performed in parallel.

A computer program for causing hardware such as a CPU, a ROM, and a RAM in the information processing apparatuses 10, 20, 30 to achieve the same functions as the constituent elements of the information processing apparatuses 10, 20, 30 may be generated. In addition, a storage medium storing the computer program is also provided.

What is claimed is:

1. An information processing apparatus comprising:
    circuitry configured to
        detect a position of a subject in a captured image,
        recognize an operation performed by the subject in the captured image,
        cause an additional image to be added onto the subject in the captured image in accordance with the detected position of the subject and the operation performed by the subject, and
        generate a composite image in which the additional image is added onto the subject in the captured image.

2. The information processing apparatus according to claim 1, wherein the circuitry is further configured to
    detect a particular region of the subject in the captured image, and cause the additional image to be added onto the particular region of the subject in the captured image.

3. The information processing apparatus according to claim 1, wherein the circuitry is further configured to
    detect a particular region of the subject in the captured image, and cause the additional image to be added onto the subject in the captured image to avoid the particular region.

4. The information processing apparatus according to claim 1, wherein the circuitry is further configured to
    analyze the captured image, and cause the additional image, having a color selected based on a result of analyzing the captured image, to be added onto the subject in the captured image.

5. The information processing apparatus according to claim 1, wherein the circuitry is further configured to
    analyze the captured image, and cause the additional image to be added onto the subject in the captured image in accordance with a brightness of the captured image.

6. The information processing apparatus according to claim 1, wherein the circuitry is further configured to
    analyze the captured image and at least one additional image that is temporally adjacent to the captured image to detect a movement of the subject, and cause the additional image to be added onto the subject in the captured image in accordance with the detected movement of the subject.

7. The information processing apparatus according to claim 1,
    wherein the additional image comprises a shading pattern.

8. The information processing apparatus according to claim 1,
    wherein the additional image comprises an icon.

9. The information processing apparatus according to claim 1,
    wherein the operation is a gesture made by the subject in the captured image.

10. The information processing apparatus according to claim 1,
    wherein the operation is a hand gesture.

11. An information processing method being performed by an information processing apparatus having at least one processor, the method comprising:
    detecting a position of a subject in a captured image;
    recognizing an operation performed by the subject in the captured image;
    causing an additional image to be added onto the subject in the captured image in accordance with the detected position of the subject and the operation performed by the subject; and
    generating a composite image in which the additional image is added onto the subject in the captured image.

12. The information processing method according to claim 11, further comprising:
    detecting a particular region of the subject in the captured image; and
    causing the additional image to be added onto the particular region of the subject in the captured image.

13. The information processing method according to claim 11, further comprising:
    detecting a particular region of the subject in the captured image; and
    causing the additional image to be added onto the subject in the captured image to avoid the particular region.

14. The information processing method according to claim 11, further comprising:
    analyzing the captured image; and
    causing the additional image, having a color selected based on a result of analyzing the captured image, to be added onto the subject in the captured image.

15. The information processing method according to claim 11, further comprising:
    analyzing the captured image; and
    causing the additional image to be added onto the subject in the captured image in accordance with a brightness of the captured image.

16. The information processing method according to claim 11, further comprising:
    analyzing the captured image and at least one additional image that is temporally adjacent to the captured image to detect a movement of the subject; and
    causing the additional image to be added onto the subject in the captured image in accordance with the detected movement of the subject.

17. The information processing method according to claim 11,
    wherein the additional image comprises a shading pattern.

18. The information processing method according to claim 11,
    wherein the operation is a gesture made by the subject in the captured image.

19. A non-transitory computer-readable storage medium having stored thereon a program, which when executed by a computer causes the computer to execute a method, the method comprising:
    detecting a position of a subject in a captured image;
    recognizing an operation performed by the subject in the captured image;
    causing an additional image to be added onto the subject in the captured image in accordance with the detected position of the subject and the operation performed by the subject; and
    generating a composite image in which the additional image is added onto the subject in the captured image.

20. The non-transitory computer-readable storage medium according to claim 19, wherein the executed method further comprises:
    detecting a particular region of the subject in the captured image; and causing the additional image to be added onto the particular region of the subject in the captured image.

21. The non-transitory computer-readable storage medium according to claim 19, wherein the executed method further comprises:
   detecting a particular region of the subject in the captured image; and
   causing the additional image to be added onto the subject in the captured image to avoid the particular region.

22. The non-transitory computer-readable storage medium according to claim 19, wherein the executed method further comprises:
   analyzing the captured image; and
   causing the additional image, having a color selected based on a result of analyzing the captured image, to be added onto the subject in the captured image.

23. The non-transitory computer-readable storage medium according to claim 19, wherein the executed method further comprises:
   analyzing the captured image; and
   causing the additional image to be added onto the subject in the captured image in accordance with a brightness of the captured image.

24. The non-transitory computer-readable storage medium according to claim 19, wherein the executed method further comprises:
   analyzing the captured image and at least one additional image that is temporally adjacent to the captured image to detect a movement of the subject; and
   causing the additional image to be added onto the subject in the captured image in accordance with the detected movement of the subject.

25. The non-transitory computer-readable storage medium according to claim 19,
   wherein the additional image comprises a shading pattern.

26. The non-transitory computer-readable storage medium according to claim 19,
   wherein the operation is a gesture made by the subject in the captured image.

\* \* \* \* \*